US010218269B2

(12) United States Patent
Yamaguchi et al.

(10) Patent No.: US 10,218,269 B2
(45) Date of Patent: Feb. 26, 2019

(54) SWITCHING REGULATOR AND INTEGRATED-CIRCUIT PACKAGE

(71) Applicant: Rohm Co., Ltd., Kyoto (JP)

(72) Inventors: Yuhei Yamaguchi, Kyoto (JP); Tetsuo Tateishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/740,729

(22) PCT Filed: Jun. 29, 2016

(86) PCT No.: PCT/JP2016/069213
§ 371 (c)(1),
(2) Date: Dec. 28, 2017

(87) PCT Pub. No.: WO2017/002834
PCT Pub. Date: Jan. 5, 2017

(65) Prior Publication Data
US 2018/0358898 A1 Dec. 13, 2018

(30) Foreign Application Priority Data

Jun. 29, 2015 (JP) ................................. 2015-130244
Jun. 29, 2015 (JP) ................................. 2015-130248
(Continued)

(51) Int. Cl.
*G05F 1/56* (2006.01)
*H02M 3/156* (2006.01)
*G05F 1/46* (2006.01)
*H02M 1/00* (2006.01)
(Continued)

(52) U.S. Cl.
CPC ............ *H02M 3/156* (2013.01); *G05F 1/461* (2013.01); *H02M 2001/0025* (2013.01)

(58) Field of Classification Search
CPC .................................. H02M 3/156; G05F 1/56
(Continued)

(56) References Cited

U.S. PATENT DOCUMENTS 6,977,488 B1    12/2005   Nogawa et al.
7,190,752 B2 *   3/2007   Shake .............. H04B 10/07953
                                                       341/123
(Continued)

FOREIGN PATENT DOCUMENTS

JP    2004-153965    5/2004
JP    3556652        5/2004
(Continued)

OTHER PUBLICATIONS

Japan Patent Office, International Search Report for PCT/JP2016/069213, dated Sep. 27, 2016 (with English Translation.).

*Primary Examiner* — Adolf Berhane
*Assistant Examiner* — Nusrat Quddus
(74) *Attorney, Agent, or Firm* — Fish & Richardson P.C.

(57) ABSTRACT

Provided is a switching regulator in which a MOS transistor Q1 (first switch) and a MOS transistor Q2 (second switch) are complementarily turned on/off according to an output voltage $V_{OUT}$, and in which a MOS transistor Q3 (third switch) and a MOS transistor Q4 (fourth switch) are complementarily turned on/off by fixing an on-duty D of the MOS transistor Q3 (third switch) in a step up/down mode. The switching regulator performs current mode control according to information of current flowing in the second switch.

42 Claims, 32 Drawing Sheets

(30) Foreign Application Priority Data

Jun. 29, 2015 (JP) ................................ 2015-130251
Jun. 29, 2015 (JP) ................................ 2015-130253
Jun. 28, 2016 (JP) ................................ 2016-127115

(58) Field of Classification Search
USPC .......................................... 323/282–289, 315
See application file for complete search history.

(56) References Cited

U.S. PATENT DOCUMENTS

| | | | |
|---|---|---|---|
| 2004/0113597 A1 | 7/2004 | Miyazaki | |
| 2009/0309557 A1 | 12/2009 | Miyamae | |
| 2010/0308655 A1* | 12/2010 | Wachi | H02M 1/36 |
| | | | 307/31 |
| 2012/0153915 A1* | 6/2012 | Loikkanen | G05F 1/618 |
| | | | 323/283 |
| 2013/0088207 A1 | 4/2013 | Miyamae | |
| 2014/0203792 A1 | 7/2014 | Miyamae | |
| 2014/0232360 A1 | 8/2014 | Dally | |
| 2016/0373009 A1* | 12/2016 | Tateishi | H02M 3/156 |

FOREIGN PATENT DOCUMENTS

| | | |
|---|---|---|
| JP | 2004-208448 | 7/2004 |
| JP | 2005-253253 | 9/2005 |
| JP | 2009-033878 | 2/2009 |
| JP | 2009-303360 | 12/2009 |
| JP | 2012-170199 | 9/2012 |
| JP | 2015-047040 | 3/2015 |

\* cited by examiner

SWITCHING REGULATOR AND INTEGRATED-CIRCUIT PACKAGE

TECHNICAL FIELD

The present invention relates to a step up/down switching regulator and an integrated circuit package that can be used as a component of the step up/down switching regulator.

BACKGROUND ART

In an idling-stop vehicle that often restarts its engine, power of its battery is consumed continuously by in-vehicle devices such as an AV device and an air conditioner during a period while the engine is temporarily stopped, and hence a battery voltage drop in cranking (engine start) is severer than conventional conditions. Using a step up/down switching regulator, which maintains its output voltage when its input voltage (battery voltage) is decreased, in-vehicle devices can be normally operated even if the battery voltage is largely decreased in cranking.

Therefore, in the in-vehicle device market, demand for the step up/down switching regulator has been increased.

A structure and operation of a general step up/down switching regulator is described below. FIG. 37 is a diagram showing a structure of a general step up/down switching regulator.

The step up/down switching regulator shown in FIG. 37 includes MOS transistors Q11 and Q12 as step-down switches, an inductor L11, MOS transistors Q13 and Q14 as step-up switches, an output capacitor C11, resistors R11 to R14, and a control unit CNT11.

The control unit CNT11 monitors an output voltage $V_{OUT}$ with an output of a voltage division circuit constituted of the resistors R11 and R12, and it monitors a battery voltage $V_{BAT}$ as an input voltage with an output of a voltage division circuit constituted of the resistors R13 and R14.

If the battery voltage $V_{BAT}$ is higher than a first predetermined value A1, the control unit CNT11 selects a step-down mode (see FIG. 38). In the step-down mode, the control unit CNT11 controls on/off of the MOS transistors Q11 and Q12 according to the output voltage $V_{OUT}$, normally turns off the MOS transistor Q13, and normally turns on the MOS transistor Q14. In this way, a first switch voltage $V_{SW1}$ as a voltage at a connection node between the MOS transistors Q11 and Q12 and a second switch voltage $V_{SW2}$ as a voltage at a connection node between the MOS transistors Q13 and Q14 become as shown in FIG. 39A.

When the battery voltage $V_{BAT}$ is the first predetermined value A1 or lower and is higher than a second predetermined value A2, the control unit CNT11 selects a step up/down mode (see FIG. 38). In the step up/down mode, the control unit CNT11 controls on/off of the MOS transistors Q11 and Q12 according to the output voltage $V_{OUT}$ and controls on/off of the MOS transistors Q13 and Q14 according to the output voltage $V_{OUT}$. In this way, the first switch voltage $V_{SW1}$ as the voltage at the connection node between the MOS transistors Q11 and Q12 and the second switch voltage $V_{SW2}$ as the voltage at the connection node between the MOS transistors Q13 and Q14 become as shown in FIG. 39B.

When the battery voltage $V_{BAT}$ is the second predetermined value A2 or lower, the control unit CNT11 selects the step-up mode (see FIG. 38). In the step-up mode, the control unit CNT11 normally turns on the MOS transistor Q11, normally turns off the MOS transistor Q12, and controls on/off of the MOS transistors Q13 and Q14 according to the output voltage $V_{OUT}$. In this way, the first switch voltage $V_{SW1}$ as the voltage at the connection node between the MOS transistors Q11 and Q12 and the second switch voltage $V_{SW2}$ as the voltage at the connection node between the MOS transistors Q13 and Q14 become as shown in FIG. 39C.

LIST OF CITATIONS

Patent Literature

Patent Document 1: Japanese Patent No. 3556652 (claim 7, FIG. 11)

SUMMARY OF THE INVENTION

Technical Problem

In the step up/down mode and the step-up mode in which the step-up operation is performed by switching the MOS transistors Q13 and Q14, a transfer function H(s) of a pulse width modulation (PWM) modulator constituted of the MOS transistors Q13 and Q14 of the step up/down switching regulator shown in FIG. 37 contains a term of T(s) expressed by the following equation (1).

[Mathematical 1]

$$T(s) = 1 - \frac{\alpha L \bar{I}_L}{(1-D)\bar{V}_{OUT}} s \quad (1)$$

$\bar{I}_L$: average current of reactor L11
L: inductance value of reactor L11
$\bar{V}_{OUT}$: average value of output voltage $V_{OUT}$
D: on-duty of MOS transistor Q13
α: proportional constant T(s) expressed by the above equation (1) shows right half-plane zero characteristic (characteristic such that a zero point exists in a right half-plane), and the step up/down switching regulator shown in FIG. 37 can be expected to have responsiveness only in a frequency range lower than frequency f expressed by the following equation (2). Note that the following equation (2) is derived by substituting s=jω, =j·2πf into the above equation (1).

[Mathematical 2]

$$f = \frac{1}{2\pi} \cdot \frac{(1-D)\bar{V}_{OUT}}{\alpha L \bar{I}_L} \quad (2)$$

As measures for improving the responsiveness, there considered a measure of increasing capacitance of the output capacitor C11 in the step up/down switching regulator shown in FIG. 37. In addition, there also considered a measure of changing the structure to provide a step-down switching regulator unit in a post-stage of a step-up switching regulator unit.

However, the former measure causes a problem of cost increase of the output capacitor C11, while the latter measure causes a problem of cost increase of the reactor because the step-up switching regulator unit and the step-down switching regulator unit individually need separate reactors.

A DC-DC converter disclosed in Patent Document 1 can solve the above problem, but it has a problem that a duty of a first control signal generated by a feed-forward control circuit depends on the input voltage so that correction is difficult if the transfer function of the DC-DC converter linearly changes according to the duty.

In addition, when realizing the step up/down switching regulator with a single integrated circuit package, one step-down switch is disposed in the integrated circuit package, and the reactor and a pair of step-up switches are externally disposed in a post-stage of the integrated circuit package. In other words, the number of external components is increased compared with the case where the step-down switching regulator is realized with a single integrated circuit package.

In order to decrease the number of external components, there considered a measure of realizing the step-down switching regulator without the step-up switch, and increasing capacitance of an input capacitor so as to suppress a decrease of the input voltage input to the integrated circuit package when the battery voltage $V_{BAT}$ is decreased.

In view of the above situation, it is a first object of the present invention to provide a step up/down switching regulator, in which current mode control is easy, right half-plane zero characteristic can be prevented from appearing while suppressing cost increase, and response characteristic similar to step-down characteristic is shown.

In view of the above situation, it is a second object of the present invention to provide a step up/down switching regulator, in which output fluctuation when operation mode is switched can be reduced, right half-plane zero characteristic can be prevented from appearing while suppressing cost increase, and response characteristic similar to step-down characteristic is shown.

In view of the above situation, it is a third object of the present invention to provide an integrated circuit package, which can be used as a component of a step up/down switching regulator in which right half-plane zero characteristic can be prevented from appearing while suppressing cost increase, and response characteristic similar to step-down characteristic is shown, and which can also be used as a component of a step-down switching regulator.

In view of the above situation, it is a fourth object of the present invention to provide a step up/down switching regulator, in which right half-plane zero characteristic can be prevented from appearing while suppressing cost increase, response characteristic similar to step-down characteristic is shown, and a decrease in gain of a control system can be suppressed in a step up/down mode.

Note that the first to fourth objects are common in providing a step up/down switching regulator or an integrated circuit package that can be used as a component of the step up/down switching regulator, in which right half-plane zero characteristic can be prevented from appearing, response characteristic similar to step-down characteristic is shown. It is sufficient that the present invention can solve at least one of the first to fourth objects.

Means for Solving the Problem

<First Technical Feature>

Among switching regulators disclosed in this specification, a switching regulator having a first technical feature is a switching regulator arranged to generate an output voltage from an input voltage, which includes: a first switch having a first terminal connected to an application terminal of the input voltage; a second switch having a first terminal connected to a second terminal of the first switch and a second terminal connected to an application terminal of a predetermined voltage lower than the input voltage; a current detection unit arranged to detect current flowing in the second switch; an inductor having a first terminal connected to a connection node between the first switch and the second switch; a third switch having a first terminal connected to a second terminal of the inductor and a second terminal connected to the application terminal of the predetermined voltage; a fourth switch having a first terminal connected to a connection node between the inductor and the third switch and a second terminal connected to an application terminal of the output voltage; a first control circuit arranged to generate a step-down control signal for complementarily turning on/off the first switch and the second switch according to the output voltage; and a second control circuit arranged to generate a step-up control signal for complementarily turning on/off the third switch and the fourth switch by fixing an on-duty D ($0 \leq D \leq 1$) of the third switch to a fixed value D' ($0<D'<1$) in a step up/down mode. The first control circuit includes a slope voltage generation unit arranged to accumulate current information detected by the current detection unit, and to combine the accumulated current information with a ramp voltage generated by a ramp voltage generation unit so as to generate a slope voltage, and the first control circuit generates the step-down control signal according to the slope voltage (1-1st structure).

In addition, in the switching regulator having the 1-1st structure described above, it is preferred to adopt a structure in which the first control circuit accumulates the current information detected by the current detection unit during a predetermined period in which the first switch is in off-state (1-2nd structure).

In addition, in the switching regulator having the 1-1st or 1-2nd structure described above, it is preferred to adopt a structure in which a timing when the first switch switches from off to on is substantially the same as a timing when the third switch switches from on to off (1-3rd structure).

In addition, in the switching regulator having one of the 1-1st to 1-3rd structures described above, it is preferred to adopt a structure in which the current detection unit is a voltage-to-current conversion circuit arranged to convert a voltage corresponding to the current flowing in the second switch into current, and the slope voltage generation unit includes a capacitor arranged to be charged by output current of the voltage-to-current conversion circuit (1-4th structure).

In addition, in the switching regulator having the 1-4th structure described above, it is preferred to adopt a structure in which the slope voltage generation unit further includes a charging switch arranged to connect/disconnect a current path from an output terminal of the voltage-to-current conversion circuit to the capacitor (1-5th structure).

In addition, in the switching regulator having the 1-4th or 1-5th structure described above, it is preferred to adopt a structure in which the slope voltage generation unit includes a reset unit arranged to reset a charging voltage of the capacitor by discharging the capacitor (1-6th structure).

In addition, in the switching regulator having one of the 1-1st to 1-6th structures described above, it is preferred to adopt a structure in which the first control circuit includes an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal (1-7th structure).

In addition, in the switching regulator having one of the 1-1st to 1-7th structures described above, it is preferred to adopt a structure in which the second switch is a MOS transistor, and the current detection unit detects the current flowing in the second switch using a voltage across terminals of an on-resistance of the MOS transistor (1-8th structure).

In addition, in the switching regulator having one of the 1-1st to 1-8th structures described above, it is preferred to adopt a structure in which when a ratio of the output voltage to the input voltage is a predetermined value or less, the first control circuit generates the step-down control signal according to current detected by the current detection unit, and when the ratio of the output voltage to the input voltage is not the predetermined value or less, the first control circuit generates the step-down control signal without depending on the current detected by the current detection unit (1-9th structure).

In addition, in the switching regulator having the 1-9th structure described above, it is preferred to adopt a structure in which the switching regulator further includes a first switch current detection unit arranged to detect current flowing in the first switch, and when the ratio of the output voltage to the input voltage is not the predetermined value or less, the first control circuit generates the step-down control signal according to current detected by the first switch current detection unit (1-10th structure).

Among switching regulators disclosed in this specification, the switching regulator having the first technical feature is a switching regulator arranged to generate an output voltage from an input voltage, which includes: a first switch having a first terminal connected to an application terminal of the input voltage; a second switch having a first terminal connected to a second terminal of the first switch and a second terminal connected to an application terminal of a predetermined voltage lower than the input voltage; a current detection unit arranged to detect current flowing in the second switch; an inductor having a first terminal connected to a connection node between the first switch and the second switch; a third switch having a first terminal connected to a second terminal of the inductor and a second terminal connected to the application terminal of the predetermined voltage; a fourth switch having a first terminal connected to a connection node between the inductor and the third switch and a second terminal connected to an application terminal of the output voltage; a first control circuit arranged to generate a step-down control signal for complementarily turning on/off the first switch and the second switch according to the output voltage; a second control circuit arranged to generate a step-up control signal for complementarily turning on/off the third switch and the fourth switch by setting an on-duty of the third switch independently of each of the output voltage and the input voltage in a step up/down mode. The first control circuit includes a slope voltage generation unit arranged to accumulate current information detected by the current detection unit, and to combine the accumulated current information with a ramp voltage generated by a ramp voltage generation unit so as to generate a slope voltage, and the first control circuit generates the step-down control signal according to the slope voltage (1-11th structure).

Among vehicles disclosed in this specification, a vehicle having a first technical feature includes the switching regulator having one of the 1-1st to 1-11th structures described above, and a battery arranged to supply power to the switching regulator (1-12th structure).

<Second Technical Feature>

Among switching regulators disclosed in this specification, a switching regulator according to one aspect having a second technical feature is a switching regulator arranged to generate an output voltage from an input voltage, which includes: a first switch having a first terminal connected to an application terminal of the input voltage; a second switch having a first terminal connected to a second terminal of the first switch and a second terminal connected to an application terminal of a predetermined voltage lower than the input voltage; an inductor having a first terminal connected to a connection node between the first switch and the second switch; a third switch having a first terminal connected to a second terminal of the inductor and a second terminal connected to the application terminal of the predetermined voltage; a fourth switch having a first terminal connected to a connection node between the inductor and the third switch and a second terminal connected to an application terminal of the output voltage; a first control circuit arranged to generate a step-down control signal for complementarily turning on/off the first switch and the second switch according to the output voltage; and a second control circuit arranged to generate a step-up control signal for complementarily turning on/off the third switch and the fourth switch by fixing an on-duty D ($0 \leq D \leq 1$) of the third switch to a fixed value D' ($0 < D' < 1$) in a step up/down mode. When switching from a step-down mode in which the second control circuit does not generate the step-up control signal to the step up/down mode, an on-duty of the first switch is temporarily increased in an initial stage of the step up/down mode (2-1st structure).

In addition, in the switching regulator having the 2-1st structure described above, it is preferred to adopt a structure in which the switching regulator further includes a current detection unit arranged to detect current flowing in the inductor, and the first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal. When switching from the step-down mode to the step up/down mode, an offset of the slope voltage is temporarily decreased in an initial stage of the step up/down mode (2-2th structure).

In addition, in the switching regulator having the 2-2th structure described above, it is preferred to adopt a structure in which the slope voltage generation unit sets the offset of the slope voltage to be larger as current detected by the current detection unit is larger, and when switching from the step-down mode to the step up/down mode, a detection gain of the current detection unit is temporarily decreased in an initial stage of the step up/down mode (2-3rd structure).

In addition, in the switching regulator having the 2-1st structure described above, it is preferred to adopt a structure in which the switching regulator further includes a current detection unit arranged to detect current flowing in the inductor, and the first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal. When switching from the step-down mode to the step up/down mode, a gradient of the slope voltage is temporarily decreased in an initial stage of the step up/down mode (2-4th structure).

Among switching regulators disclosed in this specification, a switching regulator according to another aspect having a second technical feature is a switching regulator arranged to generate an output voltage from an input voltage, which includes: a first switch having a first terminal connected to an application terminal of the input voltage; a second switch having a first terminal connected to a second terminal of the first switch and a second terminal connected to an application terminal of a predetermined voltage lower than the input voltage; an inductor having a first terminal connected to a connection node between the first switch and the second switch; a third switch having a first terminal connected to a second terminal of the inductor and a second terminal connected to the application terminal of the predetermined voltage; a fourth switch having a first terminal connected to a connection node between the inductor and the third switch and a second terminal connected to an application terminal of the output voltage; a first control circuit arranged to generate a step-down control signal for complementarily turning on/off the first switch and the second switch according to the output voltage; and a second control circuit arranged to generate a step-up control signal for complementarily turning on/off the third switch and the fourth switch by fixing an on-duty D ($0 \leq D \leq 1$) of the third switch to a fixed value D' ($0 < D' < 1$) in a step up/down mode. When switching from the step up/down mode to a step-down mode in which the second control circuit does not generate the step-up control signal, an on-duty of the first switch is temporarily decreased in an initial stage of the step-down mode (2-5th structure).

In addition, in the switching regulator having the 2-5th structure described above, it is preferred to adopt a structure in which the switching regulator further includes a current detection unit arranged to detect current flowing in the inductor, and the first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal. When switching from the step up/down mode to the step-down mode, an offset of the slope voltage is temporarily increased in an initial stage of the step-down mode (2-6th structure).

In addition, in the switching regulator having the 2-6th structure described above, it is preferred to adopt a structure in which the slope voltage generation unit sets the offset of the slope voltage to be larger as current detected by the current detection unit is larger, and when switching from the step-down mode to the step up/down mode, a detection gain of the current detection unit is temporarily increased in an initial stage of the step-down mode (2-7th structure).

In addition, in the switching regulator further having the 2-5th structure described above, it is preferred to adopt a structure in which the switching regulator further includes a current detection unit arranged to detect current flowing in the inductor, and the first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal. When switching from the step up/down mode to the step-down mode, a gradient of the slope voltage is temporarily increased in an initial stage of the step-down mode (2-8th structure).

Among switching regulators disclosed in this specification, a switching regulator according to one aspect having a second technical feature is a switching regulator arranged to generate an output voltage from an input voltage, which includes: a first switch having a first terminal connected to an application terminal of the input voltage; a second switch having a first terminal connected to a second terminal of the first switch and a second terminal connected to an application terminal of a predetermined voltage lower than the input voltage; a current detection unit arranged to detect current flowing in the second switch; an inductor having a first terminal connected to a connection node between the first switch and the second switch; a third switch having a first terminal connected to a second terminal of the inductor and a second terminal connected to the application terminal of the predetermined voltage; a fourth switch having a first terminal connected to a connection node between the inductor and the third switch and a second terminal connected to an application terminal of the output voltage; a first control circuit arranged to generate a step-down control signal for complementarily turning on/off the first switch and the second switch according to the output voltage; and a second control circuit arranged to generate a step-up control signal for complementarily turning on/off the third switch and the fourth switch by setting an on-duty of the third switch independently of each of the output voltage and the input voltage in the step up/down mode. When switching from a step-down mode in which the second control circuit does not generate the step-up control signal to the step up/down mode, an on-duty of the first switch is temporarily increased in an initial stage of the step up/down mode (2-9th structure).

Among switching regulators disclosed in this specification, a switching regulator according to another aspect having a second technical feature is a switching regulator arranged to generate an output voltage from an input voltage, which includes: a first switch having a first terminal connected to an application terminal of the input voltage; a second switch having a first terminal connected to a second terminal of the first switch and a second terminal connected to an application terminal of a predetermined voltage lower than the input voltage; a current detection unit arranged to detect current flowing in the second switch; an inductor having a first terminal connected to a connection node between the first switch and the second switch; a third switch having a first terminal connected to a second terminal of the inductor and a second terminal connected to the application terminal of the predetermined voltage; a fourth switch having a first terminal connected to a connection node between the inductor and the third switch and a second terminal connected to an application terminal of the output voltage; a first control circuit arranged to generate a step-down control signal for complementarily turning on/off the first switch and the second switch according to the output voltage; and a second control circuit arranged to generate a step-up control signal for complementarily turning on/off the third switch and the fourth switch by setting an on-duty of the third switch independently of each of the output voltage and the input voltage in the step up/down mode. When switching from the step up/down mode to a step-down mode in which the second control circuit does not generate the step-up control signal, an on-duty of the first switch is temporarily decreased in an initial stage of the step-down mode (2-10th structure).

Among vehicles disclosed in this specification, a vehicle having a second technical feature includes the switching regulator having one of the 2-1st to 2-10th structures described above, and a battery arranged to supply power to the switching regulator (2-11th structure).

<Third Technical Feature>

An integrated circuit package having a third technical feature disclosed in this specification includes a first external pin to which an input voltage is applied, a second external pin to which a predetermined voltage lower than the input voltage is applied, a third external pin to which a feedback voltage is applied, a first switch having a first terminal connected to the first external pin, a second switch having a first terminal connected to a second terminal of the first switch and a second terminal connected to the second external pin, a fourth external pin connected to a connection node between the first switch and the second switch, a first control circuit arranged to generate a step-down control signal for complementarily turning on/off the first switch and the second switch according to the feedback voltage, a second control circuit arranged to generate a pulse signal having an on-duty D (0≤D≤1) fixed to the fixed value D' (0<D'<1) in the step up/down mode, and a fifth external pin arranged to externally output the pulse signal in the step up/down mode (3-1st structure).

In addition, in the integrated circuit package having the 3-1st structure described above, it is preferred to adopt a structure in which the second control circuit generates a high level signal in a step-down mode, and the fifth external pin externally outputs the high level signal in the step-down mode (3-2nd structure).

In addition, in the integrated circuit package having the 3-1st or 3-2nd structure described above, it is preferred to adopt a structure in which the fixed value D' is 0.7 or less (3-3rd structure).

In addition, in the integrated circuit package having one of the 3-1st to 3-3rd structures described above, it is preferred to adopt a structure in which the first control circuit and the second control circuit share an oscillator, and the first control circuit generates the step-down control signal based on an output signal of the oscillator, while the second control circuit generates the pulse signal based on an output signal of the oscillator (3-4th structure).

In addition, in the integrated circuit package having one of the 3-1 st to 3-4th structures described above, it is preferred to adopt a structure in which the first control circuit includes an error signal generation circuit arranged to generate an error signal obtained by giving a gain to a difference between the feedback voltage and a predetermined reference voltage, and the error signal generation circuit sets a larger gain in the step up/down mode than in the step-down mode (3-5th structure).

In addition, in the integrated circuit package having the 3-5th structure described above, it is preferred to adopt a structure in which the multiplication value of a value obtained by subtracting the fixed value D' from 1 and the gain in the step up/down mode is the same as the gain in the step-down mode (3-6th structure).

In addition, in the integrated circuit package having one of the 3-1st to 3-6th structures described above, it is preferred to adopt a structure in which the integrated circuit package includes an overcurrent protection circuit arranged to monitor whether or not current flowing in the first switch has reached a predetermined overcurrent detection threshold value, and to issue an instruction to suppress the current to the first control circuit when an overcurrent state of the current is detected, and the overcurrent protection circuit sets the predetermined overcurrent detection threshold value to be larger in the step up/down mode than in the step-down mode (3-7th structure).

In addition, in the integrated circuit package having the 3-7th structure described above, it is preferred to adopt a structure in which the multiplication value of a value obtained by subtracting the fixed value D' from 1 and the predetermined overcurrent detection threshold value in the step up/down mode is the same as the predetermined overcurrent detection threshold value in the step-down mode (3-8th structure).

In addition, in the integrated circuit package having one of the 3-1 st to 3-8th structures described above, it is preferred to adopt a structure in which a plurality of fixed values D' are set, and an arbitrary one of them can be selected (3-9th structure).

Among integrated circuit packages disclosed in this specification, an integrated circuit package having a third technical feature according to one aspect includes a first external pin to which an input voltage is applied, a second external pin to which a predetermined voltage lower than the input voltage is applied, a third external pin to which a feedback voltage is applied, a first switch having a first terminal connected to the first external pin, a second switch having a first terminal connected to a second terminal of the first switch and a second terminal connected to the second external pin, a fourth external pin connected to a connection node between the first switch and the second switch, a first control circuit arranged to generate a step-down control signal for complementarily turning on/off the first switch and the second switch according to the feedback voltage, a second control circuit arranged to generate a pulse signal having an on-duty D (0≤D≤1) set independently of each of the feedback voltage and the input voltage in the step up/down mode, and a fifth external pin arranged to externally output the pulse signal in the step up/down mode (3-10th structure).

Among integrated circuit packages disclosed in this specification, an integrated circuit package having a third technical feature according to another aspect includes an external pin to which a feedback voltage is applied, a first control circuit arranged to generate a step-down control signal according to the feedback voltage, the step-down control signal being for complementarily turning on/off a first switch and a second switch, the first switch having a first terminal connected to an application terminal of a first voltage, and the second switch having a first terminal connected to a second terminal of the first switch and a second terminal connected to an application terminal of a second voltage lower than the first voltage, a second control circuit arranged to generate a pulse signal having an on-duty D (0≤D≤1) fixed to the fixed value D' (0<D'<1) in the step up/down mode, and another external pin arranged to externally output the pulse signal in the step up/down mode (3-11th structure).

<Fourth Technical Feature>

Among switching regulators disclosed in this specification, a switching regulator having a fourth technical feature according to one aspect is a switching regulator arranged to generate an output voltage from an input voltage, which includes: a first switch having a first terminal connected to an application terminal of the input voltage; a second switch having a first terminal connected to a second terminal of the first switch and a second terminal connected to an application terminal of a predetermined voltage lower than the input voltage; an inductor having a first terminal connected to a connection node between the first switch and the second switch, a third switch having a first terminal connected to a second terminal of the inductor and a second terminal connected to the application terminal of the predetermined voltage; a fourth switch having a first terminal connected to a connection node between the inductor and the third switch and a second terminal connected to an application terminal of the output voltage; a first control circuit arranged to generate a step-down control signal for complementarily turning on/off the first switch and the second switch according to the output voltage; and a second control circuit arranged to generate a step-up control signal for complementarily turning on/off the third switch and the fourth switch by fixing an on-duty D (0≤D≤1) of the third switch to a fixed value D' (0<D'<1) in a step up/down mode. It is determined whether to operate in the step up/down mode or in the step-down mode in which the step-up control signal is not generated, according to a mode designating signal. The first control circuit includes an error signal generation circuit arranged to generate an error signal obtained by giving a gain to a difference between a feedback voltage according to the output voltage and a predetermined reference voltage. The error signal generation circuit sets the gain based on the mode designating signal, in such a manner that the gain in the step up/down mode is larger than the gain in the step-down mode (4-1st structure).

In addition, in the switching regulator having the 4-1st structure described above, it is preferred to adopt a structure in which the multiplication value of a value obtained by subtracting the fixed value D' from 1 and the gain in the step up/down mode is substantially the same as the gain in the step-down mode (4-2nd structure).

In addition, in the switching regulator having the 4-1st or 4-2nd structure described above, it is preferred to adopt a structure in which drive current of the error signal generation circuit is adjusted according to the mode designating signal (4-3rd structure).

Among switching regulators disclosed in this specification, a switching regulator having a fourth technical feature according to another aspect is a switching regulator arranged to generate an output voltage from an input voltage, which includes: a first switch having a first terminal connected to an application terminal of the input voltage; a second switch having a first terminal connected to a second terminal of the first switch and a second terminal connected to an application terminal of a predetermined voltage lower than the input voltage; an inductor having a first terminal connected to a connection node between the first switch and the second switch; a third switch having a first terminal connected to a second terminal of the inductor and a second terminal connected to the application terminal of the predetermined voltage; a fourth switch having a first terminal connected to a connection node between the inductor and the third switch and a second terminal connected to an application terminal of the output voltage; a first control circuit arranged to generate a step-down control signal for complementarily turning on/off the first switch and the second switch according to the output voltage; a second control circuit arranged to generate a step-up control signal for complementarily turning on/off the third switch and the fourth switch by fixing an on-duty D (0≤D≤1) of the third switch to a fixed value D' (0<D'<1) in a step up/down mode; and a current detection unit arranged to detect current flowing in the inductor. It is determined whether to operate in the step up/down mode or in the step-down mode in which the step-up control signal is not generated, according to a mode designating signal. The first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal. The current detection unit sets a detection gain based on the mode designating signal, in such a manner that the detection gain in the step-down mode is larger than the detection gain in the step up/down mode (4-4th structure).

In addition, in the switching regulator having the 4-4th structure described above, it is preferred to adopt a structure in which the multiplication value of a value obtained by subtracting the fixed value D' from 1 and the detection gain in the step-down mode is substantially the same as the detection gain in the step up/down mode (4-5th structure).

In addition, in the switching regulator having the 4-4th or 4-5th structure described above, it is preferred to adopt a structure in which the slope voltage generation unit sets an offset of the slope voltage to be larger as the current detected by the current detection unit is larger (4-6th structure).

In addition, in the switching regulator having the 4-6th structure described above, it is preferred to adopt a structure in which the current detection unit is a voltage-to-current conversion circuit arranged to convert a voltage corresponding to current flowing in the second switch into current, and the slope voltage generation unit includes a capacitor arranged to be charged by output current of the voltage-to-current conversion circuit (4-7th structure).

Among switching regulators disclosed in this specification, a switching regulator having a fourth technical feature according to one aspect is a switching regulator arranged to generate an output voltage from an input voltage, which includes: a first switch having a first terminal connected to an application terminal of the input voltage; a second switch having a first terminal connected to a second terminal of the first switch and a second terminal connected to an application terminal of a predetermined voltage lower than the input voltage; an inductor having a first terminal connected to a connection node between the first switch and the second switch; a third switch having a first terminal connected to a second terminal of the inductor and a second terminal connected to the application terminal of the predetermined voltage; a fourth switch having a first terminal connected to a connection node between the inductor and the third switch and a second terminal connected to an application terminal of the output voltage; a first control circuit arranged to generate a step-down control signal for complementarily turning on/off the first switch and the second switch according to the output voltage; and a second control circuit arranged to generate a step-up control signal for complementarily turning on/off the third switch and the fourth switch by setting an on-duty of the third switch independently of each of the output voltage and the input voltage in the step up/down mode. It is determined whether to operate in the step up/down mode or in the step-down mode in which the step-up control signal is not generated, according to a mode designating signal. The first control circuit includes an error signal generation circuit arranged to generate an error signal obtained by giving a gain to a difference between a feedback voltage according to the output voltage and a predetermined reference voltage. The error signal generation circuit sets the gain based on the mode designating signal, in such a manner that the gain in the step up/down mode is larger than the gain in the step-down mode (4-8th structure).

Among switching regulators disclosed in this specification, a switching regulator having a fourth technical feature according to another aspect is a switching regulator arranged to generate an output voltage from an input voltage, which includes: a first switch having a first terminal connected to an application terminal of the input voltage; a second switch having a first terminal connected to a second terminal of the first switch and a second terminal connected to an application terminal of a predetermined voltage lower than the input voltage; an inductor having a first terminal connected to a connection node between the first switch and the second switch, a third switch having a first terminal connected to a second terminal of the inductor and a second terminal connected to the application terminal of the predetermined voltage; a fourth switch having a first terminal connected to a connection node between the inductor and the third switch and a second terminal connected to an application terminal of the output voltage; a first control circuit arranged to generate a step-down control signal for complementarily turning on/off the first switch and the second switch according to the output voltage; a second control circuit arranged to generate a step-up control signal for complementarily turning on/off the third switch and the fourth switch by setting an on-duty of the third switch independently of each of the output voltage and the input voltage in the step up/down mode; and a current detection unit arranged to detect current flowing in the inductor. It is determined whether to operate in the step up/down mode or in the step-down mode in which the step-up control signal is not generated, according to a mode designating signal. The first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal. The current detection unit sets a detection gain based on the mode designating signal, in such a manner that the detection gain in the step-down mode is larger than the detection gain in the step up/down mode (4-9th structure).

Among vehicles disclosed in this specification, a vehicle having a fourth technical feature includes the switching regulator having one of the 4-1st to 4-9th structures described above, and a battery arranged to supply power to the switching regulator (4-10th structure).

Advantageous Effects of the Invention

Among switching regulators disclosed in this specification, the switching regulator having the first technical feature can realize a step up/down switching regulator, in which current mode control is easy, right half-plane zero characteristic can be prevented from appearing while suppressing cost increase, and response characteristic similar to step-down characteristic is shown.

Among switching regulators disclosed in this specification, the switching regulator having the second technical feature can realize a step up/down switching regulator, in which output fluctuation when operation mode is switched can be reduced, right half-plane zero characteristic can be prevented from appearing while suppressing cost increase, and response characteristic similar to step-down characteristic is shown.

Among integrated circuit packages disclosed in this specification, the integrated circuit package having the third technical feature can realize an integrated circuit package, which can be used as a component of the step up/down switching regulator in which right half-plane zero characteristic can be prevented from appearing while suppressing cost increase, response characteristic similar to step-down characteristic is shown, and which can also be used as a component of the step-down switching regulator.

Among switching regulators disclosed in this specification, the switching regulator having the fourth technical feature can realize a step up/down switching regulator, in which right half-plane zero characteristic can be prevented from appearing while suppressing cost increase, response characteristic similar to step-down characteristic is shown, and a decrease in gain of a control system can be suppressed in a step up/down mode.

DESCRIPTION OF EMBODIMENTS

<Overall Structure (First Embodiment)>

Figure 1:
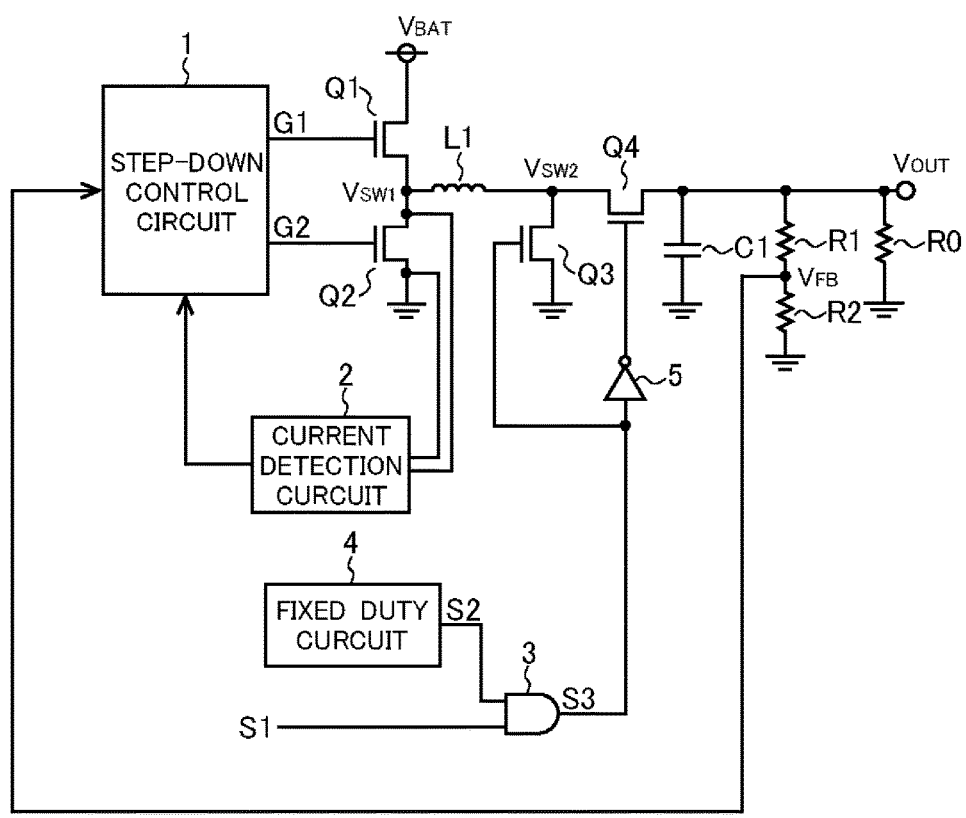
FIG. 1 is a diagram showing an overall structure example of a switching regulator of a first embodiment.

FIG. 1 is a diagram showing an overall structure example of a first embodiment of the switching regulator. A switching regulator 101 of this structure example is a step up/down switching regulator and includes a step-down control circuit 1, MOS transistors Q1 to Q4, an inductor L1, an output capacitor C1, an output resistor R0, voltage dividing resistors R1 and R2, a current detection circuit 2, an AND gate 3, a fixed duty circuit 4, and a NOT gate 5.

The MOS transistor Q1 is an N-channel MOS transistor and is an example of a switch that connects/disconnects a current path from an input voltage application terminal applied with a battery voltage $V_{BAT}$ as an input voltage to one terminal of the inductor L1. The drain of the MOS transistor Q1 is connected to the input voltage application terminal applied with the battery voltage $V_{BAT}$. The source of the MOS transistor Q1 is connected to the one terminal of the inductor L1 and the drain of the MOS transistor Q2.

The MOS transistor Q2 is an N-channel MOS transistor and is an example of a switch that connects/disconnects a current path from a ground terminal to the one terminal of the inductor L1. The drain of the MOS transistor Q2 is connected to the one terminal of the inductor L1 and the source of the MOS transistor Q1 as described above. The source of the MOS transistor Q2 is connected to the ground terminal. Note that a diode may be used instead of the MOS transistor Q2.

The MOS transistor Q3 is an N-channel MOS transistor and is an example of a switch that connects/disconnects a current path from the other terminal of the inductor L1 to the ground terminal. The drain of the MOS transistor Q3 is connected to the other terminal of the inductor L1. The source of the MOS transistor Q3 is connected to the ground terminal.

The MOS transistor Q4 is an N-channel MOS transistor and is an example of a switch that connects/disconnects a current path from the other terminal of the inductor L1 to an output voltage application terminal applied with an output voltage $V_{OUT}$. The drain of the MOS transistor Q4 is connected to the other terminal of the inductor L1 and the drain of the MOS transistor Q3. The source of the MOS transistor Q4 is connected to one terminal of the output capacitor C1 and the output voltage application terminal applied with the output voltage $V_{OUT}$. The other terminal of the output capacitor C1 is connected to the ground. Note that a diode can be used instead of the MOS transistor Q4.

The output capacitor C1 is a smoothing capacitor that reduces ripple of the output voltage $V_{OUT}$. Further, phase compensation of the output voltage $V_{OUT}$ is performed by a phase compensation circuit constituted of the output capacitor C1 and the output resistor R0.

The voltage dividing resistors R1 and R2 generates a feedback voltage $V_{FB}$ by dividing the output voltage $V_{OUT}$ and supplies the feedback voltage $V_{FB}$ to the step-down control circuit 1.

The step-down control circuit 1 generates a gate signal G1 of the MOS transistor Q1 and a gate signal G2 of the MOS transistor Q2 for complementarily turning on/off the MOS transistors Q1 and Q2 according to the feedback voltage $V_{FB}$, so as to supply the gate signals G1 and G2 to the gates of the MOS transistors Q1 and Q2. Note that it is preferred to set a dead time during which both the MOS transistor Q1 and the MOS transistor Q2 are turned off when the MOS transistor Q1 and the MOS transistor Q2 are switched on/off.

The current detection circuit 2 detects current flowing in the MOS transistor Q2 based on a drain-source voltage of the MOS transistor Q2 in an on-state, i.e. a voltage across terminals of an on-resistance of the MOS transistor Q2, so as to output a result of the detection to the step-down control circuit 1.

The AND gate 3 outputs a signal S3, which is a logical multiplication of a mode designating signal S1 and a pulse signal S2 having a fixed on-duty output from the fixed duty circuit 4. The mode designating signal S1 becomes a signal designating a step-down mode when being low level and becomes a signal designating a step up/down mode when being high level. The switching regulator 101 may have a structure including a circuit (not shown) that generates the mode designating signal S1, or the switching regulator 101 may have a structure to receive the mode designating signal S1 from the outside.

The output signal S3 of the AND gate 3 is supplied to the gate of the MOS transistor Q3 and is supplied to the gate of the MOS transistor Q4 after being logically inverted by the NOT gate 5. Note that it is preferred to use a dead time generation circuit instead of the NOT gate 5 and to set a dead time during which both the MOS transistor Q3 and the MOS transistor Q4 are turned off when the MOS transistor Q3 and the MOS transistor Q4 are switched on/off.

<Structural Example of Step-Down Control Circuit>

Figure 2A:
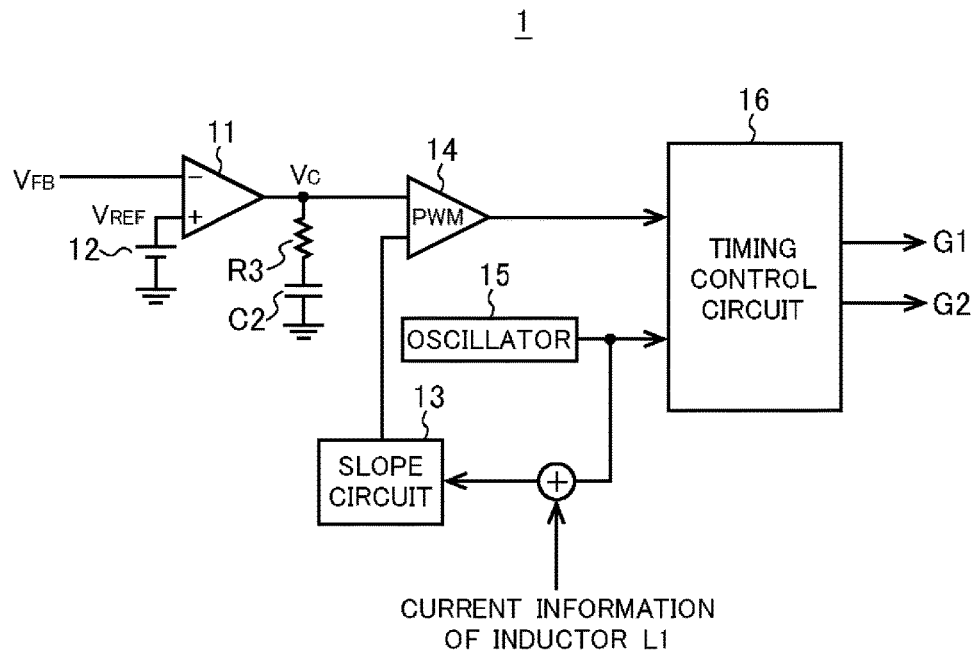
FIG. 2A is a diagram showing a structure example of a step-down control circuit in the first embodiment.

FIG. 2A is a diagram showing a structure example of the step-down control circuit 1. In the example shown in FIG. 2A, the step-down control circuit 1 is constituted of an error amplifier 11, a reference voltage source 12, a resistor R3, a capacitor C2, a slope circuit 13, a comparator 14, an oscillator 15, and a timing control circuit 16.

The error amplifier 11 generates an error signal corresponding to a difference between the feedback voltage $V_{FB}$ and a reference voltage $V_{REF}$ output from the reference voltage source 3. Phase compensation of the error signal is performed by a phase compensation circuit constituted of the resistor R3 and the capacitor C2.

The slope circuit 13 is controlled based on a clock signal having a predetermined frequency output from the oscillator 15, receives an output of the current detection circuit 2 (see FIG. 1) so as to have current information of the inductor L1, and generates a slope voltage on which current information of the inductor L1 is reflected, so as to output the slope voltage. In this way, the switching regulator 101 is a so-called current mode control type switching regulator.

The comparator 14 compares the phase-compensated error signal with the output voltage of the slope circuit 13 so as to generate a reset signal as a comparison signal. The reset signal becomes a PWM signal because the slope voltage generated by the slope circuit 13 has a fixed period.

The oscillator 15 outputs a clock signal having a predetermined frequency to the slope circuit 13 as described above, and it outputs the clock signal having a predetermined frequency to the timing control circuit 16.

The timing control circuit 16 switches the gate signal G1 from low level to high level when a set signal (the clock signal output from the oscillator 15) is switched from high level to low level, and it switches the gate signal G1 from high level to low level when the reset signal is switched from low level to high level.

Figure 2B:
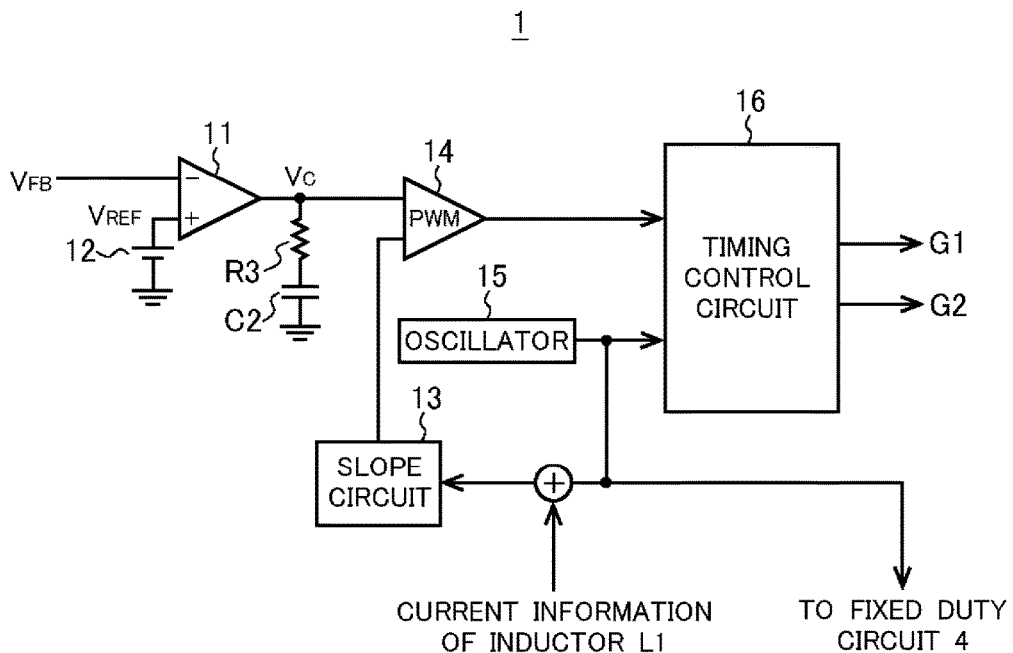
FIG. 2B is a diagram showing another structure example of the step-down control circuit in the first embodiment.

FIG. 2B is a diagram showing another structure example of the step-down control circuit 1. In the example shown in FIG. 2B, the oscillator 15 outputs the clock signal having a predetermined frequency not only to the slope circuit 13 and the timing control circuit 16 but also to the fixed duty circuit 4. In this case, the fixed duty circuit 4 generates the pulse signal S2 based on the clock signal having a predetermined frequency output from the oscillator 15. In contrast, in the example shown in FIG. 2A described above, the fixed duty circuit 4 is configured to include an oscillator different from that of the step-down control circuit 1.

<Example of Generating Slope Voltage>

Figure 3:
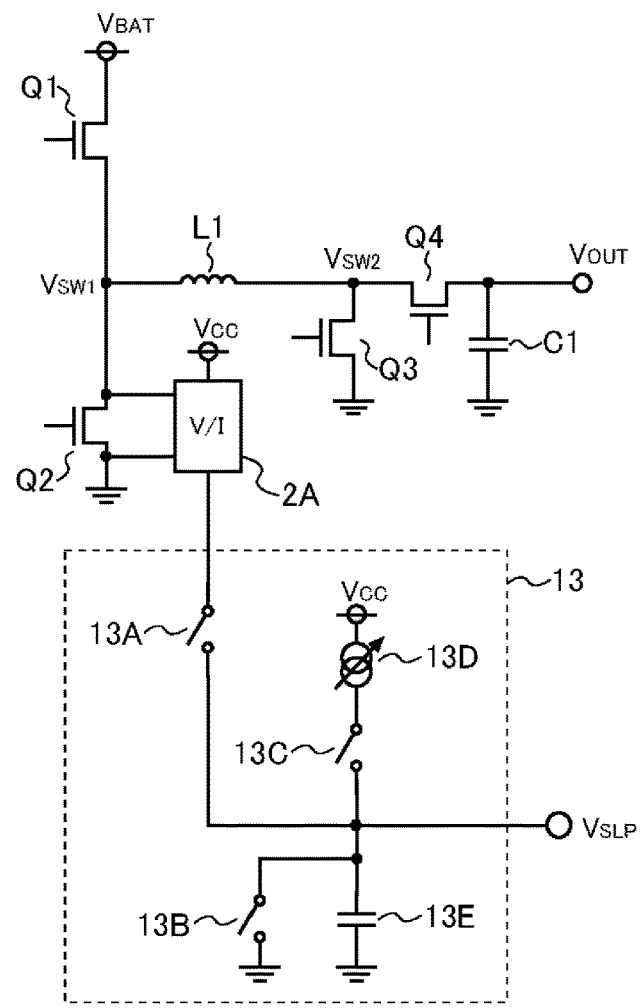
FIG. 3 is a diagram showing a structure example of a current detection circuit and a slope circuit.

FIG. 3 is a diagram showing one structure example of the current detection circuit 2 and the slope circuit 13. In the example shown in FIG. 3, the current detection circuit 2 is constituted of a voltage-to-current conversion circuit 2A. Further in the example shown in FIG. 3, the slope circuit 13 is constituted of switches 13A to 13C, a constant current source 13D, and a capacitor 13E. Note that it is desired that a value of the constant current output from the constant current source 13D be adjustable.

The voltage-to-current conversion circuit 2A and the constant current source 13D are circuits driven by an internal power supply voltage $V_C$ generated in the step-down control circuit 1 as an integrated circuit (IC).

The voltage-to-current conversion circuit 2A converts the drain-source voltage of the MOS transistor Q2 into current and outputs the current. The capacitor 13E is charged by the output current of the voltage-to-current conversion circuit 2A when the switch 13A is turned on, while it is charged by the output current of the constant current source 13D when the switch 13C is turned on. On the other hand, the capacitor 13E is discharged when the switch 13B is turned on. The charging voltage of the capacitor 13E becomes a slope voltage $V_{SLP}$.

Figure 4:
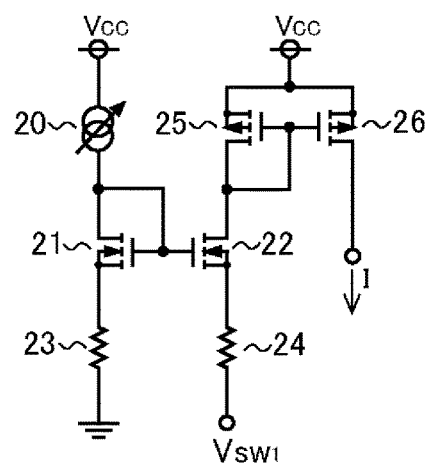
FIG. 4 is a diagram showing a structure example of a voltage-to-current conversion circuit.

FIG. 4 is a diagram showing a structure example of the voltage-to-current conversion circuit 2A. In the voltage-to-current conversion circuit shown in FIG. 4, a current source 20 supplies current to a current mirror circuit constituted of N-channel MOS transistors 21 and 22. When a mirror ratio of the current mirror circuit constituted of the N-channel MOS transistors 21 and 22 is 1:1, current flowing in a resistor 24 has a value obtained by dividing a first switch voltage $V_{SW1}$ by a difference ($R_{23}-R_{24}$) between a resistance $R_{23}$ of a resistor 23 and a resistance $R_{24}$ of the resistor 24. Then, a current mirror circuit constituted of P-channel MOS transistors 25 and 26 outputs current corresponding to the current flowing in the resistor 24 (current corresponding to the first switch voltage $V_{SW1}$ as an input voltage of the voltage-to-current conversion circuit 2A) as the output current of the voltage-to-current conversion circuit 2A.

Figure 5:
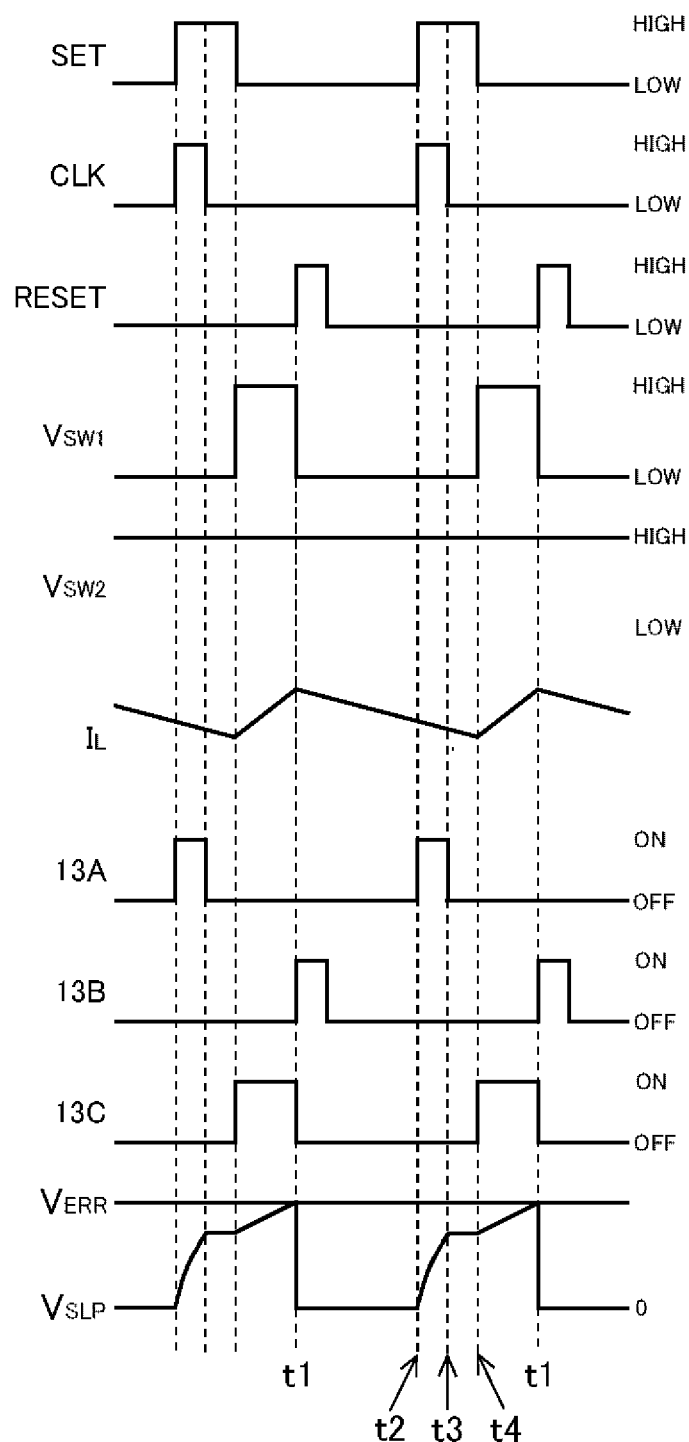
FIG. 5 is a timing chart showing an operation example of the switching regulator of FIG. 1 in a step-down mode.
Figure 6:
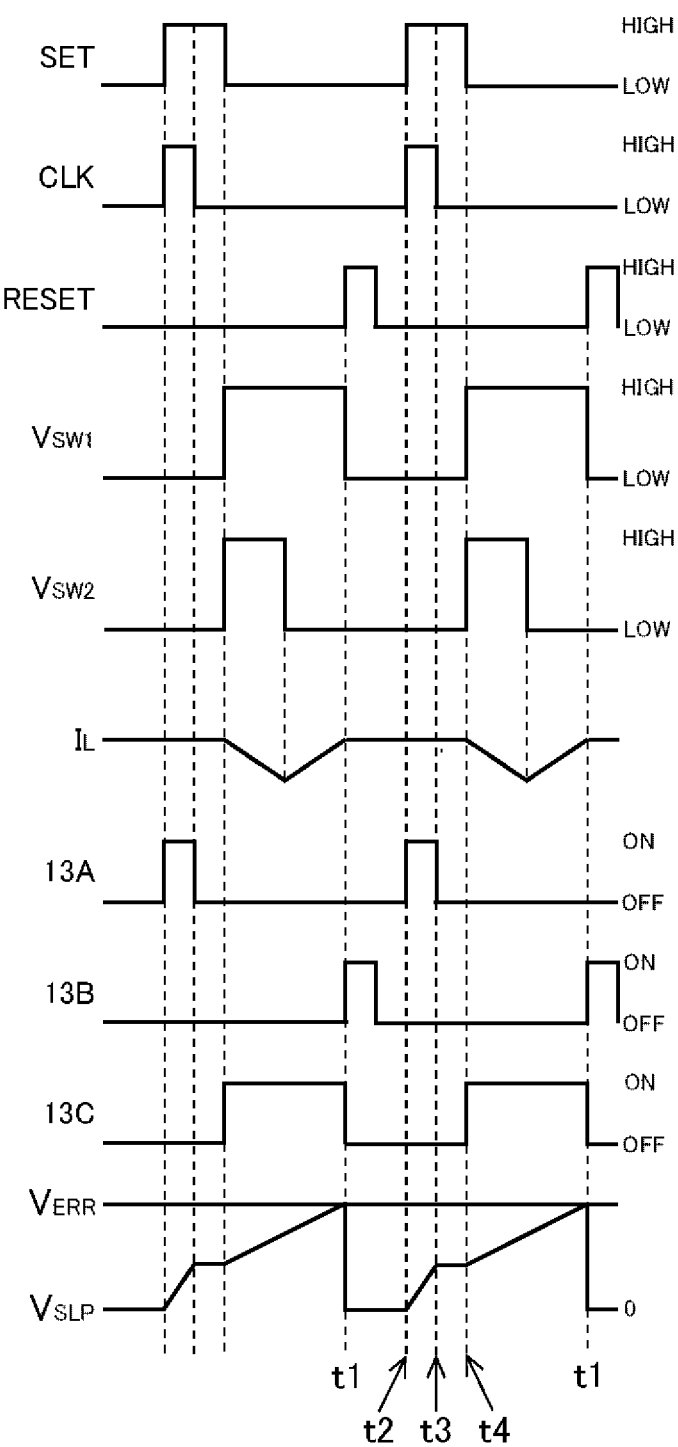
FIG. 6 is a timing chart showing an operation example of the switching regulator of FIG. 1 in a case where a battery voltage is lower than an output voltage in a step up/down mode.
Figure 7:
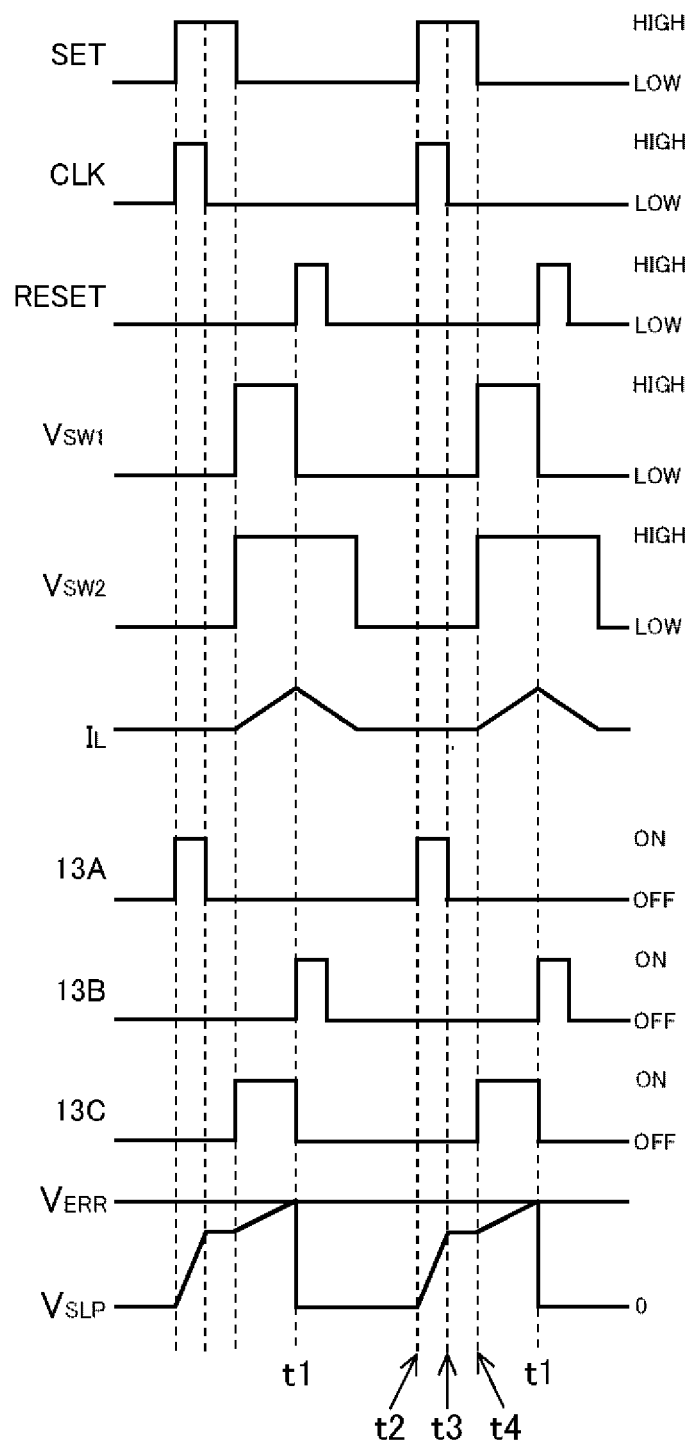
FIG. 7 is a timing chart showing an operation example of the switching regulator of FIG. 1 in the case where the battery voltage is higher than an output voltage in the step up/down mode.

FIG. 5 is a timing chart showing an operation example of the switching regulator 101 in the step-down mode. FIG. 6 is a timing chart showing an operation example of the switching regulator 101 in a case where the battery voltage $V_{BAT}$ is lower than the output voltage $V_{OUT}$ in the step up/down mode. FIG. 7 is a timing chart showing an operation example of the switching regulator 101 in a case where the battery voltage $V_{BAT}$ is higher than the output voltage $V_{OUT}$ in the step up/down mode.

In the examples shown in FIGS. 5 to 7, the timing control circuit 16 switches the gate signal G1 from low level to high level when a set signal SET is switched from high level to low level, while it switches the gate signal G1 from high level to low level when a reset signal RESET is switched from low level to high level.

In addition, based on the set signal SET, the timing control circuit 16 generates an internal clock signal CLK inside, which is switched from low level to high level when the set signal SET is switched from low level to high level and has a high level period shorter than a high level period of the set signal SET. Note that each high level period of the internal clock signal CLK is a constant time during which current feedback is performed. Note that it is preferred to adjust each high level period of the internal clock signal CLK so that the internal clock signal CLK is switched from high level to low level before starting the dead time set just after the MOS transistor Q2 is switched from on to off.

Furthermore, the timing control circuit 16 forcibly sets the gate signal G1 to low level and sets the gate signal G2 to high level, regardless of a level transition state of the reset signal RESET, when the internal clock signal CLK is switched from low level to high level. In this way, the current feedback can be securely started when the internal clock signal CLK is switched from low level to high level.

The slope circuit 13 switches on/off of the switches 13A to 13C according to an instruction from the timing control circuit 16.

When the reset signal RESET is switched from low level to high level (at timing t1), the slope circuit 13 maintains off-state of the switch 13A, switches the switch 13B from off to on, and switches the switch 13C from on to off. In this way, the capacitor 13E is discharged so that the slope voltage $V_{SLP}$ as the charging voltage of the capacitor 13E becomes 0.

Then, after the slope circuit 13 switches the switch 13B from on to off so as to finish discharging of the capacitor 13E, when the internal clock signal CLK is switched from low level to high level (at timing t2), the slope circuit 13 switches the switch 13A from off to on.

Next, when the internal clock signal CLK is switched from high level to low level (at timing t3), the slope circuit 13 switches the switch 13A from on to off.

During a period from timing t2 to timing t3, the switch 13A connects a current path from the voltage-to-current conversion circuit 2A to the capacitor 13E, and hence information of current flowing in the MOS transistor Q2 is accumulated in a form of the charging voltage of the capacitor 13E.

Next, when the set signal SET is switched from high level to low level (at timing t4), the slope circuit 13 switches the switch 13C from off to on. During a period from timing t4 to next timing t1, the output current of the constant current source 13D charges the capacitor 13E. In this way, the slope voltage $V_{SLP}$ as the charging voltage of the capacitor 13E becomes a voltage obtained by superimposing a ramp voltage (RAMP) increasing at a constant increase rate corresponding to the output current of the constant current source 13D (a constant gradient corresponding to the output current of the constant current source 13D) on an offset voltage on which the information of current flowing in the MOS transistor Q2 is reflected. In other words, the constant current source 13D and the capacitor 13E are an example of a ramp voltage generation unit that generates a ramp voltage. Further in the circuit structure example shown in FIG. 3, the capacitor 13E combines the ramp voltage with the information of current flowing in the MOS transistor Q2 so as to generate the slope voltage $V_{SLP}$. Then, the slope voltage $V_{SLP}$ as the charging voltage of the capacitor 13E becomes an output signal of the slope circuit 13.

Note that it may adopt a structure in which the internal clock signal CLK is not generated, and the switch 13A is switched from on to off when the set signal SET is switched from high level to low level.

According to the method of generating the slope voltage $V_{SLP}$ described above, current information of the inductor L1 is reflected on the offset voltage of the slope voltage $V_{SLP}$, and hence the gradient of the slope voltage $V_{SLP}$ does not depend on the gradient of current of the inductor L1. In the current mode control, it is sufficient that information about average current of the inductor L1 can be fed back, and therefore it is not always necessary to feed back the gradient of current of the inductor L1. Thus, by the method of generating the slope voltage $V_{SLP}$ described above, regardless of the gradient of current of the inductor L1, the gradient of the slope voltage $V_{SLP}$ can maintain its linearity, so that the current mode control can be easily performed.

According to the method of generating the slope voltage $V_{SLP}$ described above, the timing when the MOS transistor Q1 is switched from off to on (timing when the first switch voltage $V_{SW1}$ is switched from low level to high level) is the same as the timing when the MOS transistor Q3 is switched from on to off (timing when a second switch voltage $V_{SW2}$ is switched from low level to high level). In this way, the gradient of current of the inductor L1 during the period while current information of the inductor L1 is being fetched (the period from timing t2 to timing t3) can be flattened. In this way, the fed-back information about average current of the inductor L1 does not depend on the gradient of current of the inductor L1, and hence the information about average current of the inductor L1 can be more securely fed back.

Hereinafter, as a comparative example, a case is described in which current flowing in the MOS transistor Q1 is detected so that the current mode control is performed.

Figure 8:
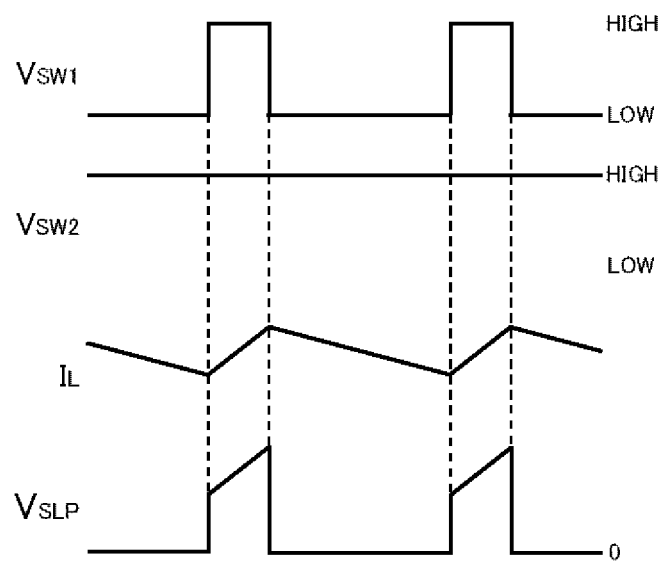
FIG. 8 is a timing chart showing an operation example of the switching regulator according to a comparative example in the step-down mode.
Figure 9:
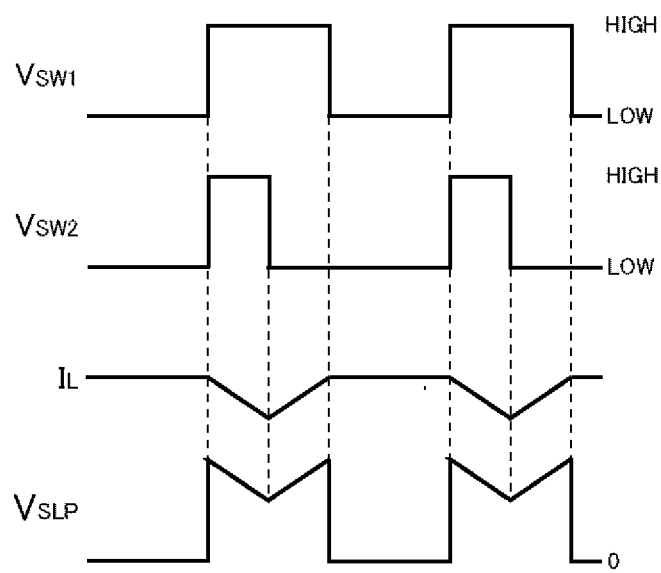
FIG. 9 is a timing chart showing an operation example of the switching regulator according to a comparative example in the case where the battery voltage is lower than an output voltage in the step up/down mode.
Figure 10:
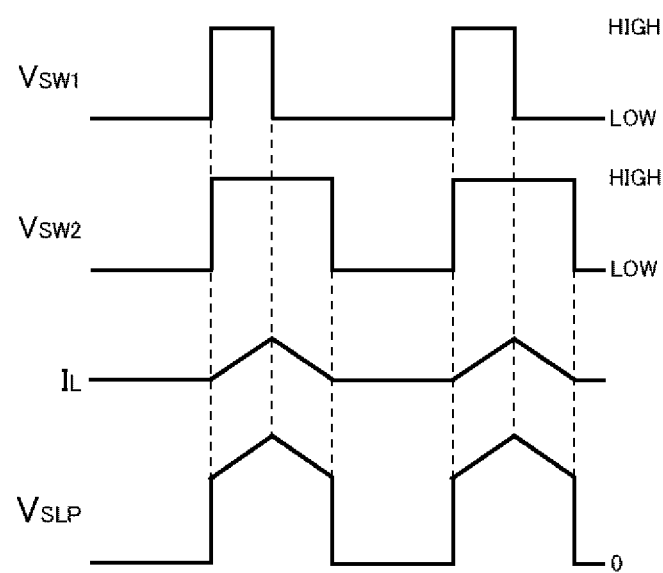
FIG. 10 is a timing chart showing an operation example of the switching regulator according to a comparative example in the case where the battery voltage is higher than an output voltage in the step up/down mode.

FIG. 8 is a timing chart showing an operation example of the switching regulator in the step-down mode according to the comparative example. FIG. 9 is a timing chart showing an operation example of the switching regulator according to the comparative example in a case where the battery voltage $V_{BAT}$ is lower than the output voltage $V_{OUT}$ in the step up/down mode. FIG. 10 is a timing chart showing an operation example of the switching regulator according to the comparative example in a case where the battery voltage $V_{BAT}$ is higher than the output voltage $V_{OUT}$ in the step up/down mode.

In the comparative example, the gradient of current of the inductor L1 appears in the gradient of the slope voltage $V_{SLP}$ as it is. In the step-down mode, the gradient of the slope voltage $V_{SLP}$ has linearity, and hence the current mode control is not difficult.

However, in the step up/down mode, because the gradient of the slope voltage $V_{SLP}$ does not have linearity, it is difficult to raise the reset signal at a desired timing based on the slope voltage $V_{SLP}$, and hence the current mode control becomes difficult.

As being clear from the above description, the switching regulator 101 can perform the current mode control more easily than the switching regulator according to the comparative example.

<Operation Mode>

As an example of switching the operation mode, a case is described in which the mode designating signal S1 is set to high level when an on-duty of the MOS transistor Q1 is a threshold value TH or more, while the mode designating signal S1 is set to low level when the on-duty of the MOS transistor Q1 is lower than the threshold value TH.

Figure 11:
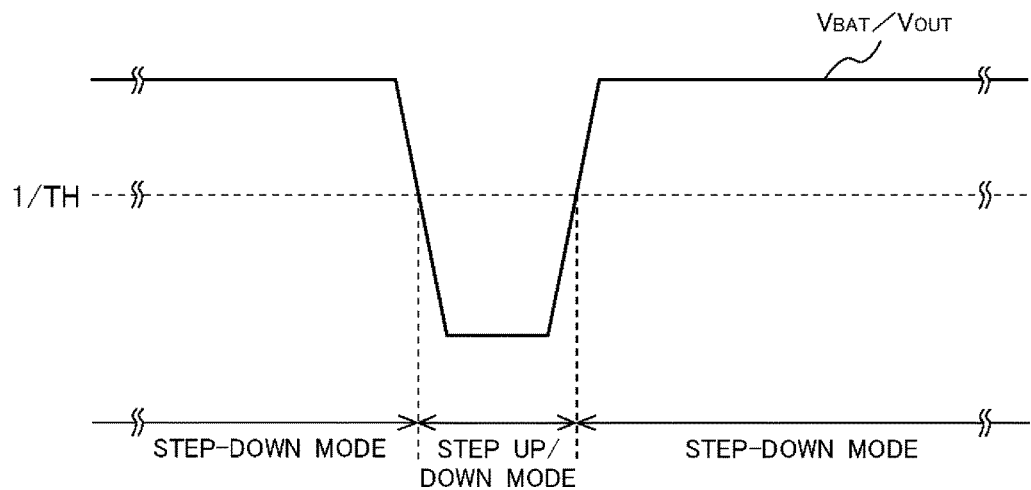
FIG. 11 is a diagram showing a schematic waveform of a ratio of the battery voltage to the output voltage.

When a ratio of the battery voltage $V_{BAT}$ to the output voltage $V_{OUT}$ is more than the inverse of the threshold value TH, the switching regulator 101 operates in the step-down mode (see FIG. 11). In the step-down mode, the step-down control circuit 1 controls on/off of the MOS transistors Q1 and Q2 according to the feedback voltage $V_{FB}$, and because the mode designating signal S1 is at low level, the MOS transistor Q3 is kept in off-state, while the MOS transistor Q4 is kept in on-state.

In addition, transfer characteristic of the entire switching regulator 101 in the step-down mode is expressed by the following equation (3).

[Mathematical 3]

$$\frac{\Delta V_{OUT}}{\Delta V_C} = \frac{R}{R_S} \cdot \frac{1}{1+R\cdot C\cdot s} \qquad (3)$$

$V_C$: output voltage of error amplifier 11
R: resistance of output resistor R0
$R_S$: current sense gain
C: capacitance of output capacitor C1

On the other hand, when the ratio of the battery voltage $V_{BAT}$ to the output voltage $V_{OUT}$ is lower than or equal to the inverse of threshold value TH, the switching regulator 101 operates in the step up/down mode (see FIG. 11). In the step up/down mode, the step-down control circuit 1 controls on/off of the MOS transistors Q1 and Q2 according to the feedback voltage $V_{FB}$, and because the mode designating signal S1 is at high level, the MOS transistors Q3 and Q4 are complementarily turned on/off in a state where an on-duty D (0≤D≤1) of the MOS transistor Q3 is fixed to a fixed value D' (0<D'<1). Note that in the step up/down mode, the on-duty of the MOS transistor Q3 is set independently of each of the output voltage $V_{OUT}$ and the battery voltage $V_{BAT}$.

It is preferred to set the fixed value D' to 0.7 or smaller. In this way, a fluctuation of the output voltage $V_{OUT}$ can be sufficiently suppressed in the step up/down mode. In addition, considering various variations and a margin of 10%, even if the battery voltage $V_{BAT}$ is reduced to 2 (V), the output voltage $V_{OUT}$ can be secured to be 5 (V). In other words, the value of 0.7 is derived from 0.1+(5 (V)−2 (V))/5 (V).

In addition, the transfer characteristic of the entire switching regulator 101 in the step up/down mode is expressed by the following equation (4).

[Mathematical 4]

$$\frac{\Delta V_{OUT}}{\Delta V_C} = \frac{R}{R_S} \cdot (1-D') \cdot \frac{1}{1+R\cdot C\cdot s} \qquad (4)$$

$V_C$: output voltage of error amplifier 11
R: resistance of output resistor R0
$R_S$: current sense gain
C: capacitance of output capacitor C1
D': on-duty of MOS transistor Q3 (fixed value)

Figure 12:
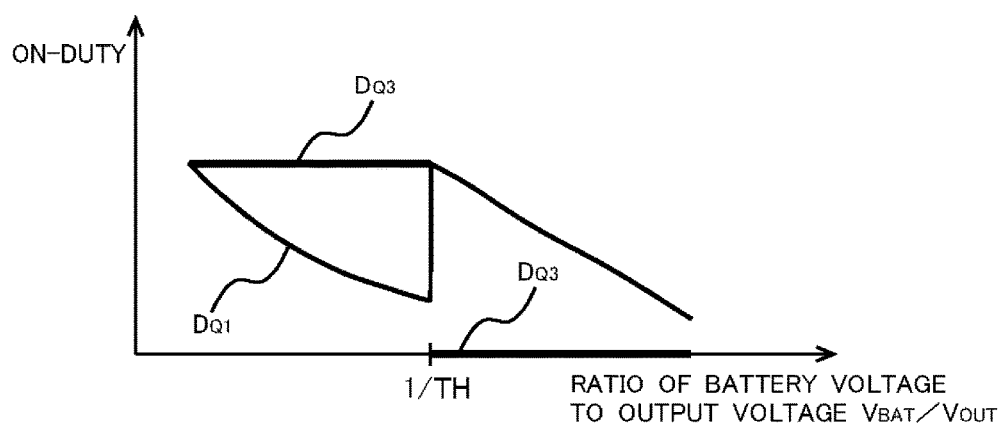
FIG. 12 is a diagram showing on-duties of MOS transistors Q1 and Q3.

By the step-down operation in the step-down mode and the step up/down operation in the step up/down mode, an on-duty $D_{Q1}$ of the MOS transistor Q1 and an on-duty $D_{Q3}$ of the MOS transistor Q3 become as shown in FIG. 12.

From the above equation (3) and the above equation (4), the transfer characteristic of the entire switching regulator 101 in the step up/down mode is equal to the multiplication of (1−D') and the transfer characteristic of the entire switching regulator 101 in the step-down mode. In this way, the response characteristic of the switching regulator 101 in the step up/down mode is the same as the response characteristic of the switching regulator 101 in the step-down mode. Therefore, the transfer function of the switching regulator 101 in the step up/down mode does not have the right half-plane zero characteristic. Thus, the output capacitor C1 is not required to have a large capacitance, and hence cost of the output capacitor can be reduced.

Figure 37:
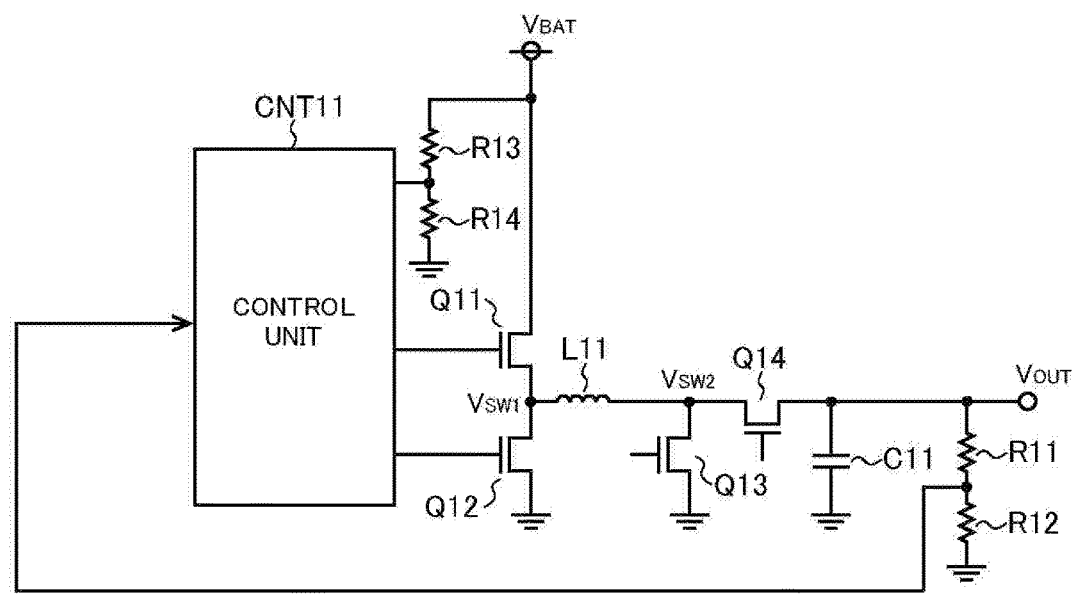
FIG. 37 is a diagram showing a structure of a general step up/down switching regulator.
Figure 38:
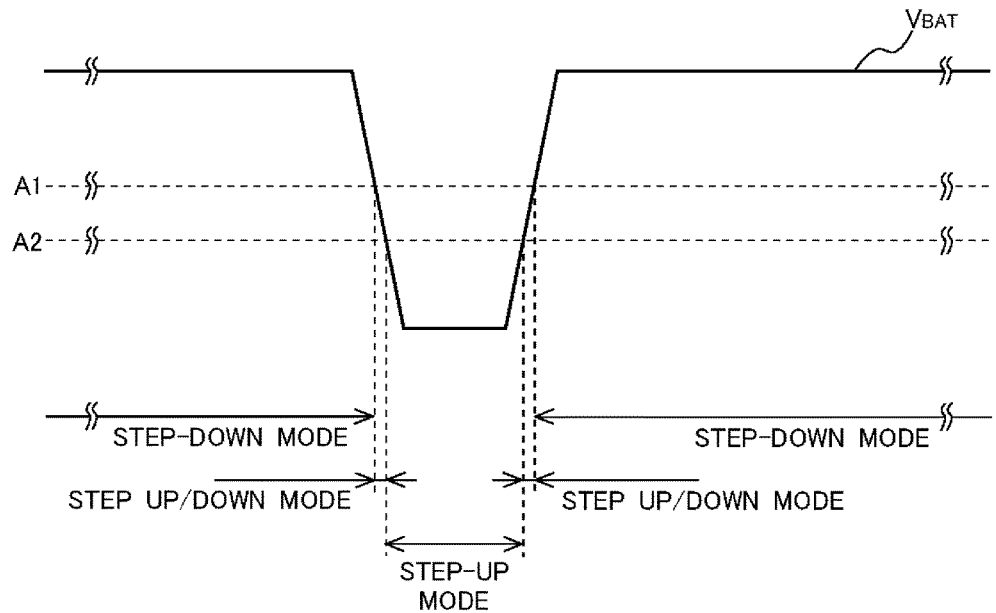
FIG. 38 is a diagram showing a schematic waveform of the battery voltage.
Figure 39A:
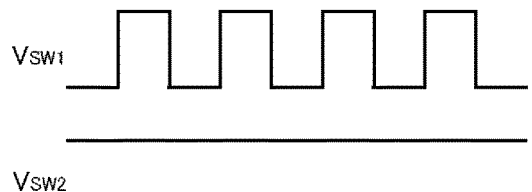
FIG. 39A is a diagram showing schematic waveforms of the switch voltages in the step-down mode.
Figure 39B:
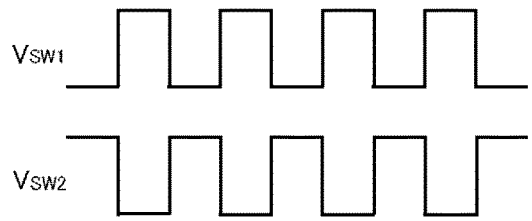
FIG. 39B is a diagram showing schematic waveforms of the switch voltages in the step up/down mode.
Figure 39C:
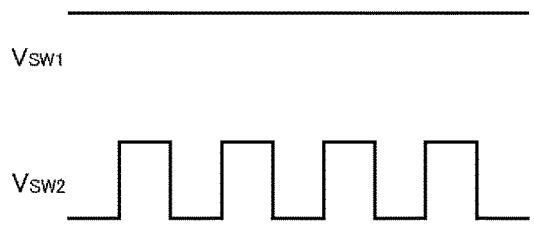
FIG. 39C is a diagram showing schematic waveforms of the switch voltages in the step-up mode.

In addition, the switching regulator 101 does not need reactors individually for the step-up switching regulator unit and the step-down switching regulator unit, and hence cost of the reactor can be reduced. In addition, in the example of switching the operation mode described above, the step up/down mode and the step-down mode are switched according to whether or not the ratio of the battery voltage $V_{BAT}$ to the output voltage $V_{OUT}$ is less than or equal to the inverse of the threshold value TH. In contrast, the general step up/down switching regulator shown in FIG. 37 switches between the step up/down mode or the step-up mode and the step-down mode according to whether or not the battery voltage $V_{BAT}$ is lower than or equal to the first predetermined value A1. In the general step up/down switching regulator shown in FIG. 37, there occurs a problem that an optimal value of the first predetermined value A1 is changed by setting of the output voltage $V_{OUT}$. In contrast, in the switching regulator 101, the optimal value of the threshold value TH is not changed even if the setting of the output voltage $V_{OUT}$ is changed, and hence it is not necessary to change the setting of the threshold value TH.

Figure 13:
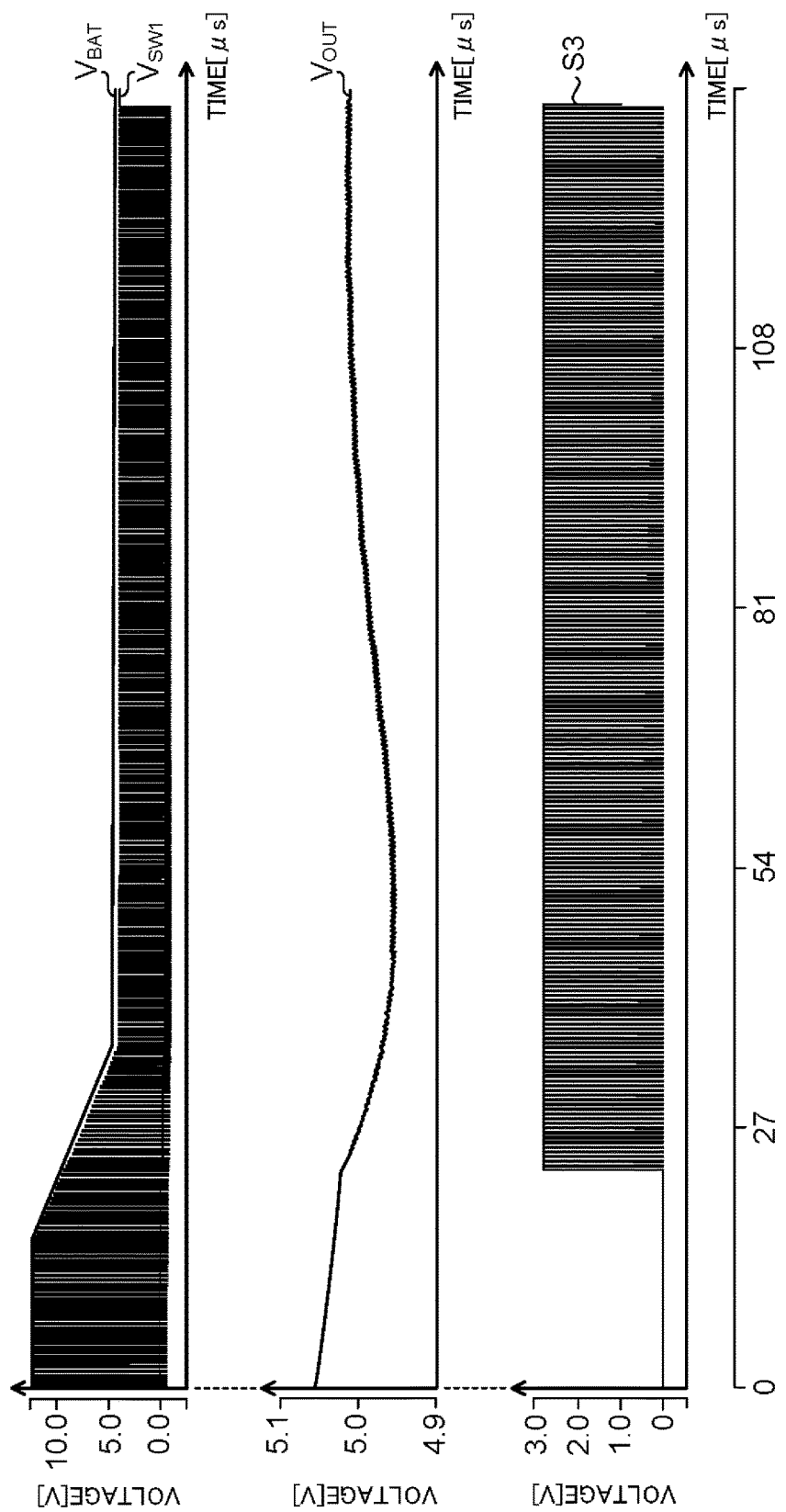
FIG. 13 is a diagram showing a result of simulation when a battery voltage $V_{BAT}$ is decreased.

FIG. 13 shows a result of simulation about the first switch voltage $V_{SW1}$, the output voltage $V_{OUT}$, and the output signal S3 of the AND gate 4 in the switching regulator 101 when the battery voltage $V_{BAT}$ is decreased from 12.4 (V) to 4.9 (V). According to the result of simulation shown in FIG. 13, the output voltage $V_{OUT}$ is 5.02 (V) just before switching from the step-down mode to the step up/down mode, the minimum value of the output voltage $V_{OUT}$ is 4.95 (V) in the step up/down mode, and the output voltage $V_{OUT}$ is substantially constant when switching from the step-down mode to the step up/down mode. In other words, it is confirmed from the simulation that the switching regulator 101 has good responsiveness in the step up/down mode.

Figure 14A:
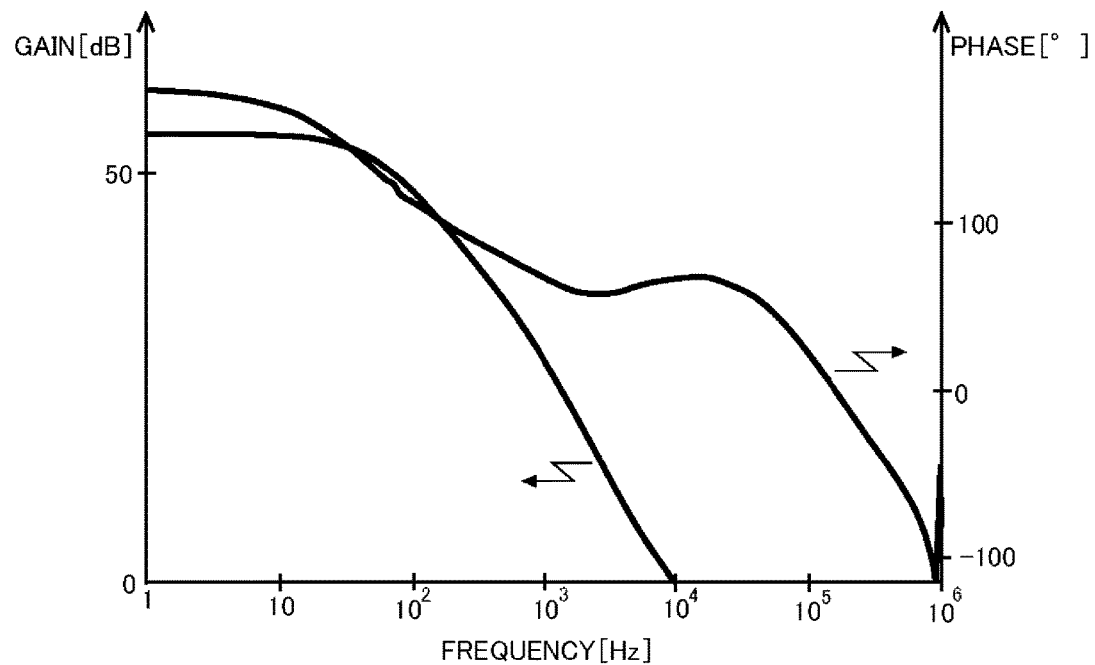
FIG. 14A is a Bode diagram of the step-down mode.
Figure 14B:
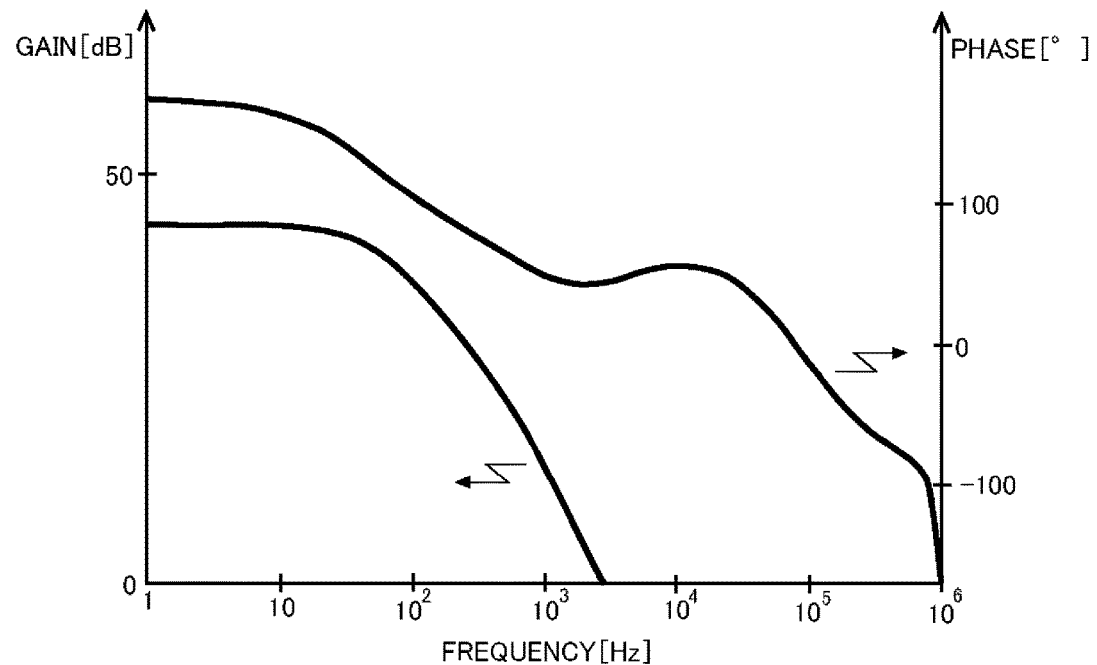
FIG. 14B is a Bode diagram of the step up/down mode.
Figure 14C:
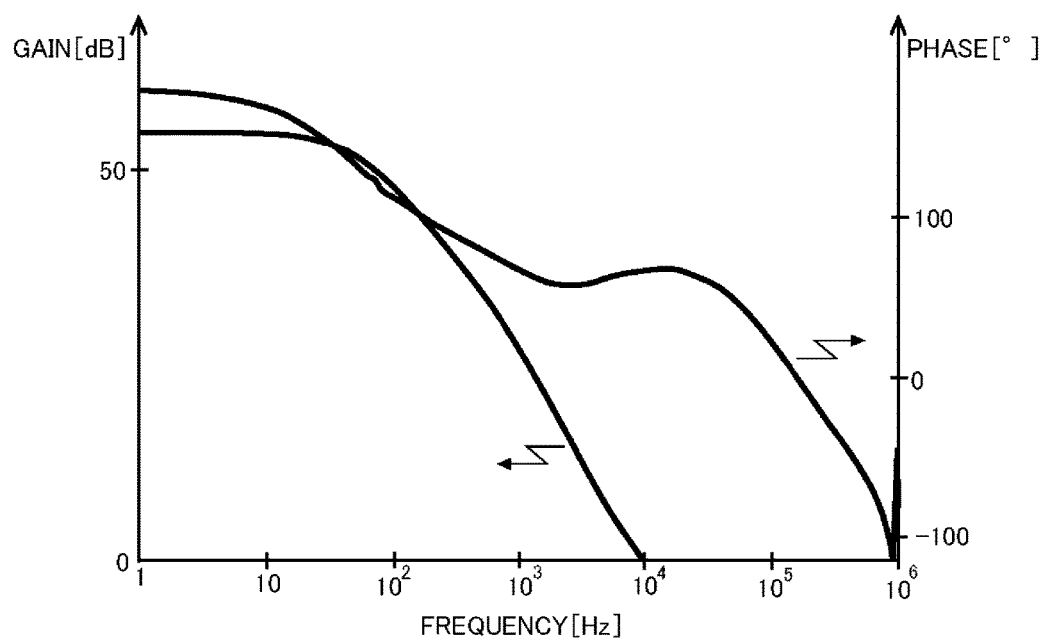
FIG. 14C is a Bode diagram of the step up/down mode after gain correction.

In addition, FIGS. 14A and 14B show results of simulation about a Bode diagram of the switching regulator 101. FIG. 14A is a Bode diagram in a case where the battery voltage $V_{BAT}$ is 12 (V) and the output voltage $V_{OUT}$ is 5 (V), i.e., in the step-down mode, while FIG. 14B is a Bode diagram in a case where the battery voltage $V_{BAT}$ is 4 (V)

and the output voltage $V_{OUT}$ is 5 (V), i.e. in the step up/down mode. Both in the step-down mode and in the step up/down mode, the control system is stable. Note that the multiplication value of the value obtained by subtracting the fixed value D' from 1 and a gain of the error amplifier 11 in the step up/down mode is set equal to the gain of the error amplifier 11 in the step-down mode, and hence the gain in the step up/down mode can be improved as shown in FIG. 14C.

<Overall Structure (Second Embodiment)>

Figure 15:
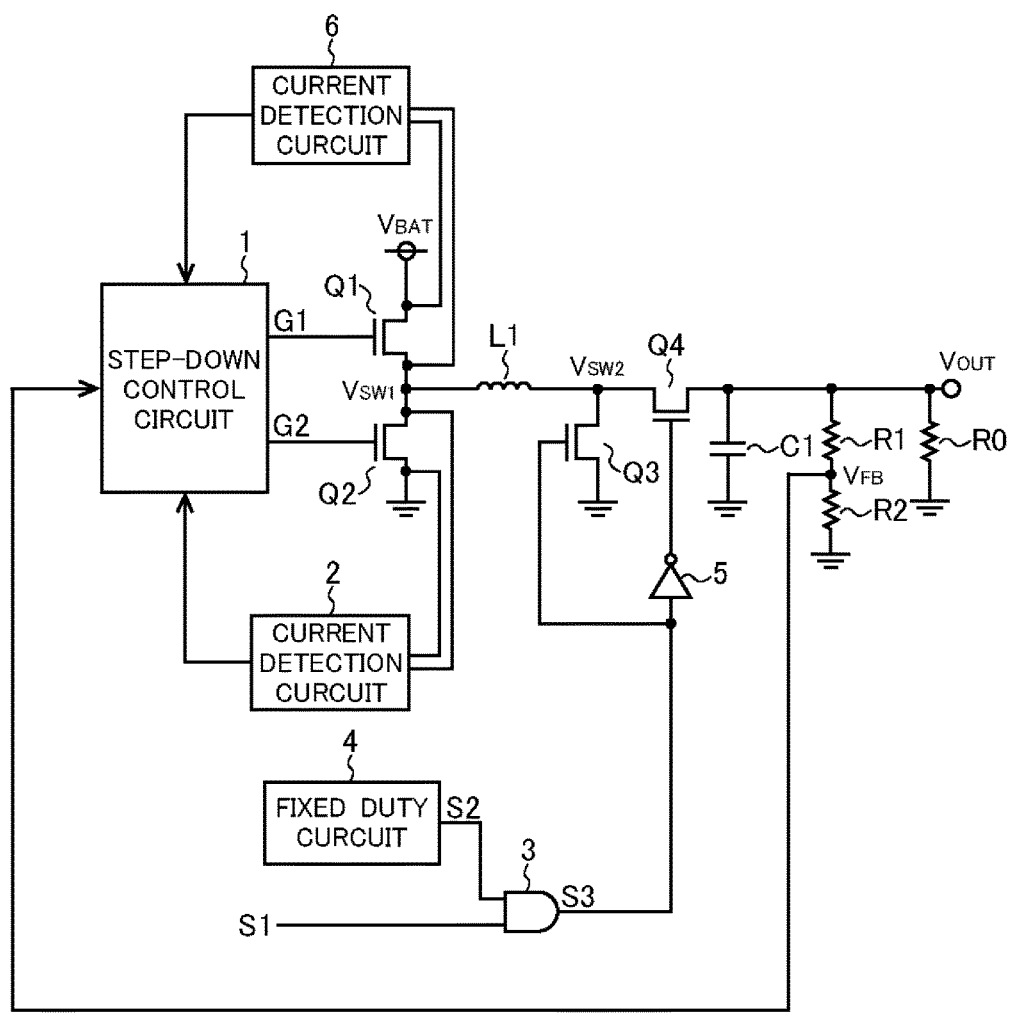
FIG. 15 is a diagram showing an overall structure example of a second embodiment of the switching regulator.

FIG. 15 is a diagram showing an overall structure example of a second embodiment of the switching regulator. A switching regulator 102 of this structure example has a structure in which a current detection circuit 6 is added to the switching regulator 101.

The current detection circuit 6 detects current flowing in the MOS transistor Q1 based on a drain-source voltage of the MOS transistor Q1 in on-state, i.e., a voltage across terminals of an on-resistance of the MOS transistor Q1.

As described above in the first embodiment, the slope circuit 13 (see FIGS. 2A and 2B) generates and outputs the slope voltage corresponding to current flowing in the MOS transistor Q2 detected by the current detection circuit 2, and hence the current feedback can be performed even in a case where the ratio of the output voltage $V_{OUT}$ to the battery voltage $V_{BAT}$ is small (a case where a pulse width of the first switch voltage $V_{SW1}$ is small). However, in a state where the slope circuit 13 generates and outputs the slope voltage corresponding to current flowing in the MOS transistor Q2 detected by the current detection circuit 2, when the pulse width of the first switch voltage $V_{SW1}$ is increased, the time period during which the current flowing in the MOS transistor Q2 can be detected (the time period during which the MOS transistor Q2 is turned on) is shortened, and hence the current feedback may not be able to be performed. In contrast, in a case where the slope voltage corresponding to current flowing in the MOS transistor Q1 is generated, and the current mode control is performed, when the pulse width of the first switch voltage $V_{SW1}$ is increased, the time period during which the current flowing in the MOS transistor Q1 can be detected (the time period during which the MOS transistor Q1 is turned on) is increased, and hence there is no risk that the current feedback cannot be performed.

Therefore, according to an instruction from the timing control circuit 16 (see FIGS. 2A and 2B), the slope circuit 13 in this embodiment generates and outputs the slope voltage corresponding to current flowing in the MOS transistor Q2 detected by the current detection circuit 2 when the ratio of the output voltage to the battery voltage $V_{BAT}$ of the switching regulator 102 ($V_{OUT}$ N/$V_{BAT}$) is 50% or less, while it generates and outputs the slope voltage corresponding to current flowing in the MOS transistor Q1 detected by the current detection circuit 6 when $V_{OUT}/V_{BAT}$ is not 50% or less. In this way, the current feedback can be performed not only in the case where the pulse width of the first switch voltage $V_{SW1}$ becomes small but also in the case where the pulse width of the first switch voltage $V_{SW1}$ becomes large.

Generation of the slope voltage corresponding to current flowing in the MOS transistor Q1 detected by the current detection circuit 6 is the same as that in the comparative example described above, and hence detailed description thereof is omitted.

Figure 16A:
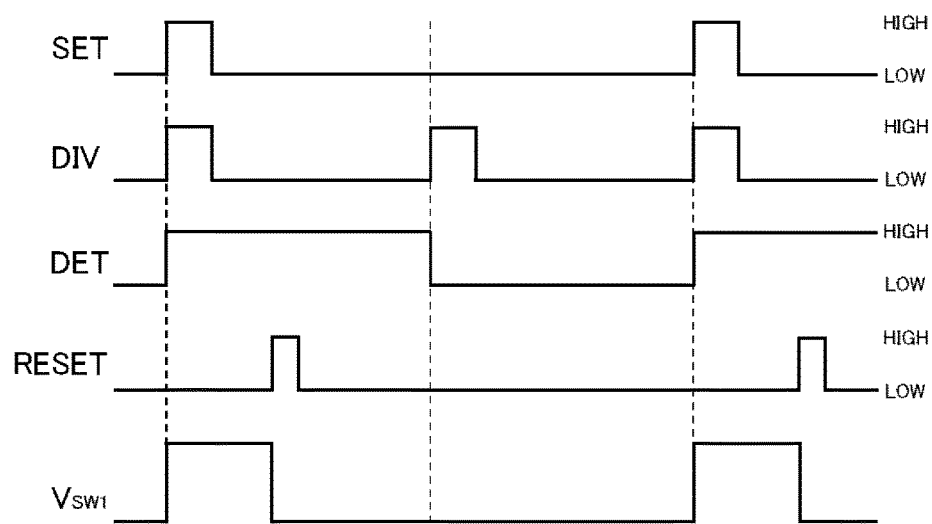
FIG. 16A is a timing chart showing a determination example about a ratio of the output voltage to the battery voltage.

FIG. 16A is a timing chart showing an example of determination whether or not $V_{OUT}/V_{BAT}$ is 50% or less. This determination is performed by the timing control circuit 16 that switches the gate signal G1 from low level to high level when the set signal SET is switched from low level to high level and switches the gate signal G1 from high level to low level when the reset signal RESET is switched from low level to high level.

The timing control circuit 16 generates a divided clock signal DIV based on the set signal SET. The divided clock signal DIV is a signal obtained by dividing the set signal SET by two, and its switch timing from low level to high level is the same as that of the set signal SET.

In addition, the timing control circuit 16 generates a detection clock signal DET based on the set signal SET and the divided clock signal DIV. The detection clock signal DET has the same switch timing from low level to high level as the set signal SET and the divided clock signal DIV, and it switches from high level to low level at a timing when the divided clock signal DIV switches from low level to high level and the set signal SET does not switch from low level to high level.

Further, the timing control circuit 16 determines that $V_{OUT}/V_{BAT}$ is not 50% or less in a case where the gate signal G1 is set to high level when the detection clock signal DET is switched from high level to low level (in this case, the first switch voltage $V_{SW1}$ becomes high level), while it determines that $V_{OUT}/V_{BAT}$ is 50% or less in a case where the gate signal G1 is set to low level (in this case, the first switch voltage $V_{SW1}$ becomes low level).

Figure 16B:
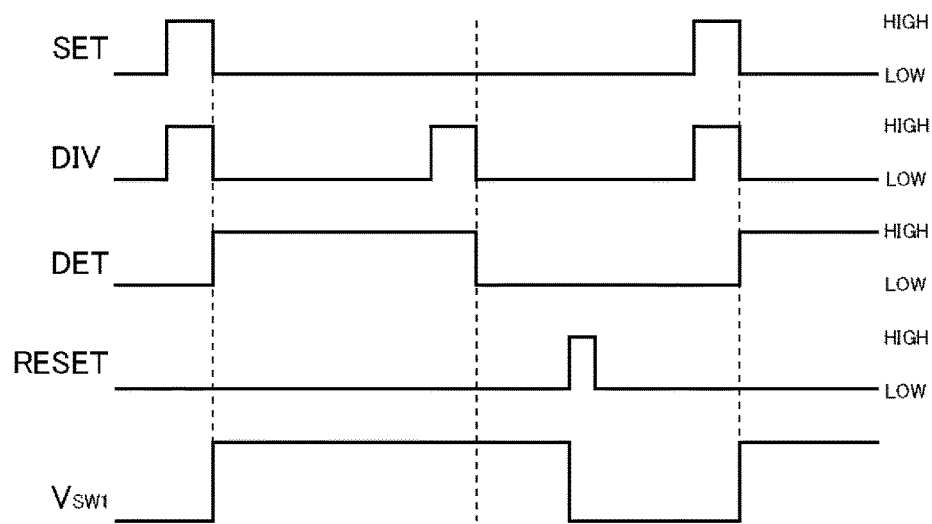
FIG. 16B is a timing chart showing another determination example about a ratio of the output voltage to the battery voltage.

FIG. 16B is a timing chart showing another example of determination whether or not $V_{OUT}/V_{BAT}$ is 50% or less. This determination is performed by the timing control circuit 16 that switches the gate signal G1 from low level to high level when the set signal SET is switched from high level to low level and switches the gate signal G1 from high level to low level when the reset signal RESET is switched from low level to high level.

The timing control circuit 16 generates the divided clock signal DIV based on the set signal SET. The divided clock signal DIV is a signal obtained by dividing the set signal SET by two, and its switch timing from high level to low level is the same as that of the set signal SET.

In addition, the timing control circuit 16 generates the detection clock signal DET based on the set signal SET and the divided clock signal DIV. The detection clock signal DET has its switch timing from low level to high level that is the same as the switch timing from high level to low level of the set signal SET and the divided clock signal DIV, and it switches from high level to low level at a timing when the divided clock signal DIV switches from high level to low level and the set signal SET does not switch from high level to low level.

Further, the timing control circuit 16 determines that $V_{OUT}/V_{BAT}$ is not 50% or less in a case where the gate signal G1 is set to high level when the detection clock signal DET is switched from high level to low level (in this case, the first switch voltage $V_{SW1}$ becomes high level), while it determines that $V_{OUT}/V_{BAT}$ is 5/0 or less when the gate signal G1 is set to low level (in this case, the first switch voltage $V_{SW1}$ becomes low level).

In the above description, the slope voltage corresponding to current flowing in the MOS transistor Q2 detected by the current detection circuit 2 is output from the slope circuit 13 when $V_{OUT}/V_{BAT}$ is 50% or less, but 50% is merely an example, and other value may be adopted.

Further, in the above description, when $V_{OUT}/V_{BAT}$ is not 50% or less, the slope voltage corresponding to current flowing in the MOS transistor Q1 detected by the current detection circuit 6 is output from the slope circuit 13, but a structure may be adopted in which the current mode control is not performed when $V_{OUT}/V_{BAT}$ is not a predetermined value or less, so as to avoid a risk that the current feedback cannot be performed when the pulse width of the first switch voltage $V_{SW1}$ becomes large. For example, the slope circuit 13 generates a pseudo slope voltage, and when $V_{OUT}/V_{BAT}$ is a predetermined value or less, a voltage obtained by superimposing the pseudo slope voltage on the slope voltage corresponding to current flowing in the MOS transistor Q2 detected by the current detection circuit 2 (new slope voltage) is output as the output voltage of the slope circuit 13 from the slope circuit 13, while when the $V_{OUT}/V_{BAT}$ is not a predetermined value or less, the pseudo slope voltage is output as the output voltage of the slope circuit 13 from the slope circuit 13.

<Overall Structure (Third Embodiment)>

An overall structure example of a third embodiment of the switching regulator is the same as the overall structure example of the first embodiment of the switching regulator shown in FIG. 1.

<Structural Example of Step-Down Control Circuit>

A structure example of the step-down control circuit in this embodiment is the same as the structure example of the step-down control circuit shown in FIGS. 2A and 2B described above in the first embodiment.

<Operation Mode>

As an example of switching the operation mode, a case is described in which the mode designating signal S1 is set to high level when the on-duty of the MOS transistor Q1 is the threshold value TH or more, while the mode designating signal S1 is set to low level when the on-duty of the MOS transistor Q1 is lower than the threshold value TH.

Figure 17A:
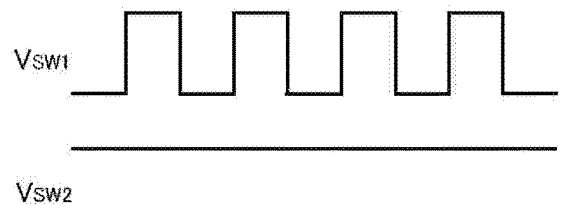
FIG. 17A is a diagram showing schematic waveforms of switch voltages in the step-down mode.

When the on-duty of the MOS transistor Q1 is lower than the threshold value TH, i.e. when the ratio of the battery voltage $V_{BAT}$ to the output voltage $V_{OUT}$ is more than the inverse of the threshold value TH, the switching regulator 101 operates in the step-down mode (see FIG. 11). In the step-down mode, the step-down control circuit 1 controls on/off of the MOS transistors Q1 and Q2 according to the feedback voltage $V_{FB}$, and because the duty signal S1 is at low level, the MOS transistor Q3 is kept in off-state, while the MOS transistor Q4 is kept in on-state. In this way, a first switch voltage $V_{SW1}$ as a voltage at a connection node between the MOS transistors Q1 and Q2 and a second switch voltage $V_{SW2}$ as a voltage at a connection node between the MOS transistors Q3 and Q4 become as shown in FIG. 17A.

In addition, the transfer characteristic of the entire switching regulator 101 in the step-down mode is expressed by the above equation (3) as described above in the first embodiment.

Figure 17B:
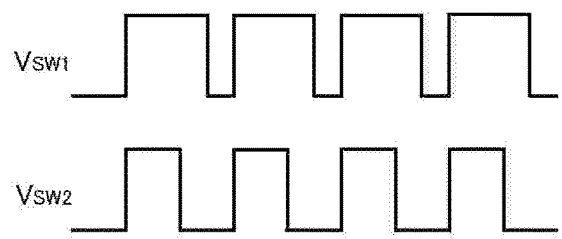
FIG. 17B is a diagram showing schematic waveforms of switch voltages in the step up/down mode.

On the other hand, when the on-duty of the MOS transistor Q1 is the threshold value TH or more, i.e. when the ratio of the battery voltage $V_{BAT}$ to the output voltage $V_{OUT}$ is less than or equal to the inverse of the threshold value TH, the switching regulator 101 operates in the step up/down mode (see FIG. 11). In the step up/down mode, the step-down control circuit 1 controls on/off of the MOS transistors Q1 and Q2 according to the feedback voltage VF, and because the duty signal S1 is at high level, the MOS transistors Q3 and Q4 are complementarily turned on/off in the state where the on-duty D (0≤D≤1) of the MOS transistor Q3 is fixed to the fixed value D' (0<D'<1). In this way, the first switch voltage $V_{SW1}$ as the voltage at the connection node between the MOS transistors Q1 and Q2 and the second switch voltage $V_{SW2}$ as the voltage at the connection node between the MOS transistors Q3 and Q4 become as shown in FIG. 17B. Note that in the step up/down mode, the on-duty of the MOS transistor Q3 is set independently of each of the output voltage $V_{OUT}$ and the battery voltage $V_{BAT}$.

In addition, the transfer characteristic of the entire switching regulator 101 in the step up/down mode is expressed by the above equation (4) as described above in the first embodiment.

By the step-down operation in the step-down mode and the step up/down operation in the step up/down mode, the on-duty $D_{Q1}$ of the MOS transistor Q1 and the on-duty $D_{Q3}$ of the MOS transistor Q3 become as shown in FIG. 12.

As described above in the first embodiment, the transfer function of the switching regulator 101 in the step up/down mode does not have the right half-plane zero characteristic.

In addition, as described above in the first embodiment, in the switching regulator 101, because the optimal value of the threshold value TH does not change even if the setting of the output voltage $V_{OUT}$ is changed, it is not necessary to change the setting of the threshold value TH.

In addition, a result of simulation in the switching regulator 101 of this embodiment is the same as a result of simulation in the switching regulator 101 of the first embodiment (see FIGS. 14A to 14C).

Figure 18:
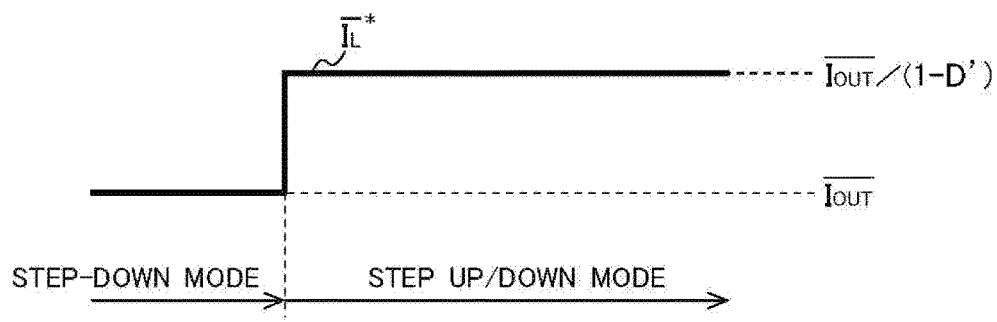
FIG. 18 is a diagram showing an expected average current of an inductor L1.

In addition, in the switching regulator 101, a value of an average current bar $I_L^*$ of an expected (ideal) inductor L1 is different between the step-down mode and the step up/down mode. In the step-down mode, the value of the average current bar $I_L^*$ of the expected (ideal) inductor L1 is the same as an average value bar $I_{OUT}$ of the output current of the switching regulator 101 (see FIG. 18). On the other hand, in the step up/down mode, the value of the average current bar $I_L^*$ of the expected (ideal) inductor L1 is the same as a value obtained by dividing the average value bar $I_{OUT}$ of the output current of the switching regulator 101 by the value obtained by subtracting the fixed value D' from 1 (1−D') (see FIG. 18).

Figure 19:
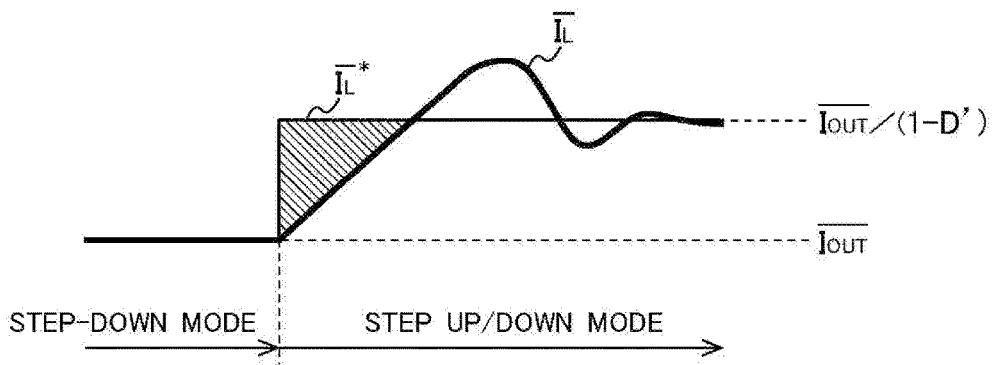
FIG. 19 is a diagram showing an average current of an actual inductor L1 in a case where general current feedback is performed.

However, when switching from the step-down mode to the step up/down mode, in a case where the switching regulator 101 performs a general current feedback, a delay occurs, and hence in an initial stage of the step up/down mode a value of the average current bar $I_L$ of an actual inductor L1 becomes as shown in FIG. 19. In this case, a charge amount of the hatched part shown in FIG. 19 is insufficient in the output capacitor C1, and hence the output voltage $V_{OUT}$ of the switching regulator 101 is decreased.

Accordingly, in this embodiment, by devising as described below in <First generation example of slope voltage> or in <Second generation example of slope voltage>, a decrease of the output voltage $V_{OUT}$ can be suppressed when switching from the step-down mode to the step up/down mode.

<First Generation Example of Slope Voltage>

One structure example of the current detection circuit 2 and the slope circuit 13 in this embodiment is the same as the one structure example of the current detection circuit 2 and the slope circuit 13 shown in FIG. 3 described above in the first embodiment.

Figure 20:
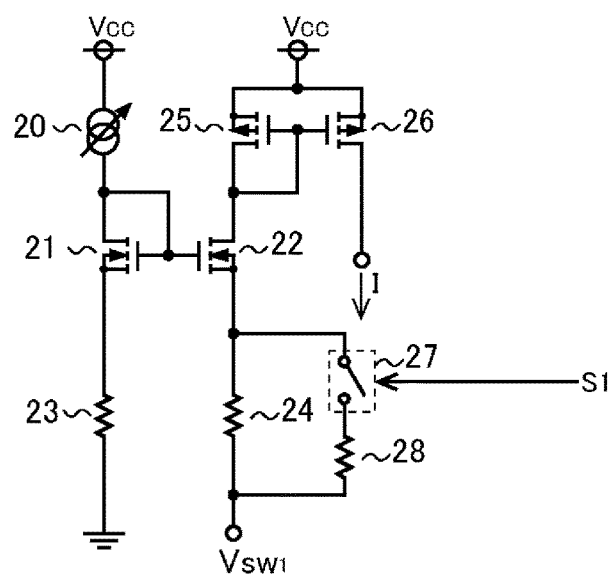
FIG. 20 is a diagram showing a structure example of the voltage-to-current conversion circuit.

FIG. 20 is a diagram showing one structure example of the voltage-to-current conversion circuit 2A. In the example shown in FIG. 20, the voltage-to-current conversion circuit 2A is constituted of the current source 20, the MOS transistors 21, 22, 25, and 26, resistors 23, 24, and 28, and a switch 27. The switch 27 temporarily becomes on-state during a period after the mode designating signal S1 switches from low level to high level until a predetermined time elapses, i.e. a period after switching from the step-down mode to the step up/down mode until a predetermined time elapses, while it becomes off-state in other period. In addition, a mirror ratio of the current mirror circuit constituted of the N-channel MOS transistors 21 and 22 is set to 1:1.

In the voltage-to-current conversion circuit shown in FIG. 20, the current source 20 supplies current to the current mirror circuit constituted of the N-channel MOS transistors 21 and 22. When the switch 27 is in off-state, source current of the N-channel MOS transistor 22 has a value obtained by dividing the first switch voltage $V_{SW1}$ by the difference $(R_{23}-R_{24})$ between the resistance $R_{23}$ of the resistor 23 and the resistance $R_{24}$ of the resistor 24. On the other hand, when the switch 27 is in on-state, the source current of the N-channel MOS transistor 22 has a value obtained by dividing the first switch voltage $V_{SW1}$ by the difference $(R_{23}-R_{COM})$ between the resistance $R_{23}$ of the resistor 23 and a combined resistance $R_{COM}$ of the resistor 24 and the resistor 28. Further, the current mirror circuit constituted of the P-channel MOS transistors 25 and 26 outputs current corresponding to the source current of the N-channel MOS transistor 22 (current corresponding to the first switch voltage $V_{SW1}$ as the input voltage of the voltage-to-current conversion circuit 2A) as the output current of the voltage-to-current conversion circuit 2A.

Therefore, the output current of the voltage-to-current conversion circuit 2A is decreased during a period while the switch 27 is in on-state, i.e. a period after switching from the step-down mode to the step up/down mode until a predetermined time elapses. In other words, a detection gain of the voltage-to-current conversion circuit 2A as the current detection circuit is temporarily decreased during the period after switching from the step-down mode to the step up/down mode until a predetermined time elapses.

Figure 21:
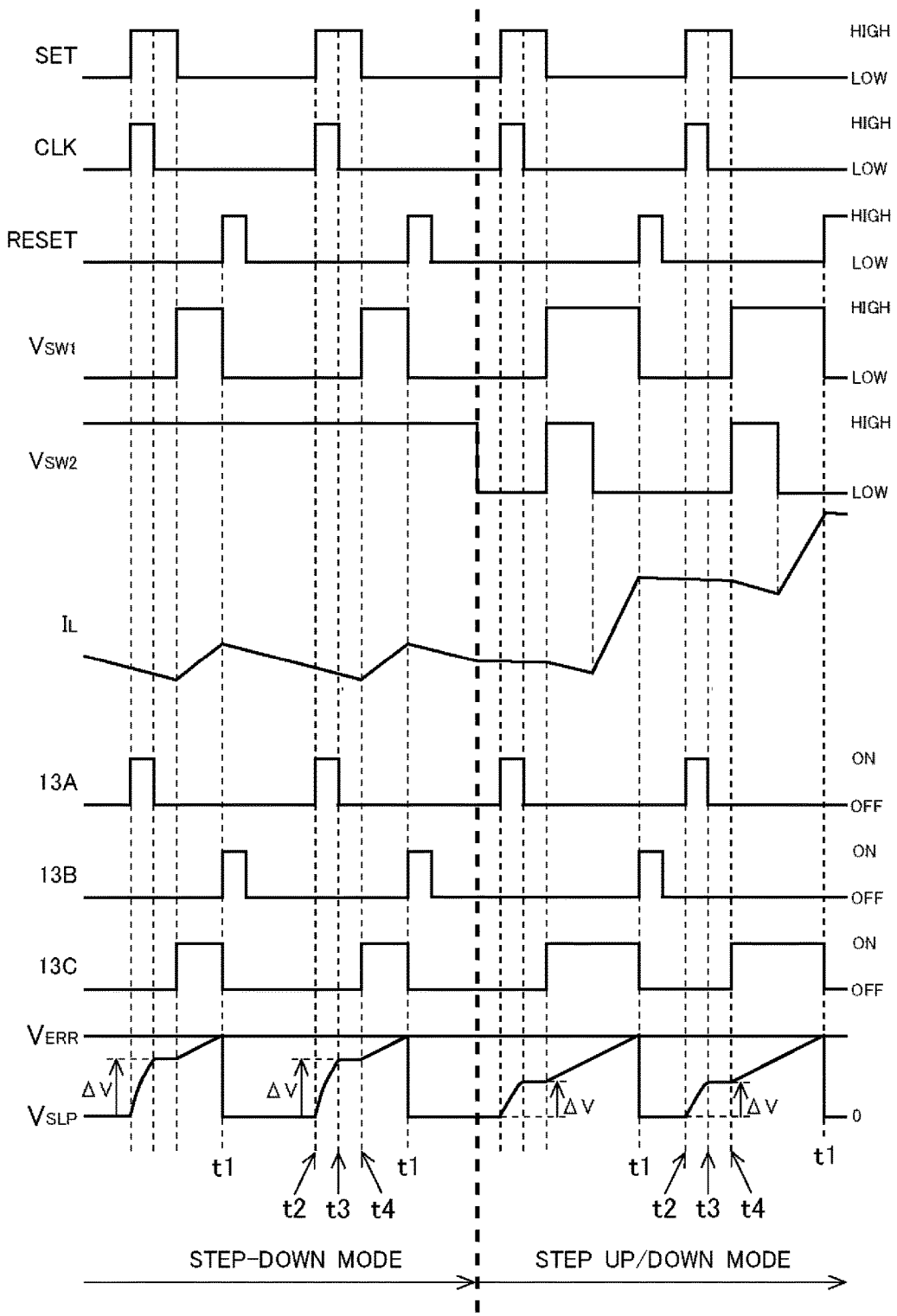
FIG. 21 is a timing chart showing an operation example of the switching regulator of FIG. 1 when switching from the step-down mode to the step up/down mode.

FIG. 21 is a timing chart showing an operation example of the switching regulator 101 when switching from the step-down mode to the step up/down mode in the switching regulator 101 using the slope circuit 13 shown in FIG. 3 and the voltage-to-current conversion circuit 2A shown in FIG. 20.

In the example shown in FIG. 21, the timing control circuit 16 switches the gate signal G1 from low level to high level when the set signal SET is switched from high level to low level, while it switches the gate signal G1 from high level to low level when the reset signal RESET is switched from low level to high level.

In addition, the timing control circuit 16 generates inside the internal clock signal CLK, which switches from low level to high level when the set signal SET is switched from low level to high level and has a high level period shorter than a high level period of the set signal SET, based on the set signal SET. Note that each high level period of the internal clock signal CLK is a constant time in which the current feedback is performed. Note that it is preferred to adjust each high level period of the internal clock signal CLK so that the internal clock signal CLK switches from high level to low level before staring the dead time set just after the MOS transistor Q2 is switched from on to off.

Furthermore, the timing control circuit 16 forcibly sets the gate signal G1 to low level and sets the gate signal G2 to high level when the internal clock signal CLK is switched from low level to high level, regardless of a level transition state of the reset signal RESET. In this way, when the internal clock signal CLK is switched from low level to high level, the current feedback can be securely started.

The slope circuit 13 switches on/off of the switches 13A to 13C according to an instruction from the timing control circuit 16.

When the reset signal RESET is switched from low level to high level (at timing t1), the slope circuit 13 maintains off-state of the switch 13A, switches the switch 13B from off to on, and switches the switch 13C from on to off. In this way, the capacitor 13E is discharged, and the slope voltage $V_{SLP}$ as the charging voltage of the capacitor 13E becomes 0.

Then, after the slope circuit 13 switches the switch 13B from on to off so as to finish discharging of the capacitor 13E, when the internal clock signal CLK is switched from low level to high level (at timing t2), the slope circuit 13 switches the switch 13A from off to on.

Next, when the internal clock signal CLK is switched from high level to low level (at timing t3), the slope circuit 13 switches the switch 13A from on to off.

During the period from timing t2 to timing t3, the switch 13A connects the current path from the voltage-to-current conversion circuit 2A to the capacitor 13E, and hence the information of current flowing in the MOS transistor Q2 is accumulated in a form of the charging voltage of the capacitor 13E.

Next, when the set signal SET is switched from high level to low level (at timing t4), the slope circuit 13 switches the switch 13C from off to on. During a period from timing t4 to next timing t1, the output current of the constant current source 13D charges the capacitor 13E. In this way, the slope voltage $V_{SLP}$ as the charging voltage of the capacitor 13E becomes a voltage obtained by superimposing a voltage increasing at a constant increase rate corresponding to the output current of the constant current source 13D (at a constant gradient corresponding to the output current of the constant current source 13D) on the offset voltage on which the information of current flowing in the MOS transistor Q2 is reflected. Further, the slope voltage $V_{SLP}$ as the charging voltage of the capacitor 13E becomes the output signal of the slope circuit 13.

Note that a structure may be adopted in which the internal clock signal CLK is not generated, and the switch 13A is switched from on to off when the set signal SET is switched from high level to low level.

According to the first generation example of the slope voltage $V_{SLP}$ described above, during the period after switching from the step-down mode to the step up/down mode until a predetermined time elapses, a detection gain of the voltage-to-current conversion circuit 2A as the current detection circuit is temporarily decreased, and an offset $\Delta V$ of the slope voltage $V_{SLP}$ is temporarily decreased. In this way, during the period after switching from the step-down mode to the step up/down mode until a predetermined time elapses, the pulse width of the first switch voltage $V_{SW1}$ is temporarily increased, and hence the average current bar $I_L$ of the inductor L1 can be quickly increased. Therefore, a decrease of the output voltage $V_{OUT}$ can be suppressed when switching from the step-down mode to the step up/down mode. Note that the offset $\Delta V$ of the slope voltage $V_{SLP}$ means a value of the slope voltage $V_{SLP}$ when starting the increasing period during which the slope voltage $V_{SLP}$ increases at the constant gradient (see FIG. 21).

<Second Generation Example of Slope Voltage>

Figure 22:
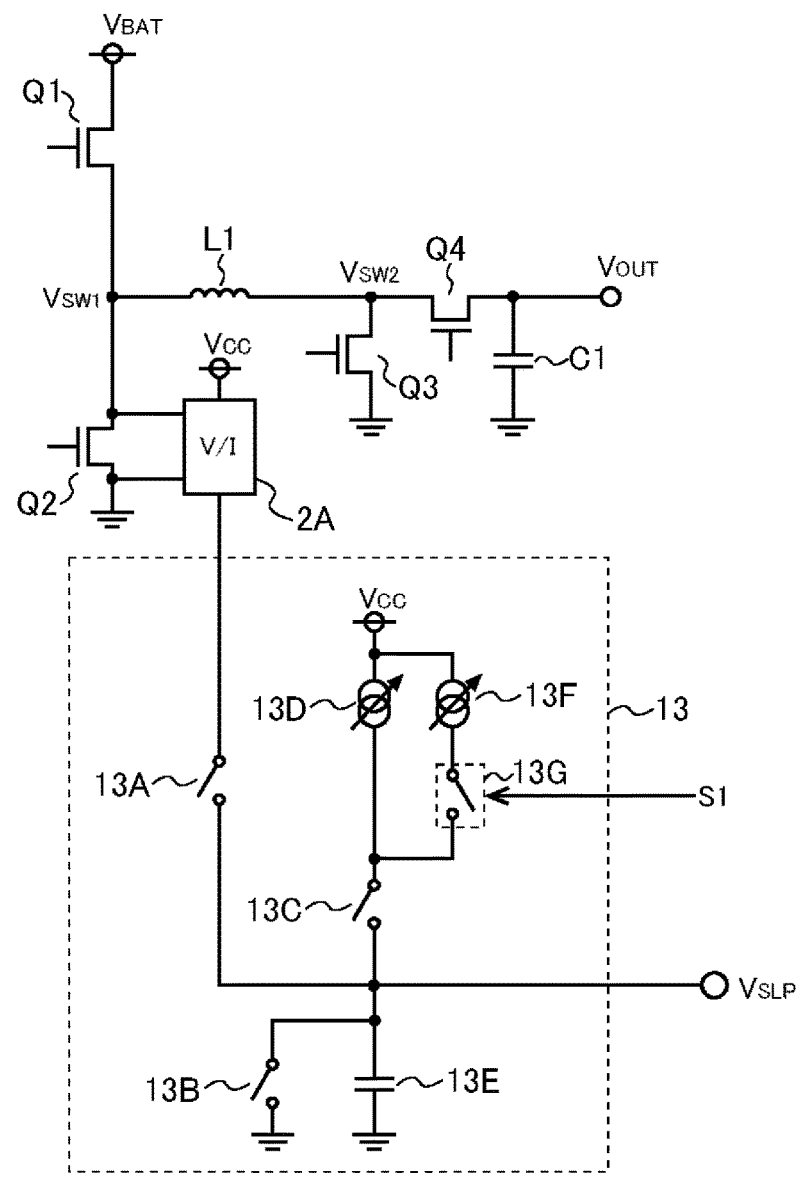
FIG. 22 is a diagram showing another structure example of the current detection circuit and the slope circuit.

FIG. 22 is a diagram showing another structure example of the current detection circuit 2 and the slope circuit 13. In the example shown in FIG. 22, the current detection circuit 2 is constituted of the voltage-to-current conversion circuit 2A in the example shown in FIG. 4 described above in the first embodiment.

The slope circuit 13 shown in FIG. 22 has a structure in which a constant current source 13F and a switch 13G are added to the slope circuit 13 shown in FIG. 3. A series circuit of the constant current source 13F and the switch 13G is connected in parallel to the constant current source 13D. The switch 13G temporarily becomes off-state during a period after the mode designating signal S1 switches from low level to high level until a predetermined time elapses, i.e. during the period after switching from the step-down mode to the step up/down mode until a predetermined time elapses, while it becomes on-state in other period. Therefore, charging current supplied to the capacitor 13E when the switch 13C is turned on is decreased during a period while the switch 13G is in off-state, i.e. during the period after switching from the step-down mode to the step up/down mode until a predetermined time elapses. In other words, the gradient of the slope voltage $V_{SLP}$ is decreased during the period after switching from the step-down mode to the step up/down mode until a predetermined time elapses.

Figure 23:
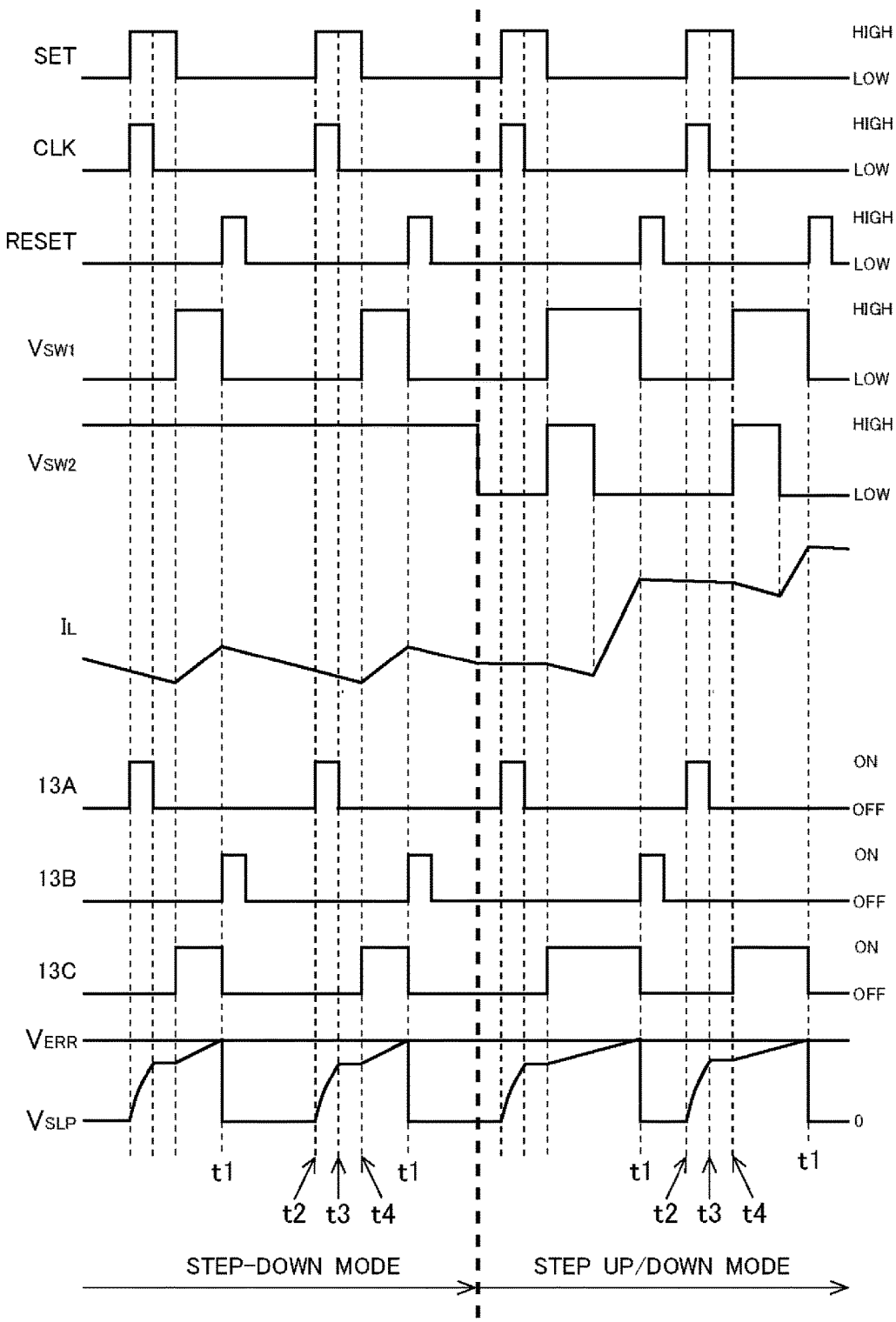
FIG. 23 is a timing chart showing another operation example of the switching regulator of FIG. 1 when switching from the step-down mode to the step up/down mode.

FIG. 23 is a timing chart showing an operation example of the switching regulator 101 when switching from the step-down mode to the step up/down mode in the switching regulator 101 using the slope circuit 13 shown in FIG. 22 and the voltage-to-current conversion circuit 2A shown in FIG. 4.

The operation at timing t1 to the operation at timing t4 shown in FIG. 23 are the same as the operation at timing t1 to the operation at timing t4 shown in FIG. 21, and hence description thereof is omitted.

According to the second generation example of the slope voltage $V_{SLP}$ described above, during the period after switching from the step-down mode to the step up/down mode until a predetermined time elapses, the gradient of the slope voltage $V_{SLP}$ is temporarily decreased. In this way, during the period after switching from the step-down mode to the step up/down mode until a predetermined time elapses, the pulse width of the first switch voltage $V_{SW1}$ is temporarily increased, and hence the average current bar $I_L$ of the inductor L1 can be quickly increased. Therefore, a decrease of the output voltage $V_{OUT}$ can be suppressed when switching from the step-down mode to the step up/down mode.

Fourth Embodiment

In the third embodiment described above, the switching regulator 101 is described, in which a decrease of the output voltage $V_{OUT}$ can be suppressed when switching from the step-down mode to the step up/down mode.

Also when switching from the step up/down mode to the step-down mode, in a case where general current feedback is performed in the switching regulator 101, a delay occurs. Therefore, in an initial stage of the step-down mode, the output capacitor C1 stores excess amount of charge, and hence the output voltage $V_{OUT}$ of the switching regulator 101 is increased.

Accordingly, in this embodiment, by devising the switching regulator 101 in the same manner as <First generation example of slope voltage> or <Second generation example of slope voltage> described above, an increase of the output voltage $V_{OUT}$ is suppressed when switching from the step up/down mode to the step-down mode. Thus, in this embodiment, the device adopted in the first embodiment is applied to the case when switching from the step up/down mode to the step-down mode, and hence only an overview is described below.

Figure 24:
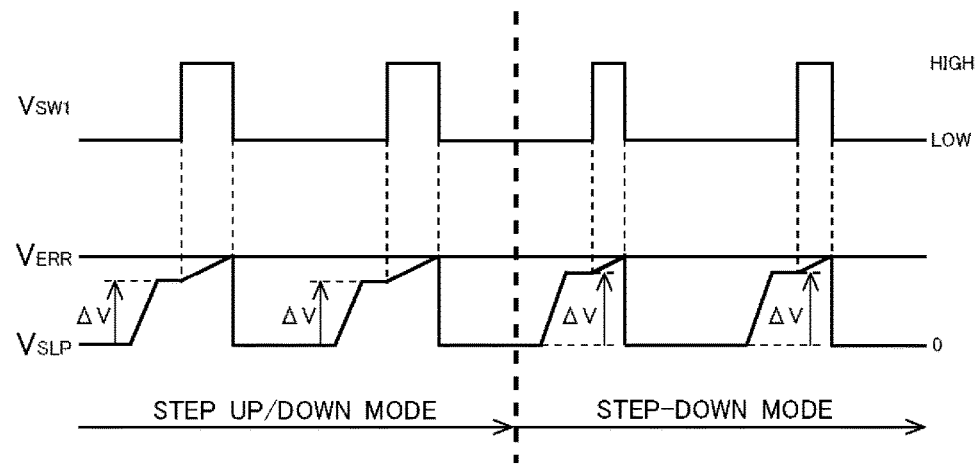
FIG. 24 is a timing chart showing an operation example of the switching regulator of FIG. 1 when switching from the step up/down mode to the step-down mode.

In this embodiment, when adopting the same device as in <First generation example of slope voltage> described above, during the period after switching from the step up/down mode to the step-down mode until a predetermined time elapses, a detection gain of the voltage-to-current conversion circuit 2A as the current detection circuit is temporarily increased, and the offset ΔV of the slope voltage $V_{SLP}$ is temporarily increased (see FIG. 24). In this way, during the period after switching from the step up/down mode to the step-down mode until a predetermined time elapses, the pulse width of the first switch voltage $V_{SW1}$ is temporarily decreased as shown in FIG. 24, and hence the average current bar $I_L$ of the inductor L1 can be quickly decreased. Therefore, an increase of the output voltage $V_{OUT}$ can be suppressed when switching from the step up/down mode to the step-down mode.

Figure 25:
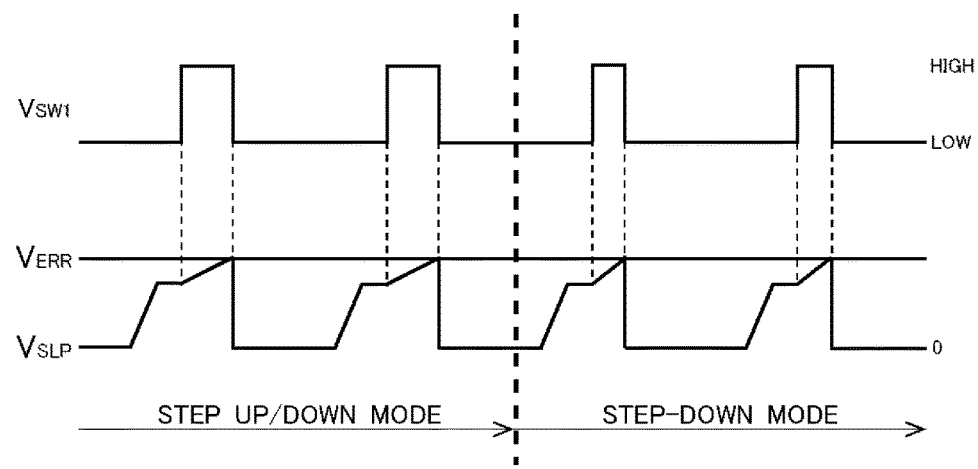
FIG. 25 is a timing chart showing another operation example of the switching regulator of FIG. 1 when switching from the step up/down mode to the step-down mode.

In addition, in this embodiment, when adopting the same device as in <Second generation example of slope voltage> described above, during the period after switching from the step up/down mode to the step-down mode until a predetermined time elapses, the gradient of the slope voltage $V_{SLP}$ is temporarily increased (see FIG. 25). In this way, during the period after switching from the step up/down mode to the step-down mode until a predetermined time elapses, the pulse width of the first switch voltage $V_{SW1}$ is temporarily decreased as shown in FIG. 25, and hence the average current bar $I_L$ of the inductor L1 can be quickly decreased. Therefore, when switching from the step up/down mode to the step-down mode, an increase of the output voltage $V_{OUT}$ can be suppressed.

<Overall Structure (Fifth Embodiment)>

Figure 26:
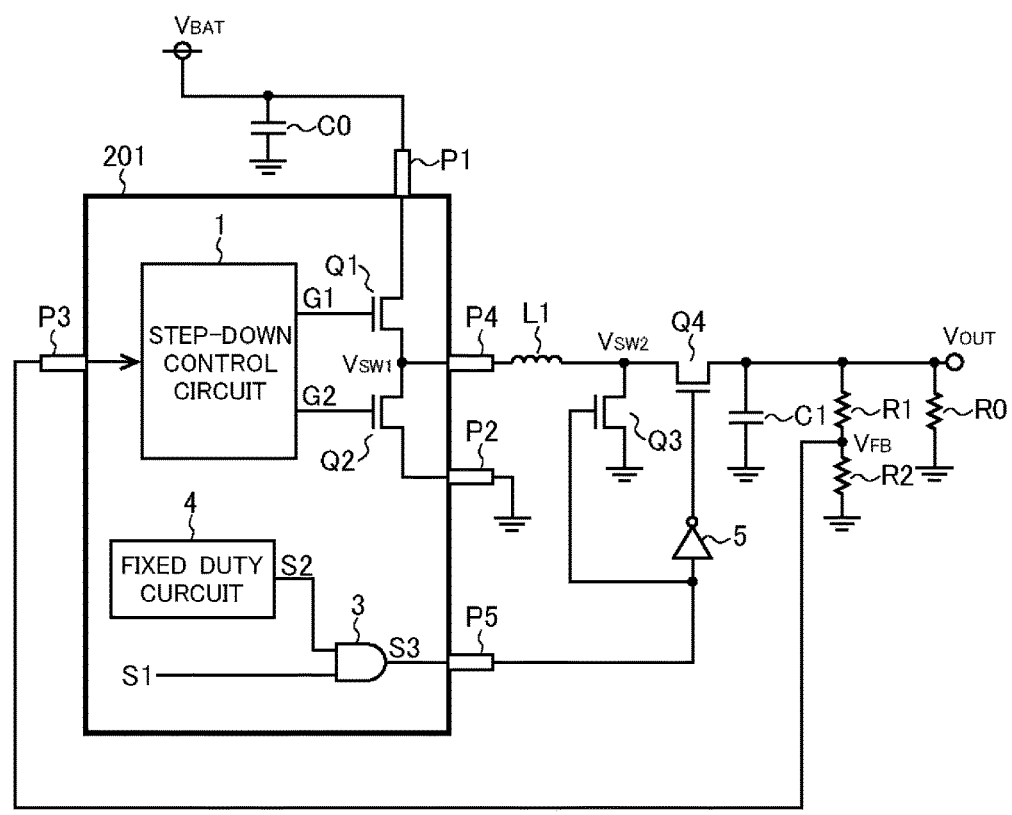
FIG. 26 is a diagram showing an overall structure example of the switching regulator in a case where the integrated circuit package according to the fifth embodiment is used as a component of the step up/down switching regulator.

FIG. 26 is a diagram showing an overall structure example of the switching regulator when using the integrated circuit package according to the fifth embodiment as a component of the step up/down switching regulator. Note that in FIG. 26, the same part as in FIG. 1 is denoted by the same numeral or symbol, and detailed description is appropriately omitted.

An integrated circuit package 201 according to this embodiment includes the step-down control circuit 1, the MOS transistors Q1 and Q2, the AND gate 3, and the fixed duty circuit 4. In addition, the integrated circuit package 201 according to this embodiment has first to fifth external pins P1 to P5. Further, an input capacitor C0, the inductor L1, the MOS transistors Q3 and Q4, the output capacitor C1, the output resistor R0, the voltage dividing resistors R1 and R2, and the NOT gate 5 are externally connected to the integrated circuit package 201 according to this embodiment.

The MOS transistor Q is an N-channel MOS transistor and is an example of a switch that connects/disconnects a current path from the first external pin P1 to the fourth external pin P4. The drain of the MOS transistor Q1 is connected to the first external pin P1. The source of the MOS transistor Q1 is connected to the fourth external pin P4 and the drain of the MOS transistor Q2. The battery voltage $V_{BAT}$ as the input voltage is smoothed by the input capacitor C0 and then is applied to the first external pin P1. The fourth external pin is connected to the one terminal of the inductor L1.

The MOS transistor Q2 is an N-channel MOS transistor and is an example of a switch that connects/disconnects a current path from the second external pin P2 to the fourth external pin P4. The drain of the MOS transistor Q2 is connected to the fourth external pin P4 and the source of the MOS transistor Q1 as described above. The source of the MOS transistor Q2 is connected to the second external pin P2. Note that a diode can be used instead of the MOS transistor Q2. The fourth external pin is connected to a ground potential.

The voltage dividing resistors R1 and R2 divides the output voltage $V_{OUT}$ so as to generate the feedback voltage $V_{FB}$, which is supplied to the third external pin P3 of the integrated circuit package 201.

The mode designating signal S1 becomes a signal designating the step-down mode when being low level and becomes a signal designating the step up/down mode when being high level. The integrated circuit package 201 may have a structure including a circuit (not shown) that generates the mode designating signal S1, or the integrated circuit package 201 may have a structure to receive the mode designating signal S1 from the outside. In the latter case, a sixth external pin for receiving the mode designating signal S should be provided to the integrated circuit package 201.

The output signal S3 of the AND gate 3 is output to the outside of the integrated circuit package 201 via the fifth external pin P5. Hereinafter, the signal output externally via the fifth external pin P5 is referred to as an external output signal S3. The external output signal S3 is supplied to the gate of the MOS transistor Q3 and is logically inverted by the NOT gate 5 so as to be supplied to the gate of the MOS transistor Q4. Note that it is preferred to use a dead time generation circuit instead of the NOT gate 5 and to set a dead time during which both the MOS transistor Q3 and the MOS transistor Q4 are turned off when the MOS transistor Q3 and the MOS transistor Q4 are switched on/off.

<Structure Example of Step-Down Control Circuit>

A structure example of the step-down control circuit in this embodiment is the same as the structure example of the step-down control circuit shown in FIGS. 2A and 2B described above in the first embodiment.

<Operation Mode>

As an example of switching the operation mode, a case is described in which the mode designating signal S1 is set to high level when the on-duty of the MOS transistor Q1 is the threshold value TH or more, while the mode designating signal S1 is set to low level when the on-duty of the MOS transistor Q1 is lower than the threshold value TH. In addition, for simple description, it is regarded that a voltage applied to the first external pin P1 is always the same as the battery voltage $V_{BAT}$.

When the ratio of the battery voltage $V_{BAT}$ to the output voltage $V_{OUT}$ is more than the inverse of the threshold value TH, the switching regulator shown in FIG. 26 operates in the step-down mode (see FIG. 11). In the step-down mode, the step-down control circuit 1 controls on/off of the MOS transistors Q1 and Q2 according to the feedback voltage $V_{FB}$, and because the mode designating signal S1 is at low level, the external output signal S3 becomes a signal at low level, and the MOS transistor Q3 is kept in off-state, while the MOS transistor Q4 is kept in on-state. In this way, the first switch voltage $V_{SW1}$ as the voltage at the connection node between the MOS transistors Q1 and Q2 and the second switch voltage $V_{SW2}$ as the voltage at the connection node between the MOS transistors Q3 and Q4 become as shown in FIG. 17A.

In addition, the transfer characteristic of the entire switching regulator shown in FIG. 26 in the step-down mode is expressed by the above equation (3) as described above in the first embodiment.

On the other hand, when the ratio of the battery voltage $V_{BAT}$ to the output voltage $V_{OUT}$ is less than or equal to the inverse of the threshold value TH, the switching regulator shown in FIG. 26 operates in the step up/down mode (see FIG. 11). In the step up/down mode, the step-down control circuit 1 controls on/off of the MOS transistors Q1 and Q2 according to the feedback voltage $V_{FB}$, and because the mode designating signal S1 is at high level, the external output signal S3 becomes the same signal as the pulse signal S2 (a pulse signal having a fixed on-duty), and the MOS transistors Q3 and Q4 are complementarily turned on/off in the state where the on-duty D (0≤D≤1) of the MOS transistor Q3 is fixed to the fixed value D' (0<D'<1). In this way, the first switch voltage $V_{SW1}$ as the voltage at the connection node between the MOS transistors Q1 and Q2 and the second switch voltage $V_{SW2}$ as the voltage at the connection node between the MOS transistors Q3 and Q4 become as shown in FIG. 17B. Note that in the step up/down mode, the on-duty of the MOS transistor Q3 is set independently of each of the output voltage $V_{OUT}$ and the battery voltage $V_{BAT}$.

In addition, the transfer characteristic of the entire switching regulator shown in FIG. 26 in the step up/down mode is expressed by the above equation (4) as described above in the first embodiment.

By the step-down operation in the step-down mode and the step up/down operation in the step up/down mode, the on-duty $D_{Q1}$ of the MOS transistor Q1 and the on-duty $D_{Q3}$ of the MOS transistor Q3 become as shown in FIG. 12.

In the same manner as the switching regulator 101 of the first embodiment, the transfer function of the switching regulator shown in FIG. 26 in the step up/down mode does not have the right half-plane zero characteristic.

In addition, in the same manner as the switching regulator 101 of the first embodiment, in the switching regulator shown in FIG. 26, the optimal value of the threshold value TH does not change even if the setting of the output voltage $V_{OUT}$ is changed, and hence it is not necessary to change the setting of the threshold value TH.

In addition, a result of simulation in the switching regulator shown in FIG. 26 is the same as the result of simulation in the switching regulator 101 of the first embodiment (see FIGS. 13 and 14A to 14C).

Figure 27:
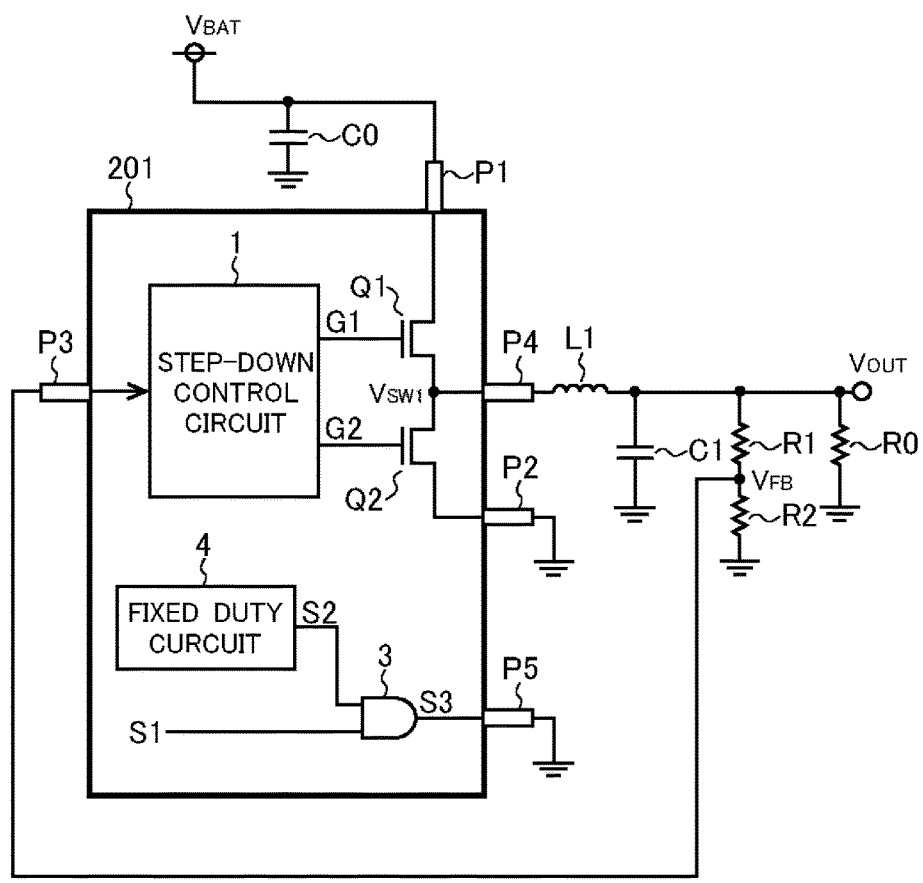
FIG. 27 is a diagram showing an overall structure example of the switching regulator in a case where the integrated circuit package according to the fifth embodiment is used as a component of the step-down switching regulator.

The integrated circuit package 201 according to this embodiment can also be used as a component of the step-down switching regulator as shown in FIG. 27. In this case, the external output signal S3 is not used in the outside of the integrated circuit package 201 according to this embodiment, and hence the fifth external pin P5 is connected to the ground potential in the structure shown in FIG. 27. Instead of the structure shown in FIG. 27, the fifth external pin P5 may be connected to the ground potential via a resistor. A structure may be adopted, in which a determination circuit that determines an external connection state of the fifth external pin P5 is disposed in the integrated circuit package 201 according to this embodiment, and when the determination circuit determines that the fifth external pin P5 is terminated, even if the mode designating signal S1 is at high level in a sixth embodiment described later, the gain of the error amplifier 11 is not increased, and even if the mode designating signal S1 is at high level in a seventh embodiment described later, an overcurrent detection threshold value is not increased. Also by making the fifth external pin P5 be open instead of the structure shown in FIG. 27, the integrated circuit package 201 according to this embodiment can be used as a component of the step-down switching regulator.

Note that when the integrated circuit package 201 according to this embodiment is used as a component of the step-down switching regulator as described above, a decrease of the voltage applied to the first external pin P1 when the battery voltage $V_{BAT}$ is decreased can be suppressed by increasing a capacitance of the input capacitor C0.

<Overall Structure (Sixth Embodiment)>

Figure 28:
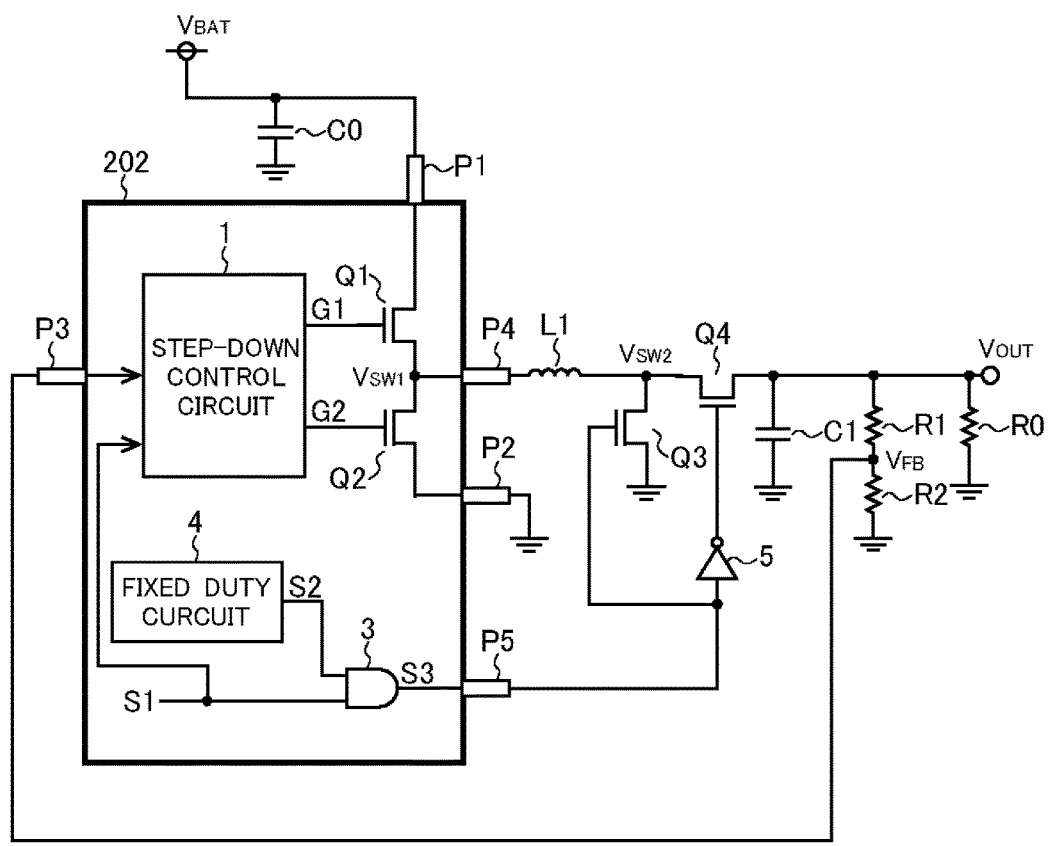
FIG. 28 is a diagram showing an overall structure example of a sixth embodiment of the switching regulator.

FIG. 28 is a diagram showing an overall structure example of the switching regulator when using the integrated circuit package according to the sixth embodiment as a component of the step up/down switching regulator. An integrated circuit package 202 according to this embodiment is different from the integrated circuit package 201 in that the mode designating signal S1 is also supplied to the step-down control circuit 1 in addition to the AND gate 3, and other points are basically the same as the integrated circuit package 201.

<Structure Example of Step-Down Control Circuit>

Figure 29:
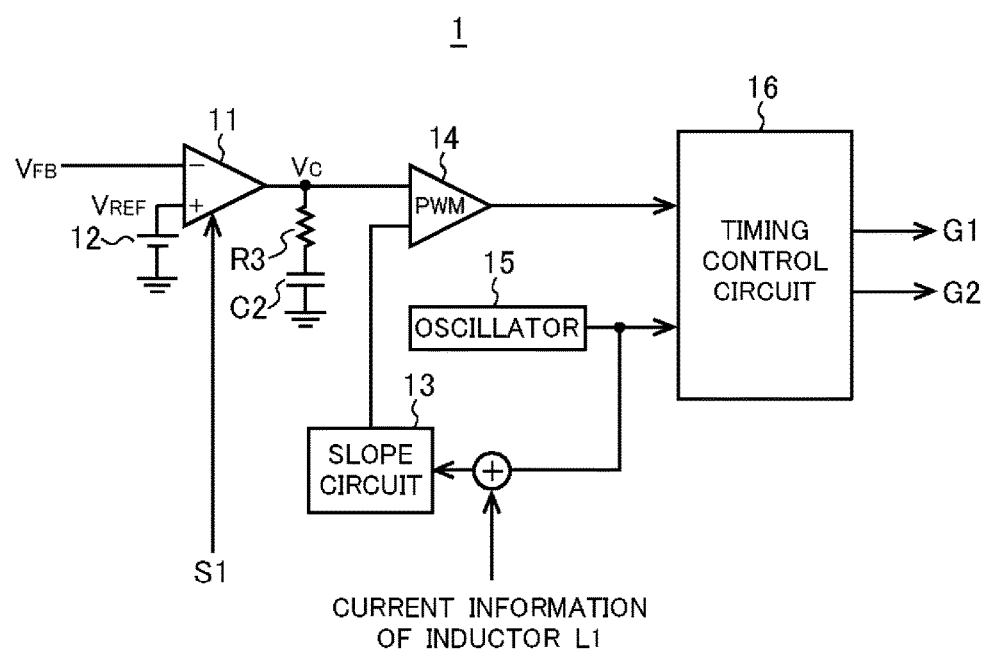
FIG. 29 is a diagram showing a structure example of the step-down control circuit in the sixth embodiment.

FIG. 29 is a diagram showing a structure example of the step-down control circuit 1. The step-down control circuit 1 of the example shown in FIG. 29 is different from the step-down control circuit 1 of the example shown in FIG. 2A described above in the first embodiment in that the error amplifier 11 is a variable gain amplifier, and other points are basically the same as the step-down control circuit 1 of the example shown in FIG. 2A.

The error amplifier 11 has a larger gain in a case where the mode designating signal S1 is at high level (in the step up/down mode) than in a case where the mode designating signal S1 is at low level (in the step-down mode). In this way, the transfer characteristic of the entire switching regulator shown in FIG. 28 in the step up/down mode becomes close to the transfer characteristic of the entire switching regulator shown in FIG. 28 in the step-down mode, and hence the response characteristic of the switching regulator shown in FIG. 28 in the step up/down mode is more improved.

Note that it is preferred that the error amplifier 11 should change the gain according to the mode designating signal S1, so that the multiplication value of the value obtained by subtracting the fixed value D' from 1 and the gain of the error amplifier 11 when the mode designating signal S1 is at high level (in the step up/down mode) is the same as the gain of the error amplifier 11 when the mode designating signal S1 is at low level (in the step-down mode). In this way, the transfer characteristic of the entire switching regulator shown in FIG. 28 in the step up/down mode can be the same as the transfer characteristic of the entire switching regulator shown in FIG. 28 in the step-down mode. Therefore, the response characteristic of the switching regulator shown in FIG. 28 in the step up/down mode can be the same as the response characteristic of the switching regulator shown in FIG. 28 in the step-down mode.

The integrated circuit package 202 according to this embodiment can also be used as a component of the step-down switching regulator in the same manner as the integrated circuit package 201.

<Overall Structure (Seventh Embodiment)>

Figure 30:
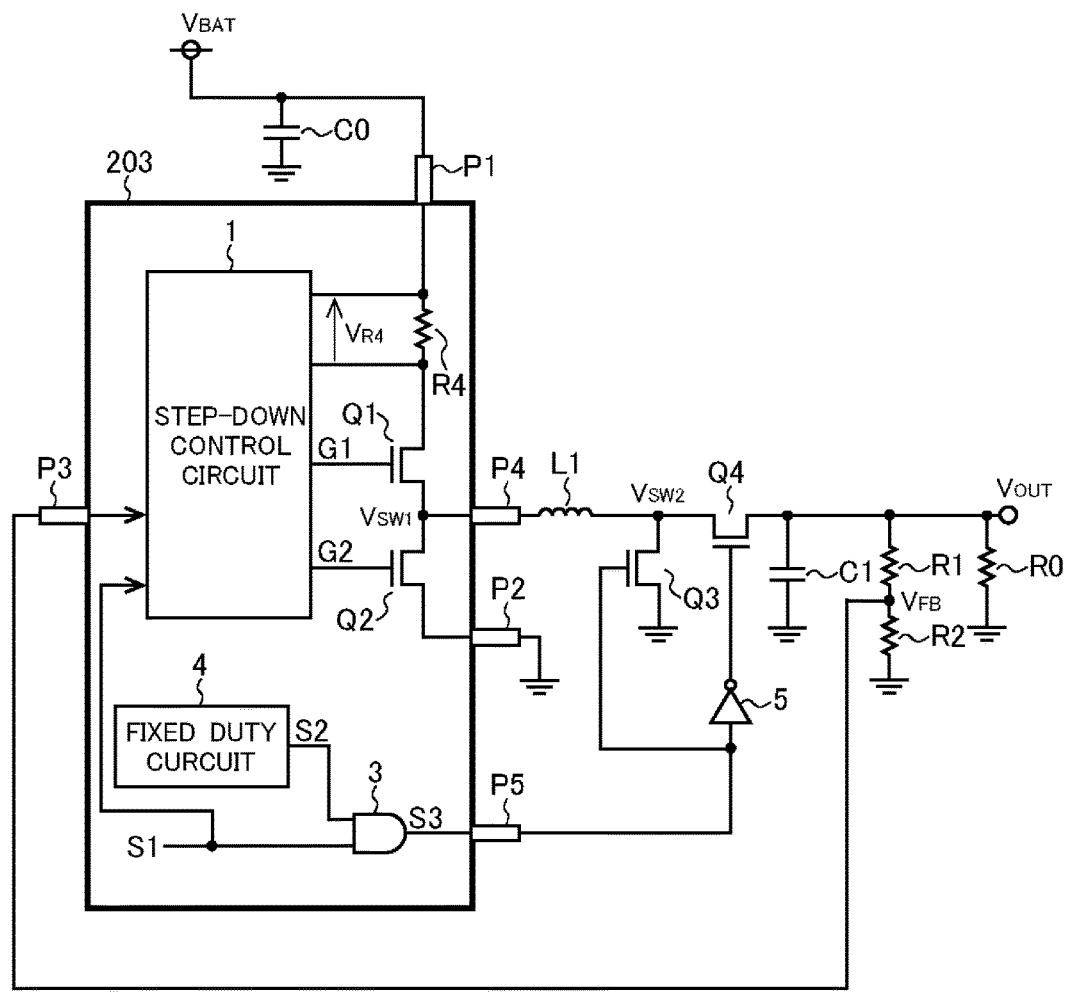
FIG. 30 is a diagram showing an overall structure example of a seventh embodiment of the switching regulator.

FIG. 30 is a diagram showing an overall structure example of the switching regulator when using the integrated circuit package according to the seventh embodiment as a component of the step up/down switching regulator. An integrated circuit package 203 according to this embodiment is different from the integrated circuit package 201 in that the mode designating signal S1 is also supplied to the step-down control circuit 1 in addition to the AND gate 3, and that the drain of the MOS transistor Q1 is connected to the first external pin P1 via a current detecting resistor R4 so that a voltage $V_{R4}$ across terminals of the current detecting resistor R4 is supplied to the step-down control circuit 1, and other points are basically the same as the integrated circuit package 201.

<Structure Example of the Step-Down Control Circuit>

Figure 31:
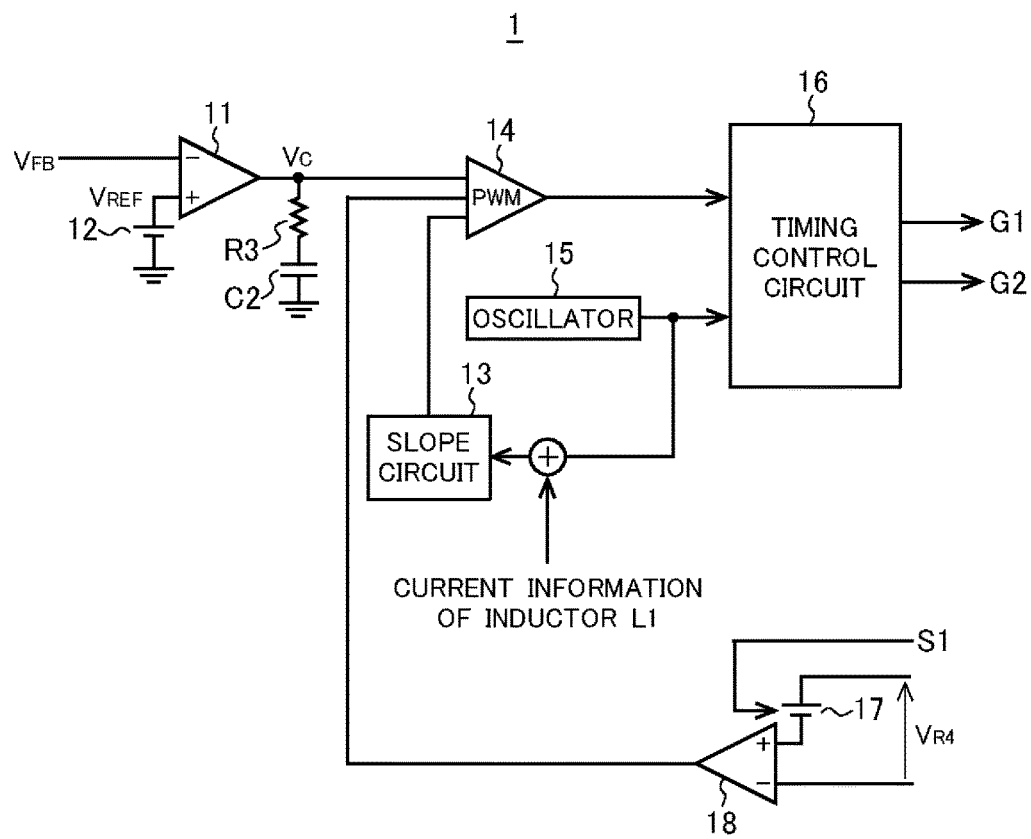
FIG. 31 is a diagram showing a structure example of the step-down control circuit in the seventh embodiment.

FIG. 31 is a diagram showing a structure example of the step-down control circuit 1.

The step-down control circuit 1 of the example shown in FIG. 31 is different from the step-down control circuit 1 of the example shown in FIG. 2A described above in the first embodiment in that a variable constant voltage source 17 and a comparator 18 are added, and that an output signal of the comparator 18 is supplied to the comparator 14, and other points are basically the same as the step-down control circuit 1 of the example shown in FIG. 2A.

The current detecting resistor R4 (see FIG. 30), the variable constant voltage source 17 and the comparator 18 monitor whether or not the current flowing in the MOS transistor Q1 has reached a predetermined overcurrent detection threshold value. An output voltage (offset voltage) of the variable constant voltage source 17 corresponds to the predetermined overcurrent detection threshold value. When the current flowing in the MOS transistor Q1 is the predetermined overcurrent detection threshold value or more, the comparator 18 outputs a high level signal. When the current flowing in the MOS transistor Q1 is less than the predetermined overcurrent detection threshold value, the comparator 18 outputs a low level signal. Note that the current detecting resistor R4 may be used for obtaining current information of the inductor L1 in addition to the overcurrent detection.

When the output signal of the comparator 18 is at low level, the comparator 14 compares the phase-compensated error signal with the output voltage of the slope circuit 13 so as to generate a comparison signal and outputs the same as a reset signal. When the output signal of the comparator 18 is at high level, the comparator 14 generates a high level signal and outputs the same as the reset signal. In this way, when the output signal of the comparator 18 is at high level, the step-down control circuit 1 maintains the MOS transistor Q1 in off-state, and hence the current flowing in the MOS transistor Q1 is suppressed.

The variable constant voltage source 17 has a larger value of the constant voltage (offset voltage) when the mode designating signal S is at high level (in the step up/down mode) than when the mode designating signal S1 is at low level (in the step-down mode). In this way, the predetermined overcurrent detection threshold value of the switching regulator shown in FIG. 30 in the step up/down mode can be set larger than the predetermined overcurrent detection threshold value of the switching regulator shown in FIG. 30 in the step-down mode.

The average current of the inductor L1 in the step-down mode is the same as the output current of the switching regulator shown in FIG. 30. In contrast, the average current of the inductor L1 in the step up/down mode has a value obtained by dividing the output current of the switching regulator shown in FIG. 30 by the value obtained by subtracting the fixed value D' from 1. Therefore, by changing the current detection threshold value as described above, the overcurrent detection in the step up/down mode can be prevented from being excessively hard.

Note that it is preferred that the variable constant voltage source 17 should change the value of the constant voltage (offset voltage) according to the mode designating signal S1, so that the multiplication value of the value obtained by subtracting the fixed value D' from 1 and the overcurrent detection threshold value when the mode designating signal S1 is at high level (in the step up/down mode) is the same as the predetermined overcurrent detection threshold value when the mode designating signal S1 is at low level (in the step-down mode). In this way, an allowable value of the output current of the switching regulator shown in FIG. 30 in the step up/down mode can be the same as that in the step-down mode.

The integrated circuit package 203 according to this embodiment can also be used as a component of the step-down switching regulator in the same manner as the integrated circuit packages 201 and 202.

<Overall Structure (Eighth Embodiment)>

An overall structure example of an eighth embodiment of the switching regulator is the same as the overall structure example of the first embodiment of the switching regulator shown in FIG. 1.

<Structure Example of the Step-Down Control Circuit>

A structure example of the step-down control circuit in this embodiment is the same as the structure example of the step-down control circuit shown in FIGS. 2A and 2B described above in the first embodiment.

Figure 33:
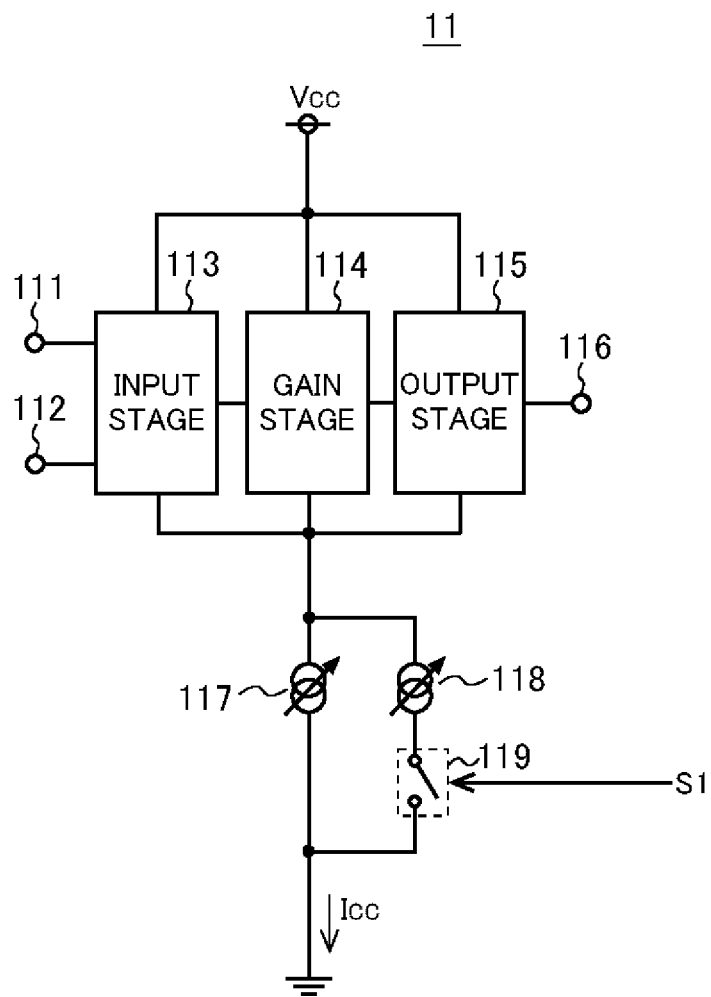
FIG. 33 is a diagram showing a structure example of an error amplifier in an eighth embodiment.

A structure example of the error amplifier 11 used in this embodiment is shown in FIG. 33. In the example shown in FIG. 33, the error amplifier 11 is constituted of an inverting input terminal 111, a noninverting input terminal 112, an input stage 113, a gain stage 114, an output stage 115, an output terminal 116, constant current sources 117 and 118, and a switch 119. Note that it is preferred that values of the constant currents output from the constant current sources 117 and 118 be individually adjustable.

The error amplifier 11 is driven by the internal power supply voltage $V_{CC}$ generated inside the step-down control circuit 1 as an integrated circuit (IC) and is an output source circuit in which the drive current Ice flows to the ground potential.

The input stage 113 outputs to the gain stage 114 an amplified signal obtained by amplifying a difference between a voltage supplied to the inverting input terminal 111 and a voltage supplied to the noninverting input terminal 112. The gain stage 114 further amplifies the amplified signal received from the input stage with a high gain so as to output the result to the output stage 115. The output stage 115 functions as a buffer and outputs the signal received from the gain stage 114 to the output terminal 116.

The series circuit of the constant current source 118 and the switch 119 is connected in parallel to the constant current source 117. The switch 119 becomes on-state when the mode designating signal S1 is at low level, i.e. in the step-down mode, while it becomes off-state when the mode designating signal S1 is at high level, i.e. in the step up/down mode. The output currents of the constant current sources 117 and 118 are set so that the sum current of the output current of the constant current source 117 and the output current of the constant current source 118 becomes 1/(1−D') times the output current of the constant current source 117. In this way, the drive current $I_{CC}$ of the error amplifier 11 in the step up/down mode becomes 1/(1−D') times the drive current $I_{CC}$ of the error amplifier 11 in the step-down mode. As a result, the gain of the error amplifier 11 in the step up/down mode becomes 1/(1−D') times the detection gain of the error amplifier 11 in the step-down mode.

<Generation Example of Slope Voltage>

One structure example of the current detection circuit 2 and the slope circuit 13 in this embodiment is the same as the one structure example of the current detection circuit 2 and the slope circuit 13 shown in FIG. 3 described above in the first embodiment.

One structure example of the voltage-to-current conversion circuit 2A in this embodiment is the same as the one structure example of the voltage-to-current conversion circuit 2A shown in FIG. 4 described above in the first embodiment.

A timing chart showing an operation example of the switching regulator 101 in the step-down mode in this embodiment is the same as the timing chart shown in FIG. 5 described above in the first embodiment. A timing chart showing an operation example of the switching regulator 101 in the case where the battery voltage $V_{BAT}$ is lower than the output voltage $V_{OUT}$ in the step up/down mode in this embodiment is the same as the timing chart shown in FIG. 6 described above in the first embodiment. A timing chart showing an operation example of the switching regulator 101 in the case where the battery voltage $V_{BAT}$ is higher than the output voltage $V_{OUT}$ in the step up/down mode in this embodiment is the same as the timing chart shown in FIG. 7 described above in the first embodiment.

<Operation Mode>

As an example of switching the operation mode, a case is described below in which the mode designating signal S1 is set to high level when the on-duty of the MOS transistor Q1 is the threshold value TH or more, while the mode designating signal S1 is set to low level when the on-duty of the MOS transistor Q1 is lower than the threshold value TH.

When the ratio of the battery voltage $V_{BAT}$ to the output voltage $V_{OUT}$ is more than the inverse of the threshold value TH, the switching regulator 101 operates in the step-down mode (see FIG. 11). In the step-down mode, the step-down control circuit 1 controls on/off of the MOS transistors Q1 and Q2 according to the feedback voltage $V_{FB}$, and because the mode designating signal S1 is at low level, the MOS transistor Q3 is kept in off-state while the MOS transistor Q4 is kept in on-state.

In addition, the transfer characteristic of the entire switching regulator 101 in the step-down mode is expressed by the above equation (3) as described above in the first embodiment.

On the other hand, in the case where the ratio of the battery voltage $V_{BAT}$ to the output voltage $V_{OUT}$ is less than or equal to the inverse of the threshold value TH, the switching regulator 101 operates in the step up/down mode (see FIG. 11). In the step up/down mode, the step-down control circuit 1 controls on/off of the MOS transistors Q1 and Q2 according to the feedback voltage $V_{FB}$, and because the mode designating signal S is at high level, the MOS transistors Q3 and Q4 are complementarily turned on/off in the state where the on-duty D (0≤D≤1) of the MOS transistor Q3 is fixed to the fixed value D' (0<D'<1). Note that in the step up/down mode, the on-duty of the MOS transistor Q3 is set independently of each of the output voltage $V_{OUT}$ and the battery voltage $V_{BAT}$.

In addition, the transfer characteristic of the entire switching regulator 101 in the step up/down mode is expressed by the above equation (4) as described above in the first embodiment.

By the step-down operation in the step-down mode and the step up/down operation in the step up/down mode, the on-duty $D_{Q1}$ of the MOS transistor Q1 and the on-duty $D_{Q3}$ of the MOS transistor Q3 become as shown in FIG. 12.

Using the above equation (3), the response characteristic of the switching regulator 101 in the step-down mode is expressed by the following equation (5). In addition, using the above equation (4), the response characteristic of the switching regulator 101 in the step up/down mode is expressed by the following equation (6).

[Mathematical 5]

$$\frac{\Delta V_{OUT}}{\Delta V_{IN}} = \frac{\Delta V_C}{\Delta V_{IN}} \cdot \frac{\Delta V_{OUT}}{\Delta V_C} = \frac{\Delta V_C}{\Delta V_{IN}} \cdot \frac{R}{R_S} \cdot \frac{1}{1+R \cdot C \cdot s} \quad (5)$$

[Mathematical 6]

$$\frac{\Delta V_{OUT}}{\Delta V_{IN}} = \frac{\Delta V_C}{\Delta V_{IN}} \cdot \frac{\Delta V_{OUT}}{\Delta V_C} = \frac{\Delta V_C}{\Delta V_{IN}} \cdot \frac{R}{R_S} \cdot (1-D') \frac{1}{1+R \cdot C \cdot s} \quad (6)$$

The output voltage $V_C$ of the error amplifier 11 is proportional to the gain of the error amplifier 11. Further, as described above, the gain of the error amplifier 11 in the step up/down mode is $1/(1-D')$ times the gain of the error amplifier 11 in the step-down mode. In this way, the response characteristic of the switching regulator 101 in the step up/down mode is the same as the response characteristic of the switching regulator 101 in the step-down mode. Therefore, the transfer function of the switching regulator 101 in the step up/down mode does not have the right half-plane zero characteristic. Thus, it is not necessary that the output capacitor C1 has a large capacitance, and cost of the output capacitor can be reduced.

In addition, as described above in the first embodiment, in the switching regulator 101, because the optimal value of the threshold value TH does not change even if the setting of the output voltage $V_{OUT}$ is changed, it is not necessary to change the setting of the threshold value TH.

In addition, a result of simulation about the first switch voltage $V_{SW1}$, the output voltage $V_{OUT}$, and the output signal S3 of the AND gate 4 in the switching regulator 101 of this embodiment is the same as the result of simulation about the first switch voltage $V_{SW1}$, the output voltage $V_{OUT}$, and the output signal S3 of the AND gate 4 in the switching regulator 101 of the first embodiment (see FIG. 13).

Figure 34:
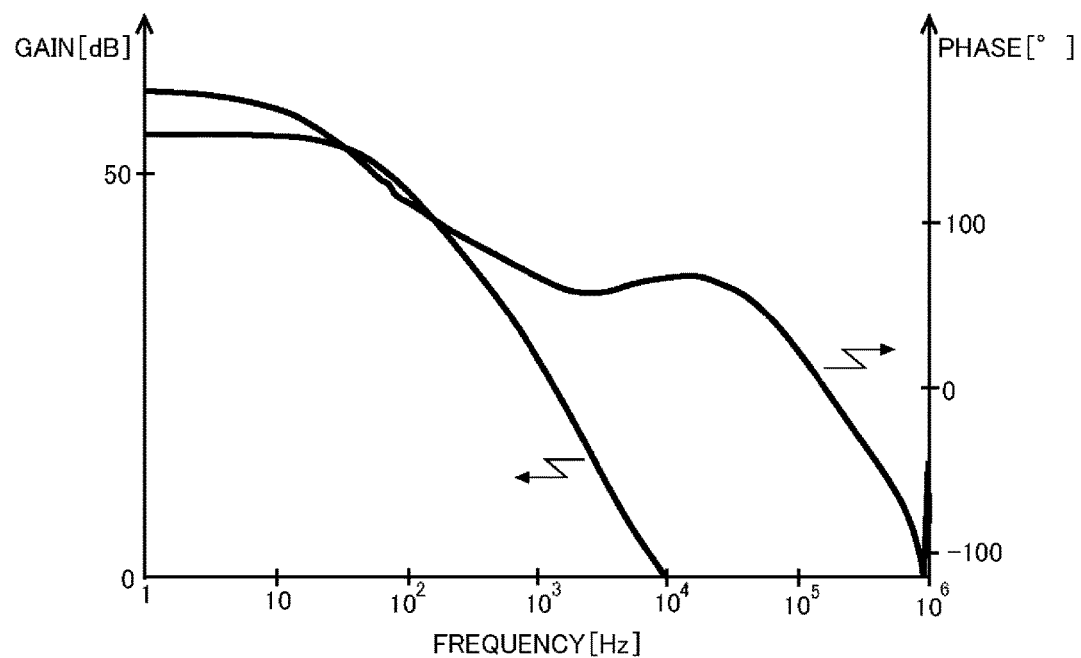
FIG. 34 is a Bode diagram.

In addition, a result of simulation about a Bode diagram of the switching regulator 101 of this embodiment is shown in FIG. 34. FIG. 34 is a Bode diagram in a case where the battery voltage $V_{BAT}$ is 12 (V) while the output voltage $V_{OUT}$ is 5 (V), i.e. in the step-down mode, and is also a Bode diagram in a case where the battery voltage $V_{BAT}$ is 4 (V) while the output voltage $V_{OUT}$ is 5 (V). i.e. in the step up/down mode. Both in the step-down mode and in the step up/down mode, the control system is stable.

Ninth Embodiment

Figure 35:
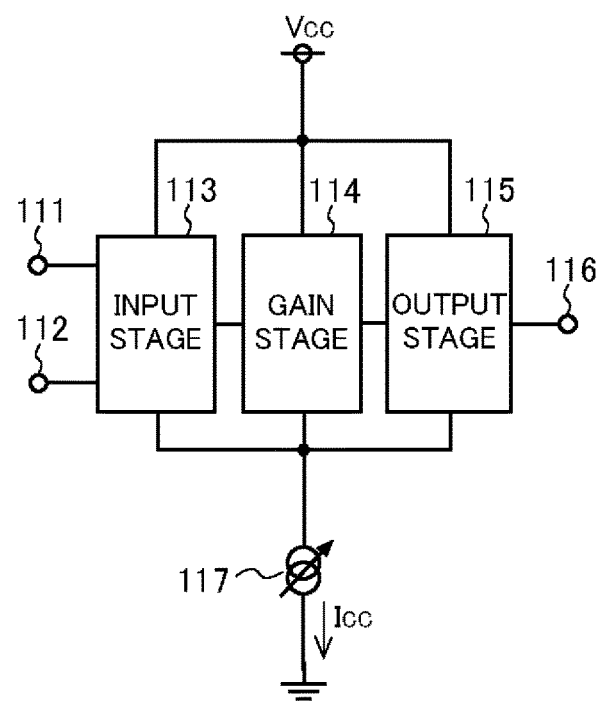
FIG. 35 is a diagram showing another structure example of the error amplifier.

The switching regulator according to this embodiment has the same structure as the eighth embodiment except that the error amplifier 11 has a structure shown in FIG. 35, and the voltage-to-current conversion circuit 2A as the current detection circuit has the structure shown in FIG. 20 described above in the third embodiment.

The error amplifier 11 shown in FIG. 35 has a structure in which the constant current source 118 and the switch 119 are eliminated from the error amplifier 11 shown in FIG. 33. Therefore, in the error amplifier 11 shown in FIG. 35, the gain in the step-down mode is the same as the gain in the step up/down mode.

In this embodiment, a resistance of the resistor 24 and a resistance of the resistor 28 are set so that the combined resistance $R_{COM}$ of the resistor 24 and the resistor 28 becomes $(1-D')$ times the resistance $R_{24}$ of the resistor 24. Therefore, the detection gain of the voltage-to-current conversion circuit 2A as the current detection circuit in the step up/down mode becomes $(1-D')$ times the detection gain of the voltage-to-current conversion circuit 2A as the current detection circuit in the step-down mode.

In this embodiment, the gain of the error amplifier 11 in the step up/down mode is the same as the detection gain of the error amplifier 11 in the step-down mode. Further, the detection gain of the voltage-to-current conversion circuit 2A as the current detection circuit in the step up/down mode is $(1-D')$ times the detection gain of the voltage-to-current conversion circuit 2A as the current detection circuit in the step-down mode, and hence the transfer characteristic of the entire switching regulator 101 in the step-down mode expressed by the above equation (3) is the same as the transfer characteristic of the entire switching regulator 101 in the step up/down mode expressed by the above equation (4). In this way, the response characteristic of the switching regulator 101 in the step up/down mode is the same as the response characteristic of the switching regulator 101 in the step-down mode. Therefore, the transfer function of the switching regulator 101 in the step up/down mode does not have the right half-plane zero characteristic. Therefore, the capacitor C1 is not required to have a large capacitance, and hence cost of the output capacitor can be reduced.

<Applications>

Figure 36:
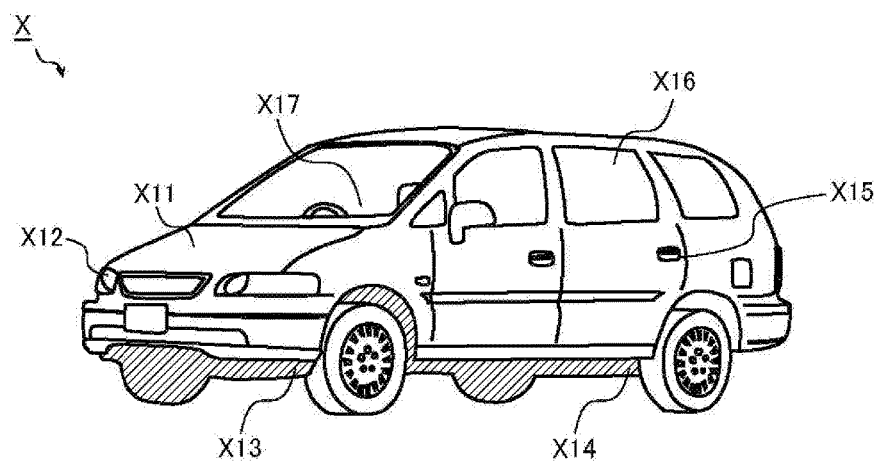
FIG. 36 is an external view showing a structure example of a vehicle in which in-vehicle devices are mounted.

Next, application examples of the switching regulators 101 to 102 described above and the switching regulators shown in FIGS. 26, 28, and 30 are described. FIG. 36 is an external view showing one structure example of a vehicle in which in-vehicle devices are mounted. A vehicle X of this structure example is equipped with a battery (not shown), a primary switching regulator (not shown) to which a DC voltage supplied from the battery is input, a secondary switching regulator (not shown) to which a DC voltage output from the primary switching regulator is input, and in-vehicle devices X11 to X17. The switching regulators 101 to 102 described above and the switching regulators shown in FIGS. 26, 28, and 30 can be applied to the primary switching regulator.

Each of the in-vehicle devices X11 to X17 uses one of the output voltage of the primary switching regulator and the output voltage of the secondary switching regulator, as a power supply voltage.

The in-vehicle device X11 is an engine control unit that performs control about engine (such as injection control, electronic throttle control, idling control, oxygen sensor heater control, and automatic cruise control).

The in-vehicle device X12 is a lamp control unit that performs on/off control of a high intensity discharge lamp (HID), a daytime running lamp (DRL), and the like.

The in-vehicle device X13 is a transmission control unit that performs control about transmission.

The in-vehicle device X14 is a body control unit that performs control about movement of the vehicle X (such as anti-lock brake system (ABS) control, electric power steering (EPS) control, electronic suspension control, and the like).

The in-vehicle device X15 is a security control unit that performs control of driving a door lock, an anti-theft alarm, and the like.

The in-vehicle device X16 is an electronic device such as a wiper, an electric door mirror, a power window, an electric sunroof, an electric seat, or an air conditioner, which is mounted in the vehicle X at the shipping stage as standard equipment or a factory-installed option.

The in-vehicle device X17 is an electronic device such as an in-vehicle audio/visual (A/V) device, a car navigation system, or an electronic toll collection system (ETC), which is mounted in the vehicle X as an user option.

<Other Variations>

Note that the structure of the present invention can be modified within the scope of the invention without deviating from the spirit thereof, other than the embodiments described above.

For example, the sixth embodiment and the seventh embodiment can be combined and implemented. In addition, for example, the variations and appropriate examples described in the first embodiment (such as using a diode instead of the MOS transistor Q2, using a diode instead of the MOS transistor Q4, providing a dead time, setting the fixed value D' to 0.7 or smaller, or sharing the oscillator 15) can also be applied to the second to ninth embodiments. In addition, in the third embodiment, the voltage-to-current conversion circuit 2A shown in FIG. 20 and the slope circuit 13 shown in FIG. 22 may be used for generating the slope voltage. This variation can also be applied to the fourth embodiment. However, in the fourth embodiment, the switch 13G temporarily becomes on-state during the period after the mode designating signal S1 switches from high level to low level until a predetermined time elapses, i.e. during the period after switching from the step up/down mode to the step-down mode until a predetermined time elapses, while it becomes off-state in other period. In addition, in the fourth embodiment, the switch 27 temporarily becomes off-state during the period after the mode designating signal S switches from high level to low level until a predetermined time elapses, i.e. during the period after switching from the step up/down mode to the step-down mode until a predetermined time elapses, while it becomes on-state in other period.

In addition, the third embodiment and the fourth embodiment may be realized by individual switching regulators, or both the third embodiment and the fourth embodiment may be realized by a single switching regulator.

In addition, the current mode control type switching regulator is described in the fifth to seventh embodiments described above, but the present invention having the third technical feature is not limited to this. For example, other control method such as voltage mode control may be used.

In addition, the battery voltage is used as the input voltage to the switching regulator in each embodiment described above, but the present invention is not limited to this. The input voltage to the switching regulator may be a DC voltage other than the battery voltage.

In addition, the fixed duty circuit 4 may set one fixed value of on-duty or may set a plurality of fixed values of on-duty. If the fixed duty circuit 4 sets a plurality of fixed values of on-duty, it should be configured that any one of them can be selected. This selection may be automatically performed in the switching regulator or may be performed by user's input operation. An example in which the selection is automatically performed in the switching regulator is described below. In this example, every time when it is determined that the on-duty of the MOS transistor Q1 is a first threshold value or higher in the step up/down mode, the fixed value D' is increased by one step. In addition, every time when it is determined that the on-duty of the MOS transistor Q1 is a second threshold value or lower in the step up/down mode, the fixed value D' is decreased by one step.

In the third and fourth embodiments described above, current flowing in the inductor L1 is detected by detecting current flowing in the MOS transistor Q2 when the MOS transistor Q2 is turned on, but it is possible to configure to detect the current flowing in the inductor L1 by detecting current flowing in the MOS transistor Q1 when the MOS transistor Q1 is turned on.

In addition, the constant voltage (offset voltage) of the variable constant voltage source 17 is changed according to the mode designating signal S1 in the seventh embodiment described above, but the present invention having the third technical feature is not limited to this. For example, the variable constant voltage source 17 may be replaced with the constant voltage source, and the voltage $V_{R4}$ across terminals of the current detecting resistor R4 may be attenuated according to the mode designating signal S1 so as to be applied between a positive electrode of the constant voltage source and the inverting input terminal of the comparator 18.

Figure 32:
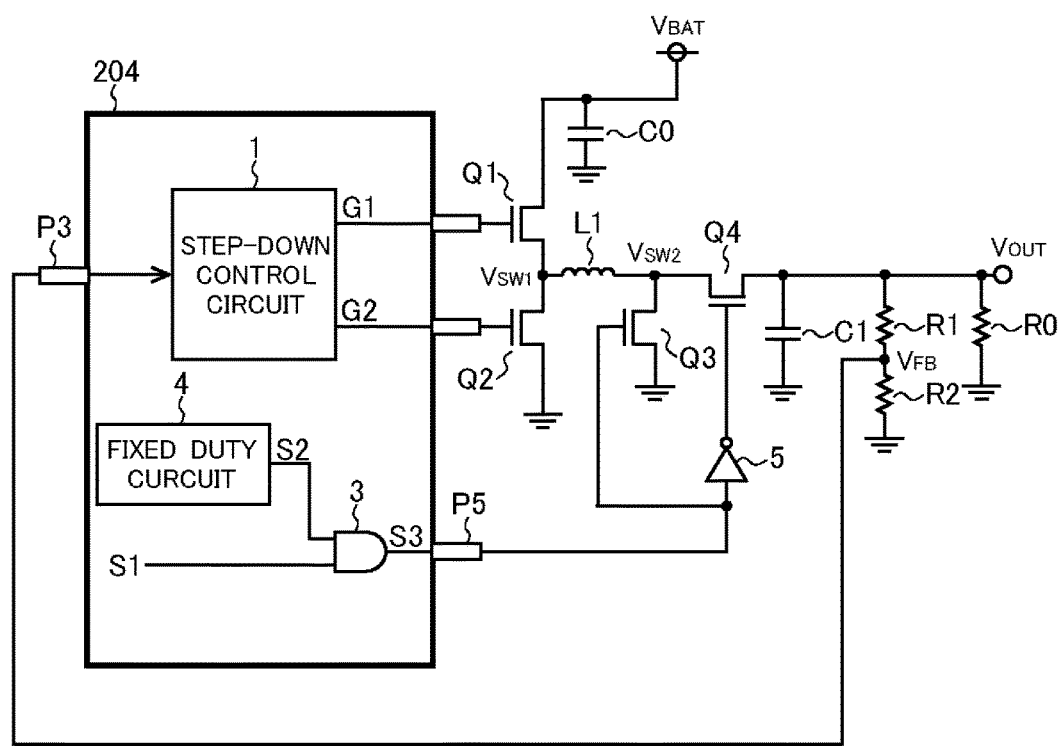
FIG. 32 is a diagram showing a variation of the switching regulator.

In addition, the MOS transistors Q1 and Q2 are disposed in the integrated circuit package in the fifth to seventh embodiments described above, but the present invention having the third technical feature is not limited to this. For example, a structure may be adopted in which the MOS transistors Q1 and Q2 are externally connected like an integrated circuit package 204 shown in FIG. 32, so that the gate signal G1 of the MOS transistor Q1 and the gate signal G2 of the MOS transistor Q2 are externally output.

In addition, the gain of the error amplifier 11 in the step up/down mode is set to 1/(1−D') times the detection gain of the error amplifier 11 in the step-down mode in the eighth embodiment described above, but the present invention having the fourth technical feature is not limited to this. By setting the gain of the error amplifier 11 in the step up/down mode to be larger than the gain of the error amplifier 11 in the step-down mode, a decrease in the gain of the control system in the step up/down mode can be suppressed.

In addition, the detection gain of the voltage-to-current conversion circuit 2A as the current detection circuit in the step up/down mode is set to (1−D') times the detection gain of the voltage-to-current conversion circuit 2A as the current detection circuit in the step-down mode in the ninth embodiment described above, but the present invention having the fourth technical feature is not limited to this. By setting the detection gain of the voltage-to-current conversion circuit 2A as the current detection circuit in the step up/down mode to be smaller than the detection gain of the voltage-to-current conversion circuit 2A as the current detection circuit in the step-down mode, a decrease in the gain of the control system in the step up/down mode can be suppressed.

In this way, the embodiments described above are merely examples in every aspect and should not be interpreted as limitations. The technical scope of the present invention is defined not by the above description of the embodiments but by the claims, and it should be understood to include all modifications within meanings and scopes equivalent to the claims.

INDUSTRIAL APPLICABILITY

The present invention can be applied to step up/down switching regulators used in all fields (such as home appliances, automobiles, and industrial machines).

LIST OF REFERENCE SIGNS 1 step-down control circuit
2, 6 current detection circuit
2A voltage-to-current conversion circuit
3 AND gate
4 fixed duty circuit
5 NOT gate
11 error amplifier
12 reference voltage source
13 slope circuit 13A to 13C, 13G, 27, 119 switch
13D, 13F, 117, 118 constant current source
14, 18 comparator
15 oscillator
16 timing control circuit
17 variable constant voltage source
20 current source
101, 102 switching regulator
111 inverting input terminal
112 noninverting input terminal
113 input stage
114 gain stage
115 output stage
116 output terminal
201 to 204 integrated circuit package
C0 input capacitor
C1 output capacitor
C2, 13E capacitor
L1 inductor
P1 to P5 first to fifth external pins
Q1 to Q4, 21, 22, 25, 26 MOS transistor
R0 output resistor
R1, R2 dividing resistor
R3, 23, 24, 28 resistor
R4 current detecting resistor
X vehicle
X11 to X17 in-vehicle device

The invention claimed is:

1. A switching regulator arranged to generate an output voltage from an input voltage, comprising:
 a first switch having a first terminal connected to an application terminal of the input voltage;
 a second switch having a first terminal connected to a second terminal of the first switch and a second terminal connected to an application terminal of a predetermined voltage lower than the input voltage;
 a current detection unit arranged to detect current flowing in the second switch;
 an inductor having a first terminal connected to a connection node between the first switch and the second switch;
 a third switch having a first terminal connected to a second terminal of the inductor and a second terminal connected to the application terminal of the predetermined voltage;
 a fourth switch having a first terminal connected to a connection node between the inductor and the third switch and a second terminal connected to an application terminal of the output voltage;
 a first control circuit arranged to generate a step-down control signal for complementarily turning on/off the first switch and the second switch according to the output voltage; and
 a second control circuit arranged to generate a step-up control signal for complementarily turning on/off the third switch and the fourth switch by fixing an on-duty D (0≤D≤1) of the third switch to a fixed value D' (0<D'<1) in a step up/down mode, wherein
 the first control circuit includes a slope voltage generation unit arranged to accumulate current information detected by the current detection unit, and to combine the accumulated current information with a ramp voltage generated by a ramp voltage generation unit so as to generate a slope voltage, and the first control circuit generates the step-down control signal according to the slope voltage.

2. The switching regulator according to claim 1, wherein the first control circuit accumulates the current information detected by the current detection unit during a predetermined period in which the first switch is in off-state.

3. The switching regulator according to claim 1 or 2, wherein a timing when the first switch switches from off to on is substantially the same as a timing when the third switch switches from on to off.

4. The switching regulator according to any one of claims 1 to 3, wherein
 the current detection unit is a voltage-to-current conversion circuit arranged to convert a voltage corresponding to the current flowing in the second switch into current, and
 the slope voltage generation unit includes a capacitor arranged to be charged by output current of the voltage-to-current conversion circuit.

5. The switching regulator according to claim 4, wherein the slope voltage generation unit further includes a charging switch arranged to connect/disconnect a current path from an output terminal of the voltage-to-current conversion circuit to the capacitor.

6. The switching regulator according to claim 4 or 5, wherein the slope voltage generation unit includes a reset unit arranged to reset a charging voltage of the capacitor by discharging the capacitor.

7. The switching regulator according to any one of claims 1 to 6, wherein the first control circuit includes
 an error amplifier arranged to generate an error signal corresponding to a difference between a voltage corresponding to the output voltage of the switching regulator and a reference voltage,
 a comparator arranged to compare the slope voltage with the error signal so as to generate a reset signal as a comparison signal,
 an oscillator arranged to generate a set signal as a clock signal having a predetermined frequency, and
 a timing control circuit arranged to generate the step-down control signal according to the set signal and the reset signal.

8. The switching regulator according to any one of claims 1 to 7, wherein
 the second switch is a MOS transistor, and
 the current detection unit detects the current flowing in the second switch using a voltage across terminals of an on-resistance of the MOS transistor.

9. The switching regulator according to any one of claims 1 to 8, wherein
 when a ratio of the output voltage to the input voltage is a predetermined value or less, the first control circuit generates the step-down control signal according to current detected by the current detection unit, and
 when the ratio of the output voltage to the input voltage is not the predetermined value or less, the first control circuit generates the step-down control signal without depending on the current detected by the current detection unit.

10. The switching regulator according to claim 9, further comprising a first switch current detection unit arranged to detect current flowing in the first switch, wherein
 when the ratio of the output voltage to the input voltage is not the predetermined value or less, the first control circuit generates the step-down control signal according to current detected by the first switch current detection unit.

11. A switching regulator arranged to generate an output voltage from an input voltage, comprising:

a first switch having a first terminal connected to an application terminal of the input voltage;

a second switch having a first terminal connected to a second terminal of the first switch and a second terminal connected to an application terminal of a predetermined voltage lower than the input voltage;

a current detection unit arranged to detect current flowing in the second switch;

an inductor having a first terminal connected to a connection node between the first switch and the second switch;

a third switch having a first terminal connected to a second terminal of the inductor and a second terminal connected to the application terminal of the predetermined voltage;

a fourth switch having a first terminal connected to a connection node between the inductor and the third switch and a second terminal connected to an application terminal of the output voltage;

a first control circuit arranged to generate a step-down control signal for complementarily turning on/off the first switch and the second switch according to the output voltage; and a second control circuit arranged to generate a step-up control signal for complementarily turning on/off the third switch and the fourth switch by setting an on-duty of the third switch independently of each of the output voltage and the input voltage in a step up/down mode, wherein the first control circuit includes a slope voltage generation unit arranged to accumulate current information detected by the current detection unit, and to combine the accumulated current information with a ramp voltage generated by a ramp voltage generation unit so as to generate a slope voltage, and the first control circuit generates the step-down control signal according to the slope voltage.

12. A switching regulator arranged to generate an output voltage from an input voltage, comprising:

a first switch having a first terminal connected to an application terminal of the input voltage;

a second switch having a first terminal connected to a second terminal of the first switch and a second terminal connected to an application terminal of a predetermined voltage lower than the input voltage;

an inductor having a first terminal connected to a connection node between the first switch and the second switch;

a third switch having a first terminal connected to a second terminal of the inductor and a second terminal connected to the application terminal of the predetermined voltage;

a fourth switch having a first terminal connected to a connection node between the inductor and the third switch and a second terminal connected to an application terminal of the output voltage;

a first control circuit arranged to generate a step-down control signal for complementarily turning on/off the first switch and the second switch according to the output voltage; and a second control circuit arranged to generate a step-up control signal for complementarily turning on/off the third switch and the fourth switch by fixing an on-duty D ($0 \leq D \leq 1$) of the third switch to a fixed value D' ($0 < D' < 1$) in a step up/down mode, wherein when switching from a step-down mode in which the second control circuit does not generate the step-up control signal to the step up/down mode, an on-duty of the first switch is temporarily increased in an initial stage of the step up/down mode.

13. The switching regulator according to claim 12, further comprising a current detection unit arranged to detect current flowing in the inductor, wherein the first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal, and wherein when switching from the step-down mode to the step up/down mode, an offset of the slope voltage is temporarily decreased in an initial stage of the step up/down mode.

14. The switching regulator according to claim 13, wherein the slope voltage generation unit sets the offset of the slope voltage to be larger as current detected by the current detection unit is larger, and when switching from the step-down mode to the step up/down mode, a detection gain of the current detection unit is temporarily decreased in an initial stage of the step up/down mode.

15. The switching regulator according to claim 12, further comprising a current detection unit arranged to detect current flowing in the inductor, wherein the first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal, and wherein when switching from the step-down mode to the step up/down mode, a gradient of the slope voltage is temporarily decreased in an initial stage of the step up/down mode.

16. A switching regulator arranged to generate an output voltage from an input voltage, comprising:

a first switch having a first terminal connected to an application terminal of the input voltage;

a second switch having a first terminal connected to a second terminal of the first switch and a second terminal connected to an application terminal of a predetermined voltage lower than the input voltage;

an inductor having a first terminal connected to a connection node between the first switch and the second switch;

a third switch having a first terminal connected to a second terminal of the inductor and a second terminal connected to the application terminal of the predetermined voltage;

a fourth switch having a first terminal connected to a connection node between the inductor and the third switch and a second terminal connected to an application terminal of the output voltage;

a first control circuit arranged to generate a step-down control signal for complementarily turning on/off the first switch and the second switch according to the output voltage; and a second control circuit arranged to generate a step-up control signal for complementarily turning on/off the third switch and the fourth switch by fixing an on-duty D (0≤D≤1) of the third switch to a fixed value D' (0<D'<1) in a step up/down mode, wherein when switching from the step up/down mode to a step-down mode in which the second control circuit does not generate the step-up control signal, an on-duty of the first switch is temporarily decreased in an initial stage of the step-down mode.

17. The switching regulator according to claim 16, further comprising a current detection unit arranged to detect current flowing in the inductor, wherein the first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal, and wherein when switching from the step up/down mode to the step-down mode, an offset of the slope voltage is temporarily increased in an initial stage of the step-down mode.

18. The switching regulator according to claim 17, wherein the slope voltage generation unit sets the offset of the slope voltage to be larger as current detected by the current detection unit is larger, and when switching from the step-down mode to the step up/down mode, a detection gain of the current detection unit is temporarily increased in an initial stage of the step-down mode.

19. The switching regulator according to claim 16, further comprising a current detection unit arranged to detect current flowing in the inductor, wherein the first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal, and wherein when switching from the step up/down mode to the step-down mode, a gradient of the slope voltage is temporarily increased in an initial stage of the step-down mode.

20. A switching regulator arranged to generate an output voltage from an input voltage, comprising:

a first switch having a first terminal connected to an application terminal of the input voltage;

a second switch having a first terminal connected to a second terminal of the first switch and a second terminal connected to an application terminal of a predetermined voltage lower than the input voltage;

a current detection unit arranged to detect current flowing in the second switch;

an inductor having a first terminal connected to a connection node between the first switch and the second switch;

a third switch having a first terminal connected to a second terminal of the inductor and a second terminal connected to the application terminal of the predetermined voltage;

a fourth switch having a first terminal connected to a connection node between the inductor and the third switch and a second terminal connected to an application terminal of the output voltage;

a first control circuit arranged to generate a step-down control signal for complementarily turning on/off the first switch and the second switch according to the output voltage; and a second control circuit arranged to generate a step-up control signal for complementarily turning on/off the third switch and the fourth switch by setting an on-duty of the third switch independently of each of the output voltage and the input voltage in the step up/down mode, wherein when switching from a step-down mode in which the second control circuit does not generate the step-up control signal to the step up/down mode, an on-duty of the first switch is temporarily increased in an initial stage of the step up/down mode.

21. A switching regulator arranged to generate an output voltage from an input voltage, comprising:

a first switch having a first terminal connected to an application terminal of the input voltage;

a second switch having a first terminal connected to a second terminal of the first switch and a second terminal connected to an application terminal of a predetermined voltage lower than the input voltage;

a current detection unit arranged to detect current flowing in the second switch;

an inductor having a first terminal connected to a connection node between the first switch and the second switch;

a third switch having a first terminal connected to a second terminal of the inductor and a second terminal connected to the application terminal of the predetermined voltage;

a fourth switch having a first terminal connected to a connection node between the inductor and the third switch and a second terminal connected to an application terminal of the output voltage;

a first control circuit arranged to generate a step-down control signal for complementarily turning on/off the first switch and the second switch according to the output voltage; and a second control circuit arranged to generate a step-up control signal for complementarily turning on/off the third switch and the fourth switch by setting an on-duty of the third switch independently of each of the output voltage and the input voltage in the step up/down mode, wherein when switching from the step up/down mode to a step-down mode in which the second control circuit does not generate the step-up control signal, an on-duty of the first switch is temporarily decreased in an initial stage of the step-down mode.

22. An integrated circuit package, comprising:
a first external pin to which an input voltage is applied;
a second external pin to which a predetermined voltage lower than the input voltage is applied;
a third external pin to which a feedback voltage is applied;
a first switch having a first terminal connected to the first external pin;
a second switch having a first terminal connected to a second terminal of the first switch and a second terminal connected to the second external pin;
a fourth external pin connected to a connection node between the first switch and the second switch;
a first control circuit arranged to generate a step-down control signal for complementarily turning on/off the first switch and the second switch according to the feedback voltage;
a second control circuit arranged to generate a pulse signal having an on-duty D ($0 \leq D \leq 1$) fixed to the fixed value D' ($0 < D' < 1$) in the step up/down mode; and
a fifth external pin arranged to externally output the pulse signal in the step up/down mode.

23. The integrated circuit package according to claim 22, wherein
the second control circuit generates a high level signal in a step-down mode, and
the fifth external pin externally outputs the high level signal in the step-down mode.

24. The integrated circuit package according to claim 22 or 23, wherein the fixed value D' is 0.7 or less.

25. The integrated circuit package according to any one of claims 22 to 24, wherein the first control circuit and the second control circuit share an oscillator, and the first control circuit generates the step-down control signal based on an output signal of the oscillator, while the second control circuit generates the pulse signal based on an output signal of the oscillator.

26. The integrated circuit package according to any one of claims 22 to 25, wherein
the first control circuit includes an error signal generation circuit arranged to generate an error signal obtained by giving a gain to a difference between the feedback voltage and a predetermined reference voltage, and
the error signal generation circuit sets a larger gain in the step up/down mode than in the step-down mode.

27. The integrated circuit package according to claim 26, wherein the multiplication value of a value obtained by subtracting the fixed value D' from 1 and the gain in the step up/down mode is the same as the gain in the step-down mode.

28. The integrated circuit package according to any one of claims 22 to 27 comprising an overcurrent protection circuit arranged to monitor whether or not current flowing in the first switch has reached a predetermined overcurrent detection threshold value, and to issue an instruction to suppress the current to the first control circuit when an overcurrent state of the current is detected, wherein
the overcurrent protection circuit sets the predetermined overcurrent detection threshold value to be larger in the step up/down mode than in the step-down mode.

29. The integrated circuit package according to claim 28, wherein the multiplication value of a value obtained by subtracting the fixed value D' from 1 and the predetermined overcurrent detection threshold value in the step up/down mode is the same as the predetermined overcurrent detection threshold value in the step-down mode.

30. The integrated circuit package according to any one of claims 22 to 29, wherein a plurality of fixed values D' are set, and an arbitrary one of them can be selected.

31. An integrated circuit package comprising:
a first external pin to which an input voltage is applied,
a second external pin to which a predetermined voltage lower than the input voltage is applied,
a third external pin to which a feedback voltage is applied,
a first switch having a first terminal connected to the first external pin,
a second switch having a first terminal connected to a second terminal of the first switch and a second terminal connected to the second external pin,
a fourth external pin connected to a connection node between the first switch and the second switch,
a first control circuit arranged to generate a step-down control signal for complementarily turning on/off the first switch and the second switch according to the feedback voltage;
a second control circuit arranged to generate a pulse signal having an on-duty D ($0 \leq D \leq 1$) set independently of each of the feedback voltage and the input voltage in the step up/down mode; and
a fifth external pin arranged to externally output the pulse signal in the step up/down mode.

32. An integrated circuit package comprising:
an external pin to which a feedback voltage is applied;
a first control circuit arranged to generate a step-down control signal according to the feedback voltage, the step-down control signal being for complementarily turning on/off a first switch and a second switch, the first switch having a first terminal connected to an application terminal of a first voltage, and the second switch having a first terminal connected to a second terminal of the first switch and a second terminal connected to an application terminal of a second voltage lower than the first voltage;
a second control circuit arranged to generate a pulse signal having an on-duty D ($0 \leq D \leq 1$) fixed to the fixed value D' ($0 < D' < 1$) in the step up/down mode; and
another external pin arranged to externally output the pulse signal in the step up/down mode.

33. A switching regulator arranged to generate an output voltage from an input voltage, comprising:
a first switch having a first terminal connected to an application terminal of the input voltage;
a second switch having a first terminal connected to a second terminal of the first switch and a second terminal connected to an application terminal of a predetermined voltage lower than the input voltage;

an inductor having a first terminal connected to a connection node between the first switch and the second switch;

a third switch having a first terminal connected to a second terminal of the inductor and a second terminal connected to the application terminal of the predetermined voltage;

a fourth switch having a first terminal connected to a connection node between the inductor and the third switch and a second terminal connected to an application terminal of the output voltage;

a first control circuit arranged to generate a step-down control signal for complementarily turning on/off the first switch and the second switch according to the output voltage; and a second control circuit arranged to generate a step-up control signal for complementarily turning on/off the third switch and the fourth switch by fixing an on-duty D (0≤D≤1) of the third switch to a fixed value D' (0<D'<1) in a step up/down mode, wherein it is determined whether to operate in the step up/down mode or in the step-down mode in which the step-up control signal is not generated, according to a mode designating signal, the first control circuit includes an error signal generation circuit arranged to generate an error signal obtained by giving a gain to a difference between a feedback voltage according to the output voltage and a predetermined reference voltage, and the error signal generation circuit sets the gain based on the mode designating signal, in such a manner that the gain in the step up/down mode is larger than the gain in the step-down mode.

34. The switching regulator according to claim 33, wherein the multiplication value of a value obtained by subtracting the fixed value D' from 1 and the gain in the step up/down mode is substantially the same as the gain in the step-down mode.

35. The switching regulator according to claim 33 or 34, wherein drive current of the error signal generation circuit is adjusted according to the mode designating signal.

36. A switching regulator arranged to generate an output voltage from an input voltage, comprising:

a first switch having a first terminal connected to an application terminal of the input voltage;

a second switch having a first terminal connected to a second terminal of the first switch and a second terminal connected to an application terminal of a predetermined voltage lower than the input voltage;

an inductor having a first terminal connected to a connection node between the first switch and the second switch;

a third switch having a first terminal connected to a second terminal of the inductor and a second terminal connected to the application terminal of the predetermined voltage;

a fourth switch having a first terminal connected to a connection node between the inductor and the third switch and a second terminal connected to an application terminal of the output voltage;

a first control circuit arranged to generate a step-down control signal for complementarily turning on/off the first switch and the second switch according to the output voltage;

a second control circuit arranged to generate a step-up control signal for complementarily turning on/off the third switch and the fourth switch by fixing an on-duty D (0≤D≤1) of the third switch to a fixed value D' (0<D'<1) in a step up/down mode; and a current detection unit arranged to detect current flowing in the inductor, wherein it is determined whether to operate in the step up/down mode or in the step-down mode in which the step-up control signal is not generated, according to a mode designating signal, the first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal, and the current detection unit sets a detection gain based on the mode designating signal, in such a manner that the detection gain in the step-down mode is larger than the detection gain in the step up/down mode.

37. The switching regulator according to claim 36, wherein the multiplication value of a value obtained by subtracting the fixed value D' from 1 and the detection gain in the step-down mode is substantially the same as the detection gain in the step up/down mode.

38. The switching regulator according to claim 36 or 37, wherein the slope voltage generation unit sets an offset of the slope voltage to be larger as the current detected by the current detection unit is larger.

39. The switching regulator according to claim 38, wherein the current detection unit is a voltage-to-current conversion circuit arranged to convert a voltage corresponding to current flowing in the second switch into current, and the slope voltage generation unit includes a capacitor arranged to be charged by output current of the voltage-to-current conversion circuit.

40. A switching regulator arranged to generate an output voltage from an input voltage, comprising:

a first switch having a first terminal connected to an application terminal of the input voltage;

a second switch having a first terminal connected to a second terminal of the first switch and a second terminal connected to an application terminal of a predetermined voltage lower than the input voltage;

an inductor having a first terminal connected to a connection node between the first switch and the second switch, a third switch having a first terminal connected to a second terminal of the inductor and a second terminal connected to the application terminal of the predetermined voltage;

a fourth switch having a first terminal connected to a connection node between the inductor and the third switch and a second terminal connected to an application terminal of the output voltage;

a first control circuit arranged to generate a step-down control signal for complementarily turning on/off the first switch and the second switch according to the output voltage; and a second control circuit arranged to generate a step-up control signal for complementarily turning on/off the third switch and the fourth switch by setting an on-duty of the third switch independently of each of the output voltage and the input voltage in the step up/down mode, wherein it is determined whether to operate in the step up/down mode or in the step-down mode in which the step-up control signal is not generated, according to a mode designating signal, the first control circuit includes an error signal generation circuit arranged to generate an error signal obtained by giving a gain to a difference between a feedback voltage according to the output voltage and a predetermined reference voltage, and the error signal generation circuit sets the gain based on the mode designating signal, in such a manner that the gain in the step up/down mode is larger than the gain in the step-down mode.

41. A switching regulator arranged to generate an output voltage from an input voltage, comprising:

a first switch having a first terminal connected to an application terminal of the input voltage;

a second switch having a first terminal connected to a second terminal of the first switch and a second terminal connected to an application terminal of a predetermined voltage lower than the input voltage;

an inductor having a first terminal connected to a connection node between the first switch and the second switch;

a third switch having a first terminal connected to a second terminal of the inductor and a second terminal connected to the application terminal of the predetermined voltage;

a fourth switch having a first terminal connected to a connection node between the inductor and the third switch and a second terminal connected to an application terminal of the output voltage;

a first control circuit arranged to generate a step-down control signal for complementarily turning on/off the first switch and the second switch according to the output voltage;

a second control circuit arranged to generate a step-up control signal for complementarily turning on/off the third switch and the fourth switch by setting an on-duty of the third switch independently of each of the output voltage and the input voltage in the step up/down mode; and a current detection unit arranged to detect current flowing in the inductor, wherein it is determined whether to operate in the step up/down mode or in the step-down mode in which the step-up control signal is not generated, according to a mode designating signal, the first control circuit includes a slope voltage generation unit arranged to generate a slope voltage based on current information detected by the current detection unit, an error amplifier arranged to generate an error signal corresponding to a difference between a voltage corresponding to the output voltage of the switching regulator and a reference voltage, a comparator arranged to compare the slope voltage with the error signal so as to generate a reset signal as a comparison signal, an oscillator arranged to generate a set signal as a clock signal having a predetermined frequency, and a timing control circuit arranged to generate the step-down control signal according to the set signal and the reset signal, and the current detection unit sets a detection gain based on the mode designating signal, in such a manner that the detection gain in the step-down mode is larger than the detection gain in the step up/down mode.

42. A vehicle comprising:

the switching regulator according to any one of claims 1 to 21, and 33 to 41; and a battery arranged to supply power to the switching regulator.

\* \* \* \* \*